United States Patent
Park et al.

(10) Patent No.: US 11,968,156 B2
(45) Date of Patent: Apr. 23, 2024

(54) METHOD AND APPARATUS FOR TRANSMITTING OR RECEIVING SYSTEM INFORMATION IN WIRELESS COMMUNICATION SYSTEM SUPPORTING TDD NARROWBAND

(71) Applicant: LG ELECTRONICS INC., Seoul (KR)

(72) Inventors: Chang Hwan Park, Seoul (KR); Seokmin Shin, Seoul (KR); Seunggye Hwang, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 714 days.

(21) Appl. No.: 17/044,565

(22) PCT Filed: Mar. 25, 2019

(86) PCT No.: PCT/KR2019/003446
§ 371 (c)(1),
(2) Date: Jun. 29, 2021

(87) PCT Pub. No.: WO2019/194443
PCT Pub. Date: Oct. 10, 2019

(65) Prior Publication Data
US 2022/0085963 A1 Mar. 17, 2022

Related U.S. Application Data

(60) Provisional application No. 62/674,571, filed on May 21, 2018.

(30) Foreign Application Priority Data

Apr. 5, 2018 (KR) .................. 10/2018/0039946
May 10, 2018 (KR) .................. 10-2018-0053625
(Continued)

(51) Int. Cl.
*H04W 72/04* (2023.01)
*H04L 5/00* (2006.01)
(Continued)

(52) U.S. Cl.
CPC .............. *H04L 5/14* (2013.01); *H04L 5/0048* (2013.01); *H04L 67/12* (2013.01)

(58) Field of Classification Search
CPC ......... H04L 5/14; H04L 5/0048; H04L 67/12; H04L 27/2602; H04W 48/12
See application file for complete search history.

(56) References Cited

U.S. PATENT DOCUMENTS

2016/0315752 A1* 10/2016 Chen ................. H04W 72/0446
2017/0251443 A1 8/2017 Shin et al.
(Continued)

FOREIGN PATENT DOCUMENTS

WO WO2017146342 8/2017

OTHER PUBLICATIONS

NPL R1-1801500, Ericsson, DL aspects of TDD for NB-Iot, 3GPP TSG-RAN WG1 Meeting #92, Athens, Greece, Feb. 26-Mar. 2, 2018 (Year: 2018).*

(Continued)

*Primary Examiner* — Mahbubul Bar Chowdhury
(74) *Attorney, Agent, or Firm* — Fish & Richardson P.C.

(57) ABSTRACT

The present disclosure provides a method for receiving system information in a wireless communication system supporting a TDD narrowband. More specifically, a method
(Continued)

performed by a terminal includes receiving first system information from a base station through an anchor carrier, the first system information including operation mode information on an operation mode of the system; determining a location of a non-anchor carrier for receiving second system information based on the operation mode information; and receiving the second system information from the base station through the non-anchor carrier, in which the operation mode information is configured in a guard band or an in-band. In this way, SIB1-NB is also transmitted and received on the non-anchor carrier.

6 Claims, 24 Drawing Sheets

(30) Foreign Application Priority Data

| | | |
|---|---|---|
| May 11, 2018 | (KR) | 10-2018-0054542 |
| May 18, 2018 | (KR) | 10-2018-0056961 |

(51) Int. Cl.
*H04L 5/14* (2006.01)
*H04L 67/12* (2022.01)

(56) References Cited

U.S. PATENT DOCUMENTS

| | | | |
|---|---|---|---|
| 2019/0190686 A1* | 6/2019 | Ye | H04L 27/2666 |
| 2020/0163032 A1* | 5/2020 | Su | H04W 48/12 |
| 2020/0396722 A1* | 12/2020 | Han | H04L 1/18 |
| 2021/0099944 A1* | 4/2021 | Höglund | H04W 48/08 |

OTHER PUBLICATIONS

EP Extended European Search Report in European Appln. No. 19781642.4, dated May 3, 2021, 9 pages.
Ericsson, "DL aspects of TDD for NB-Iot," R1-1801500, 3GPP TSG-RAN WG1 Meeting #92, Athens, Greece, Feb. 26-Mar. 2, 2018, 15 pages.
Lenovo, Motorola Mobility, "Design of reducing system acquisition time for FeNB-IoT," R1-1705652, 3GPP TSG RAN WG1 Meeting #88bis, Spokane, USA Apr. 3-7, 2017, 4 pages.
PCT International Search Report in International Appln. No. PCT/KR2019/003446, dated Jul. 11, 2019, 6 pages (with English translation).
Samsung, "Discussion on DL common channel/signal for TDD NB-IoT," R1-1801937, 3GPP TSG RAN WG1 Meeting #92, Athens, Greece, Feb. 26-Mar. 2, 2018, 4 pages.
ZTE, Sanechips, "Summary of DL aspects for TDD NB-IoT," R1-1802998, 3GPP TSG RAN WG1 Meeting #92, Athens, Greece, Feb. 26-Mar. 2, 2018, 12 pages.

* cited by examiner

[FIG. 1]
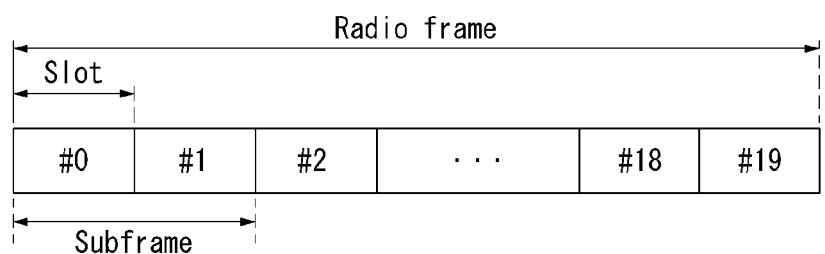

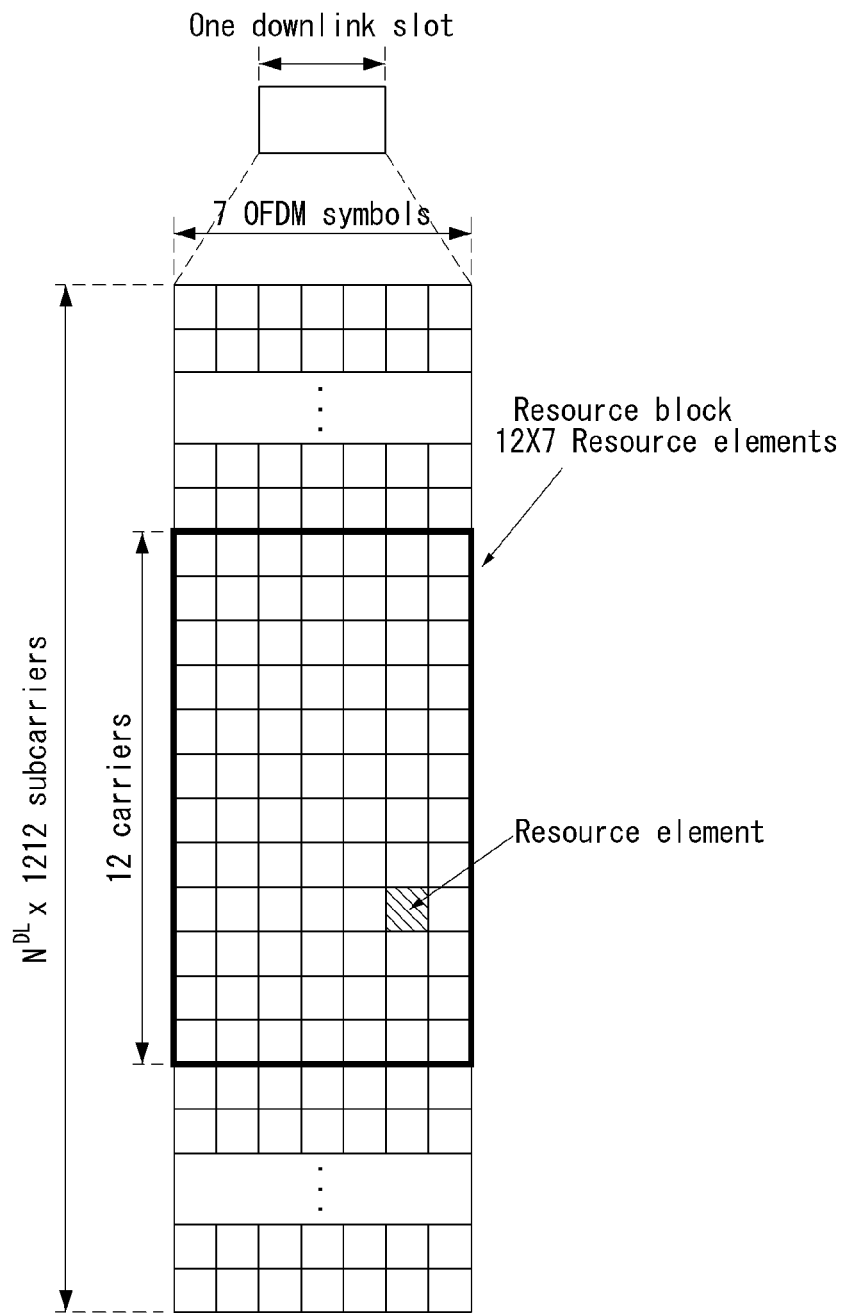
[FIG. 2]

[FIG. 3]
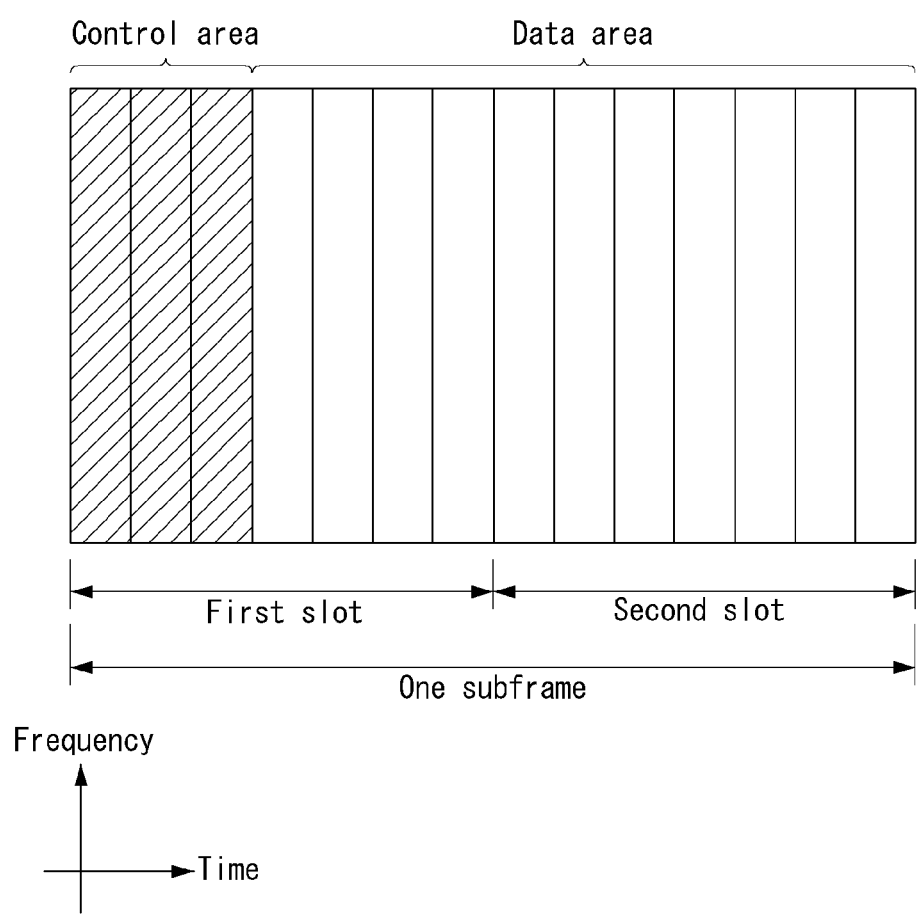

[FIG. 4]
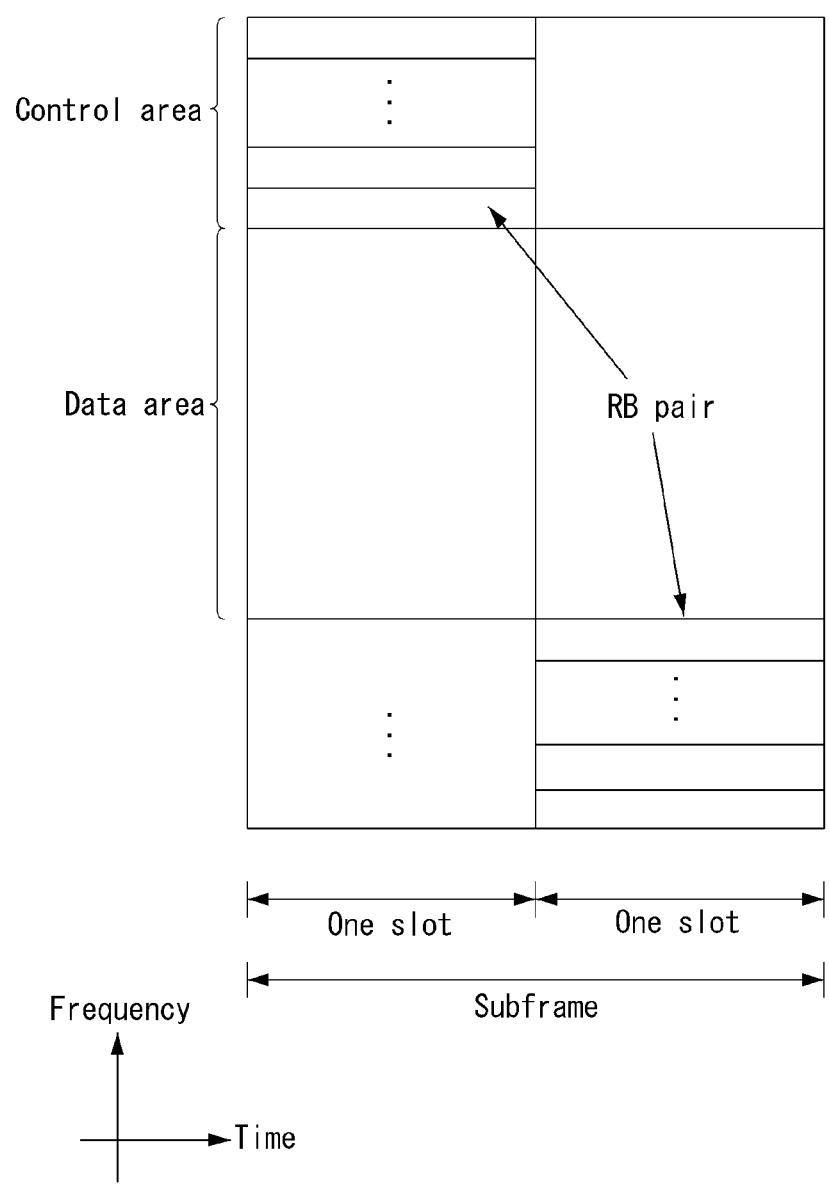

[FIG. 5]
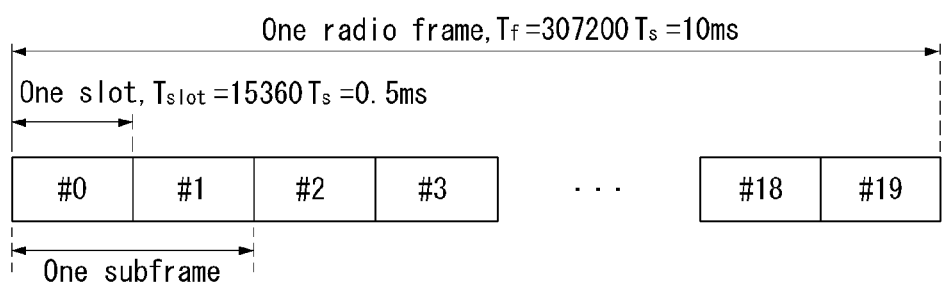

[FIG. 6]
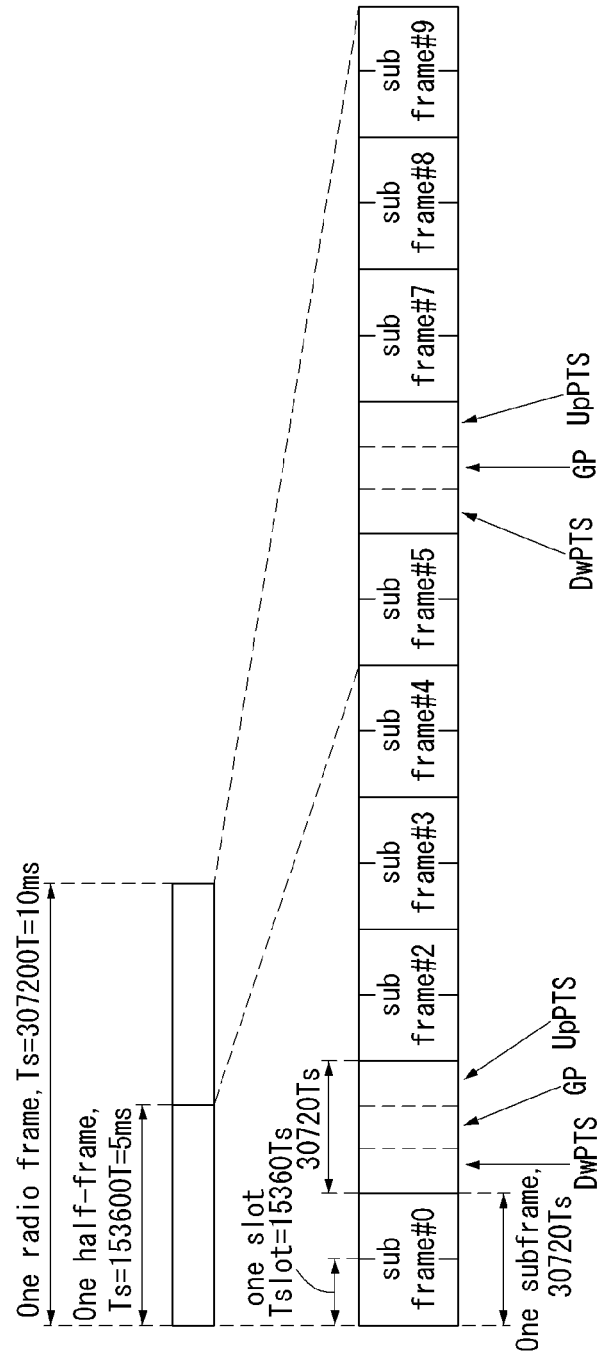

[FIG. 7]

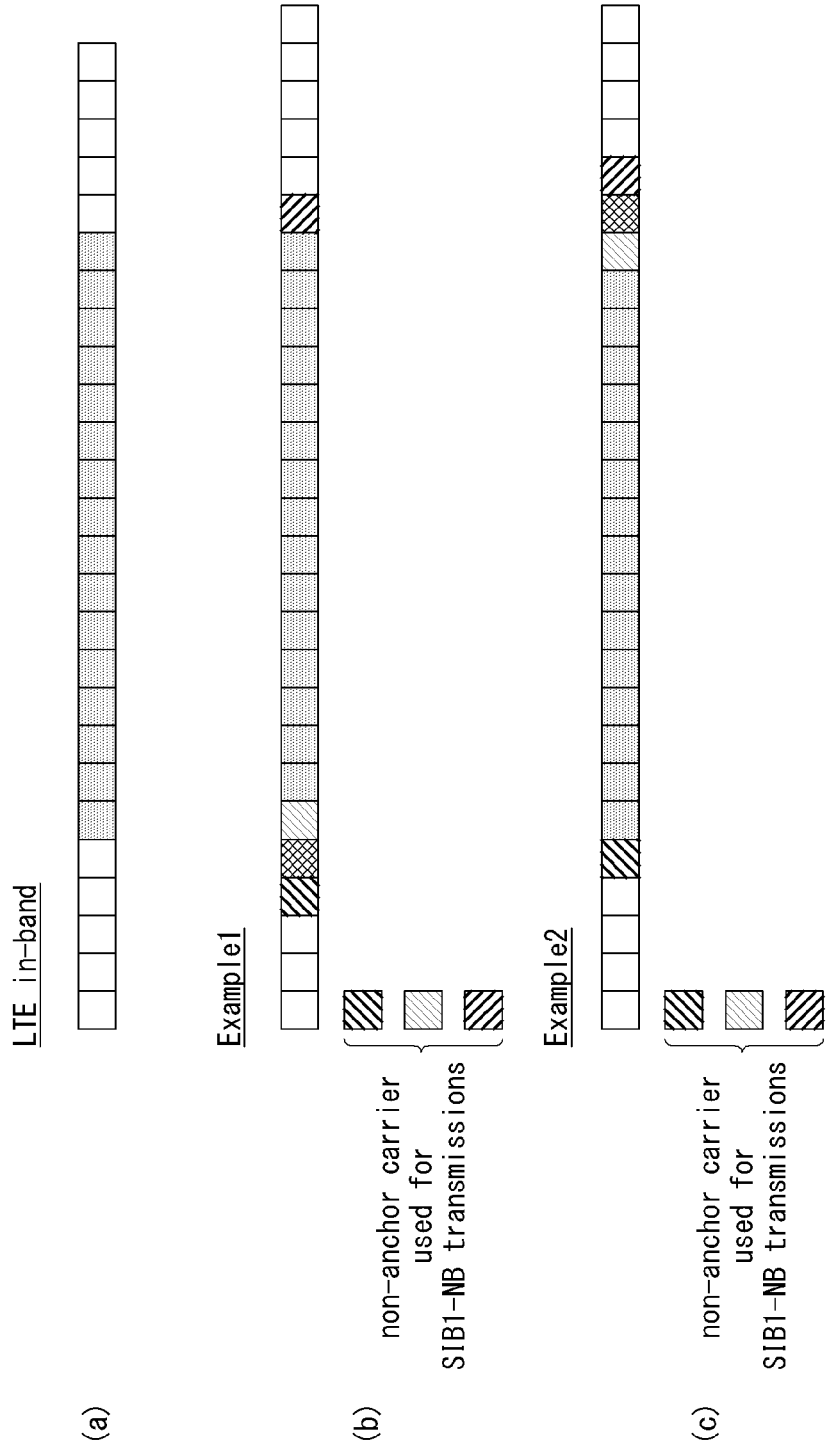

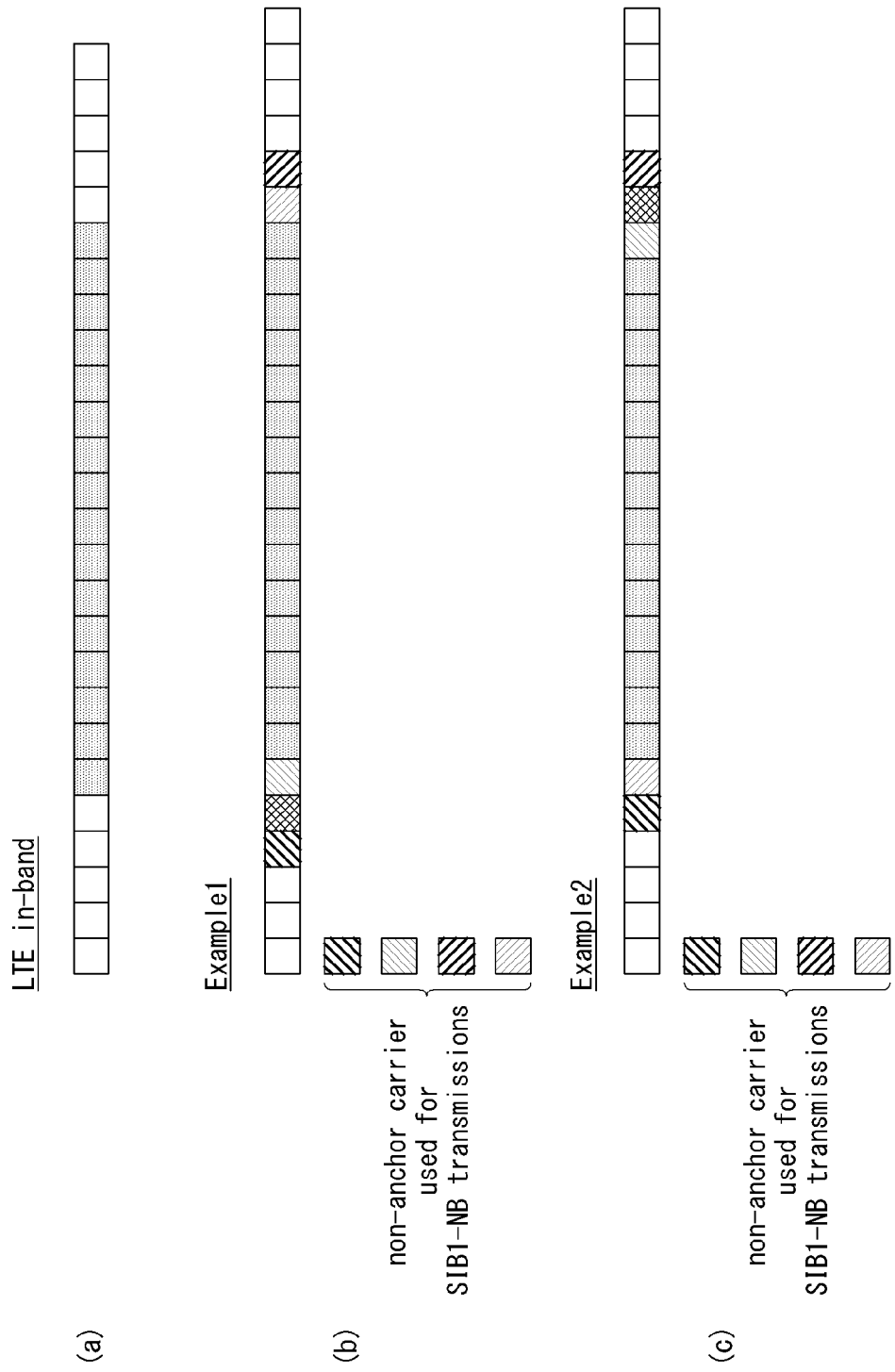

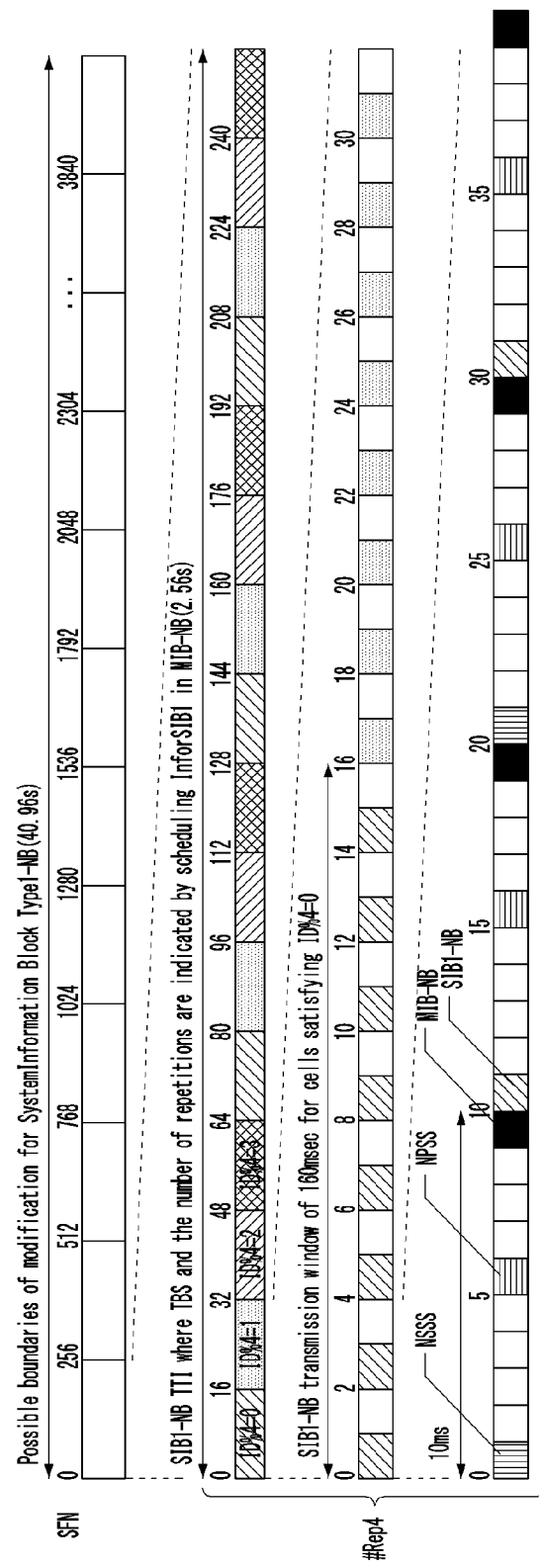
[FIG. 10a]

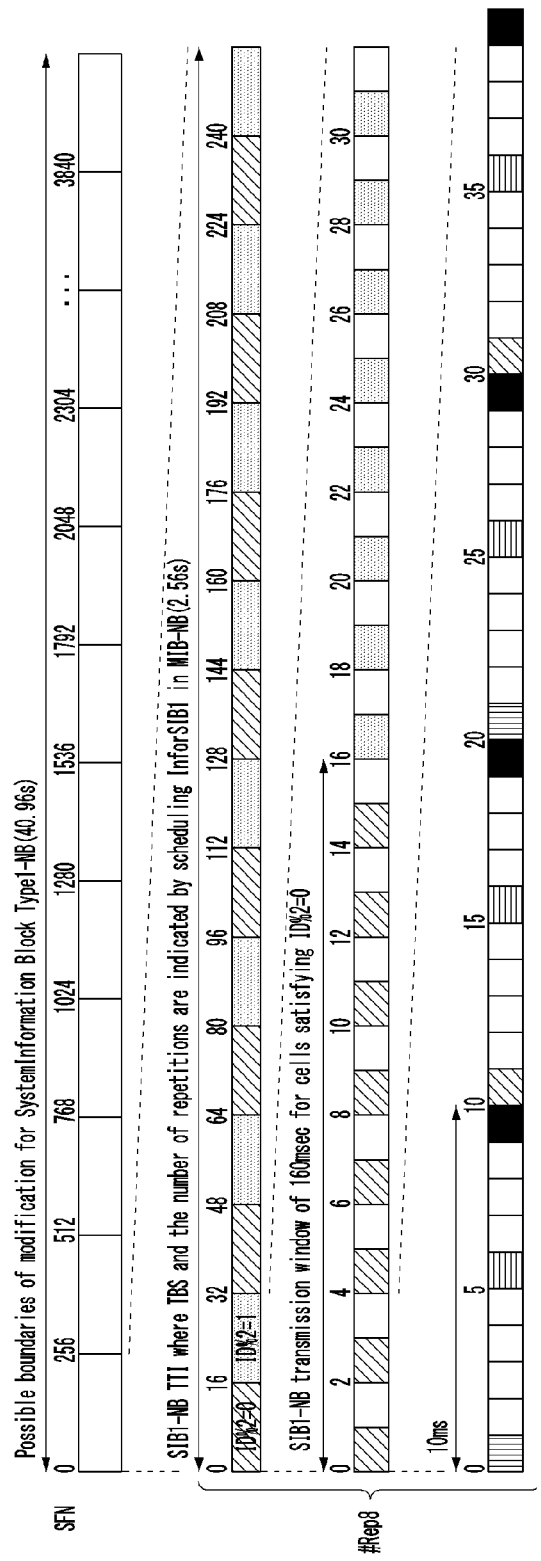
[FIG. 10b]

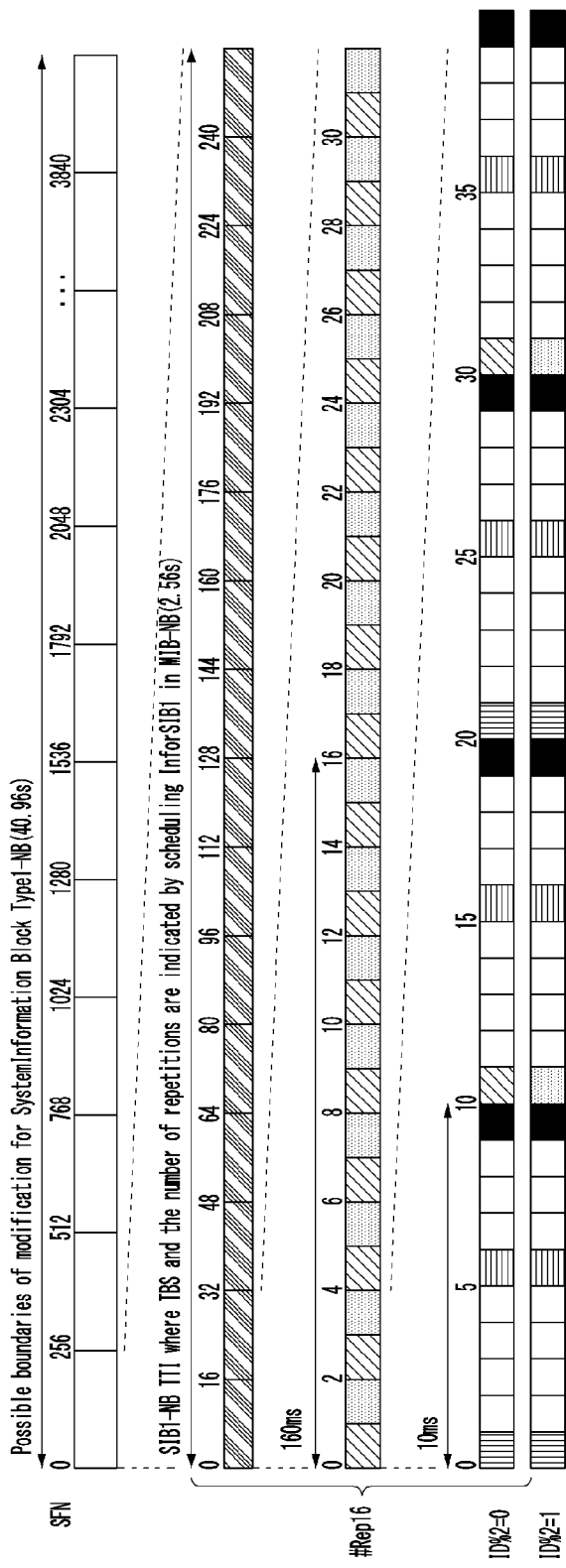
[FIG. 10c]

[FIG. 11]
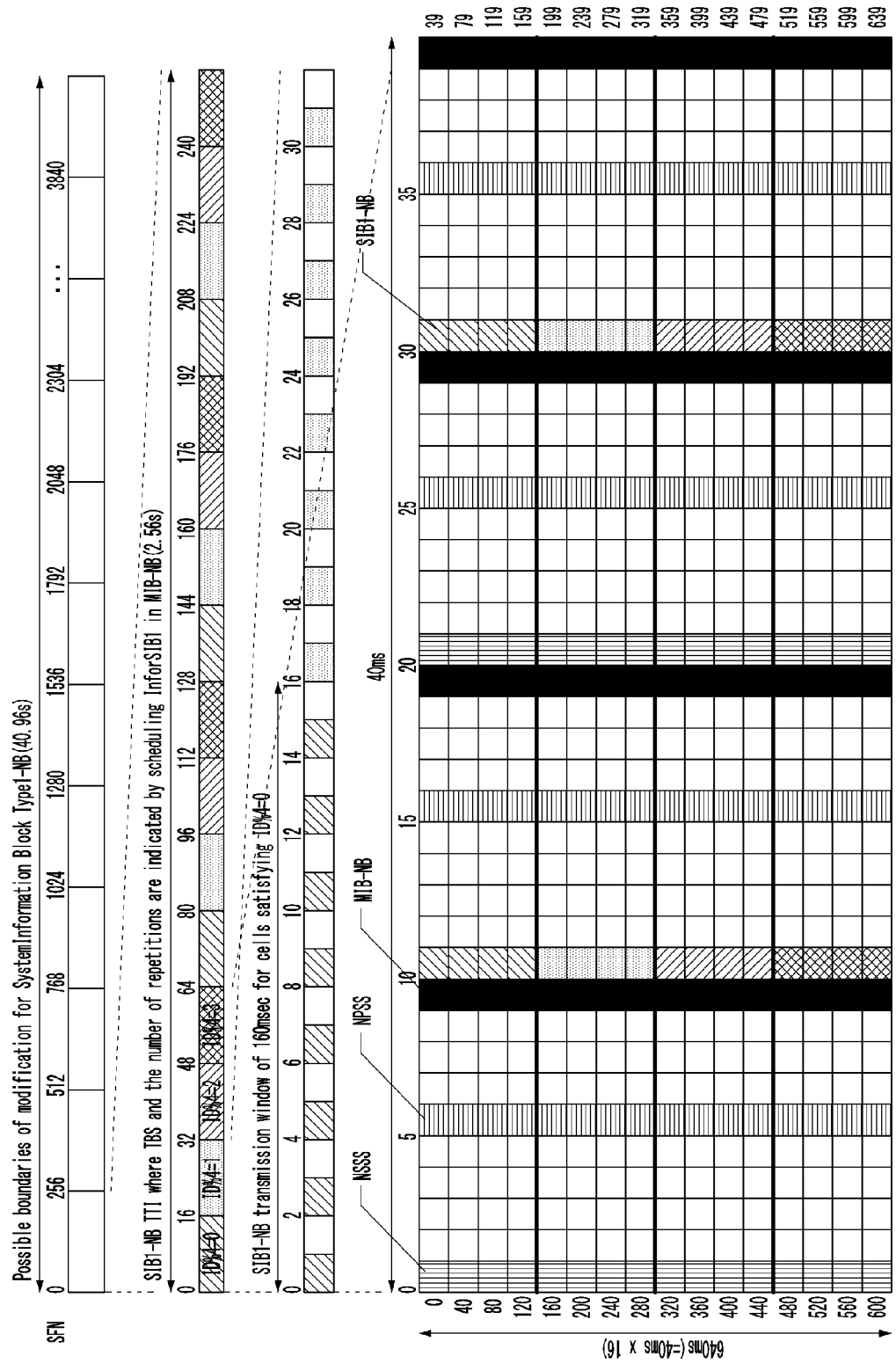

[FIG. 12]
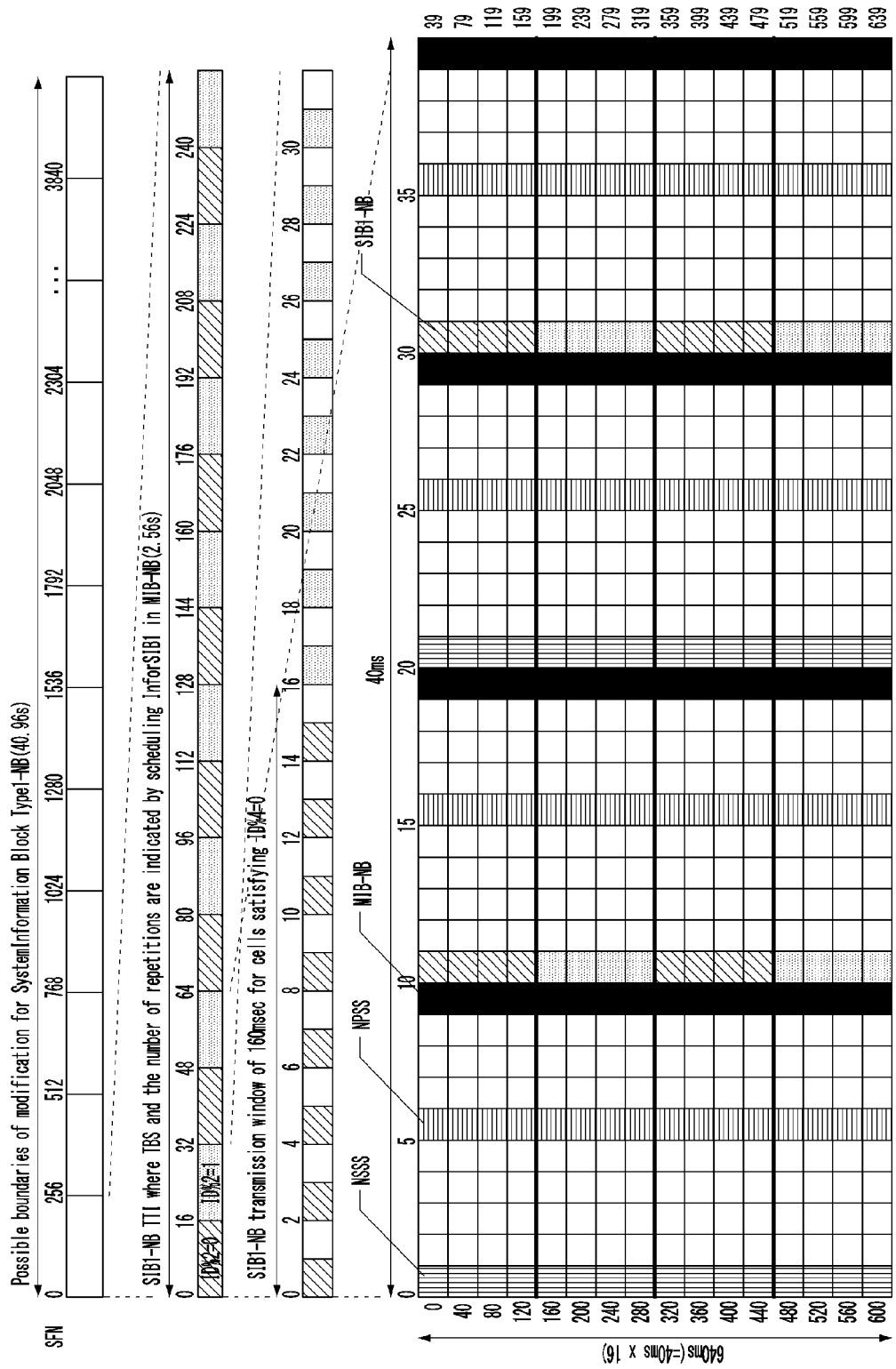

[FIG. 13]
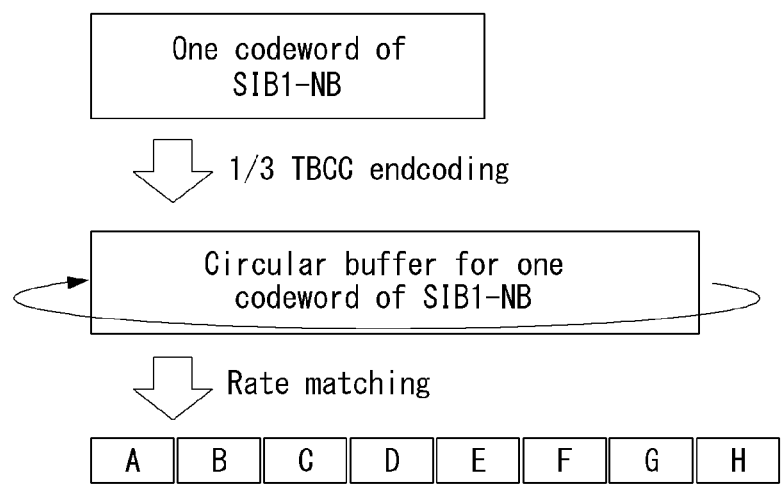

[FIG. 14]

| #Subframe | | #0 | #1 | #2 | #3 | #4 | #5 | #6 | #7 | #8 | #9 | #0 | #1 | #2 | #3 | #4 | #5 | #6 | #7 | #8 | #9 |
|---|---|---|---|---|---|---|---|---|---|---|---|---|---|---|---|---|---|---|---|---|---|
| MBSFN | | X | X | X | X | X | X | X | X | X | X | X | X | X | X | △ | X | X | X | X | X |
| Default NRS | | X | X | X | X | X | X | X | X | X | 0 | 0 | X | X | X | X | X | X | X | X | 0 |
| Anchor-carrier | 0 | 5ms | D | S | U | U | U | D | S | U | U | U | D | S | U | U | U | D | S | U | U | U |
| | 1 | 5ms | NSSS | S | U | U | SIB1 | NPSS | S | U | U | MIB | SIB1 | S | U | U | SIB1 | NPSS | S | U | U | MIB |
| | 2 | 5ms | NSSS | S | U | D | SIB1 | NPSS | S | U | D | MIB | SIB1 | S | U | D | SIB1 | NPSS | S | U | D | MIB |
| | 3 | 10ms | NSSS | S | U | U | U | NPSS | D | D | D | MIB | SIB1 | S | U | U | U | NPSS | D | D | D | MIB |
| | 4 | 10ms | NSSS | S | U | U | SIB1 | NPSS | D | D | D | MIB | SIB1 | S | U | U | SIB1 | NPSS | D | D | D | MIB |
| | 5 | 10ms | NSSS | S | U | D | SIB1 | NPSS | D | U | D | MIB | SIB1 | S | U | D | SIB1 | NPSS | D | U | D | MIB |
| | 6 | 5ms | D | S | U | U | U | D | S | U | U | D | D | S | U | U | U | D | S | U | U | D |

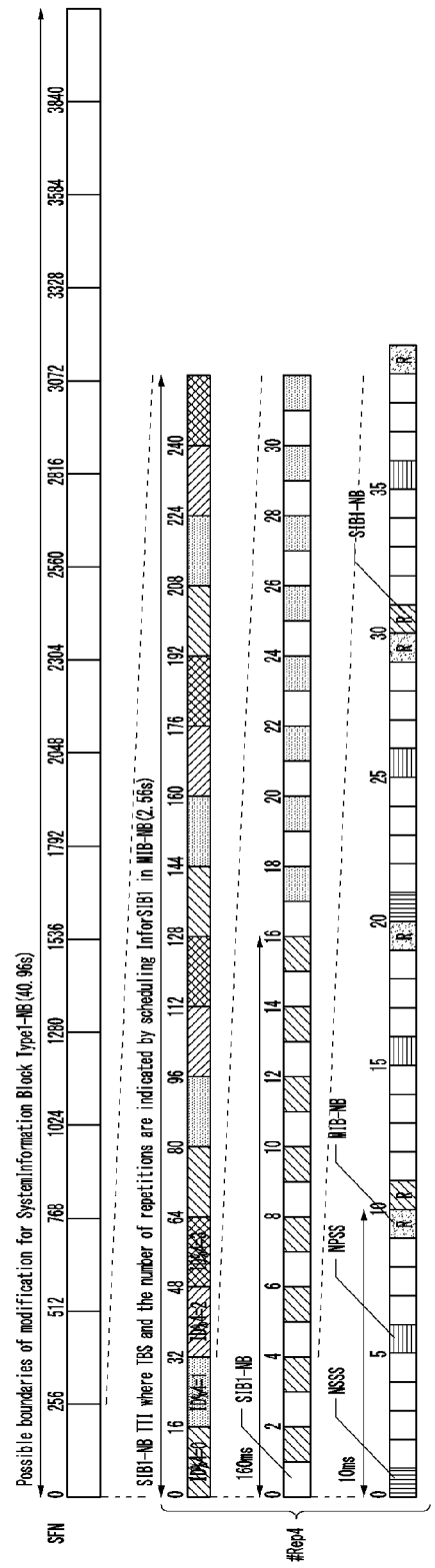
[FIG. 15a]

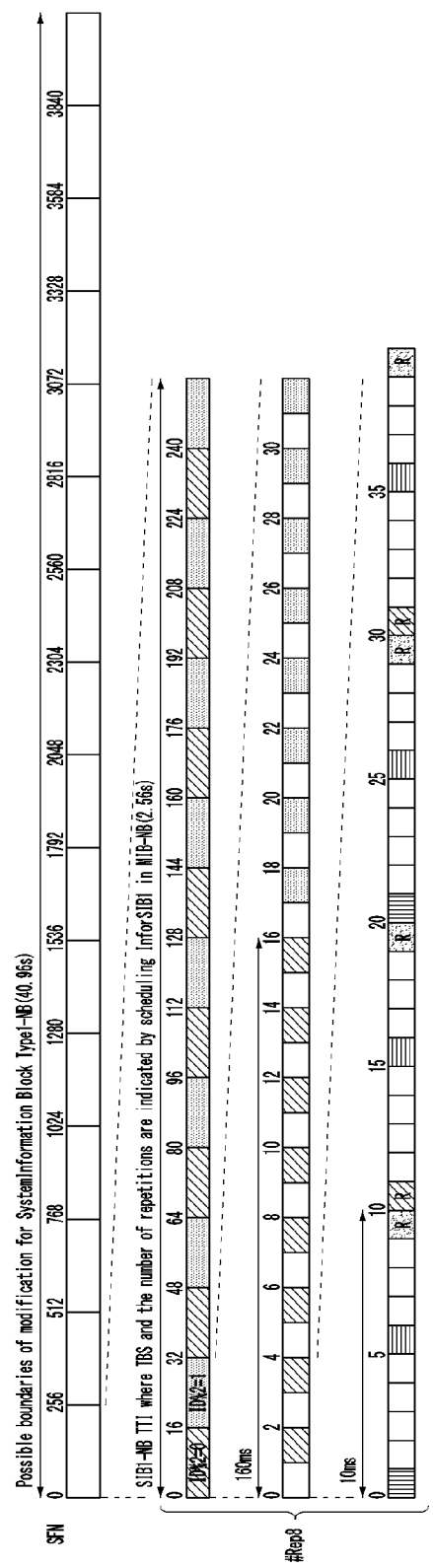
[FIG. 15b]

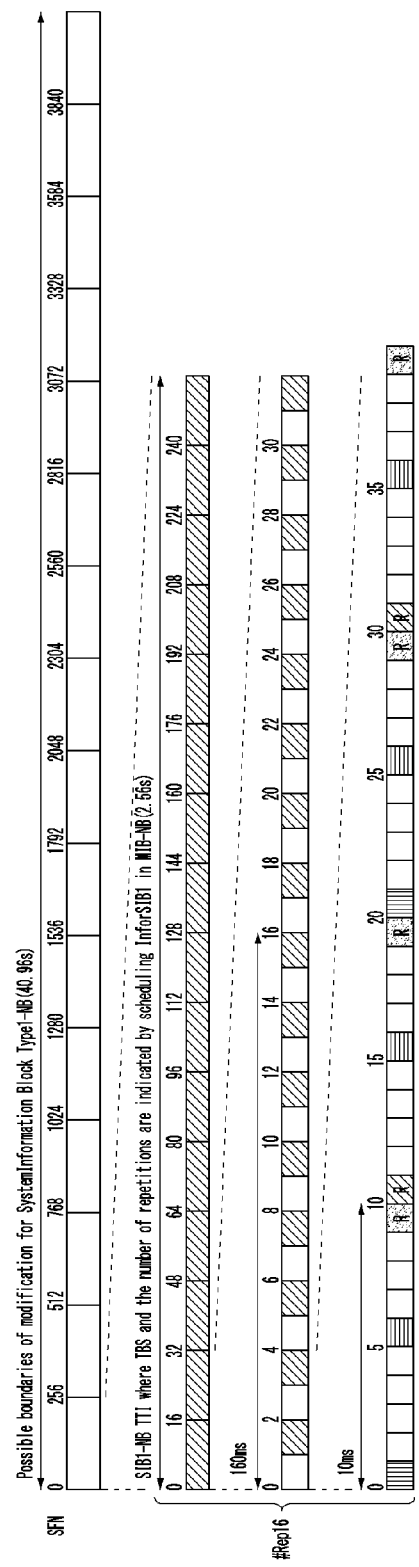
[FIG. 15c]

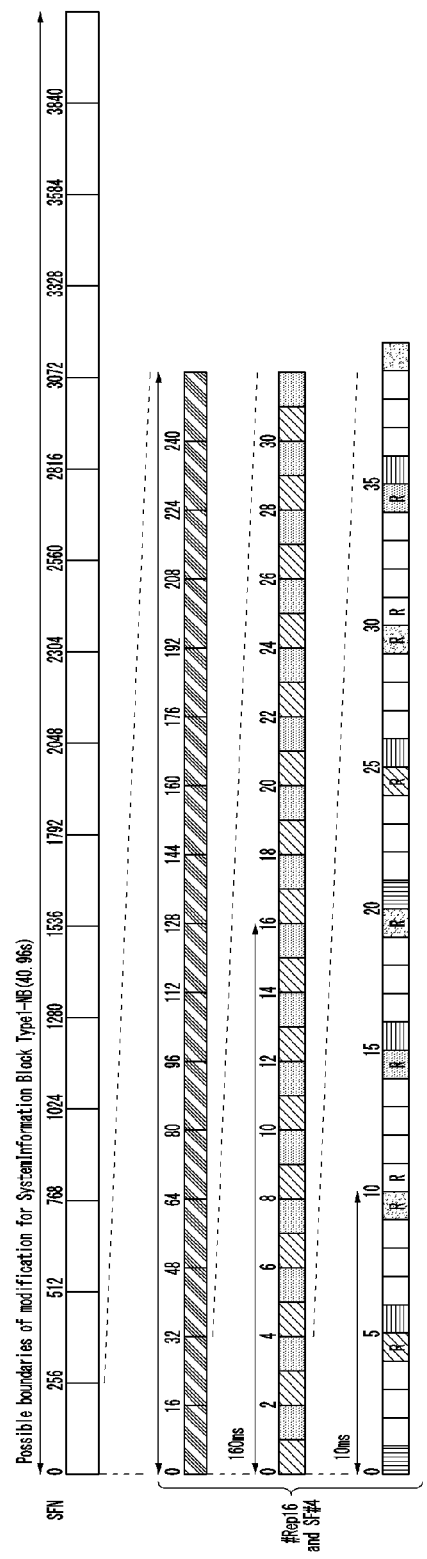
[FIG. 15d]

[FIG. 16]
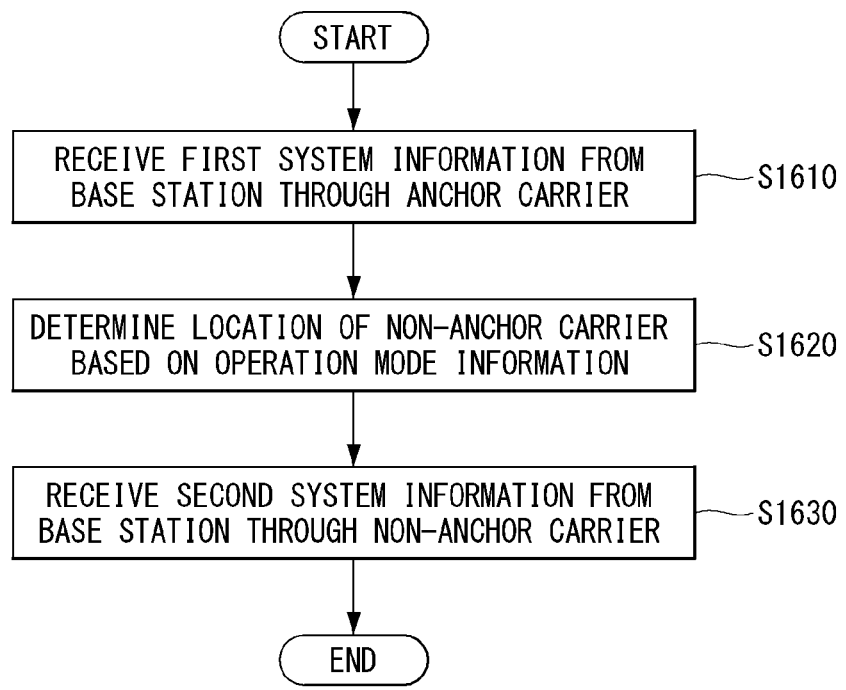

[FIG. 17]
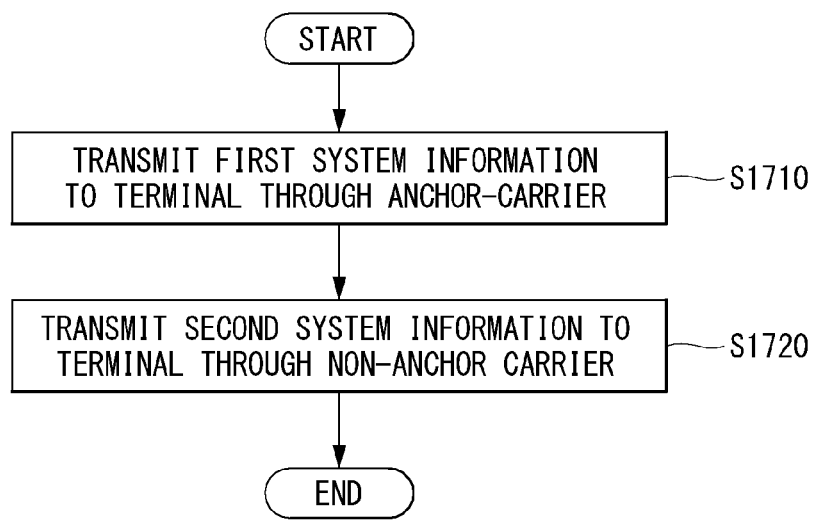

[FIG. 18]
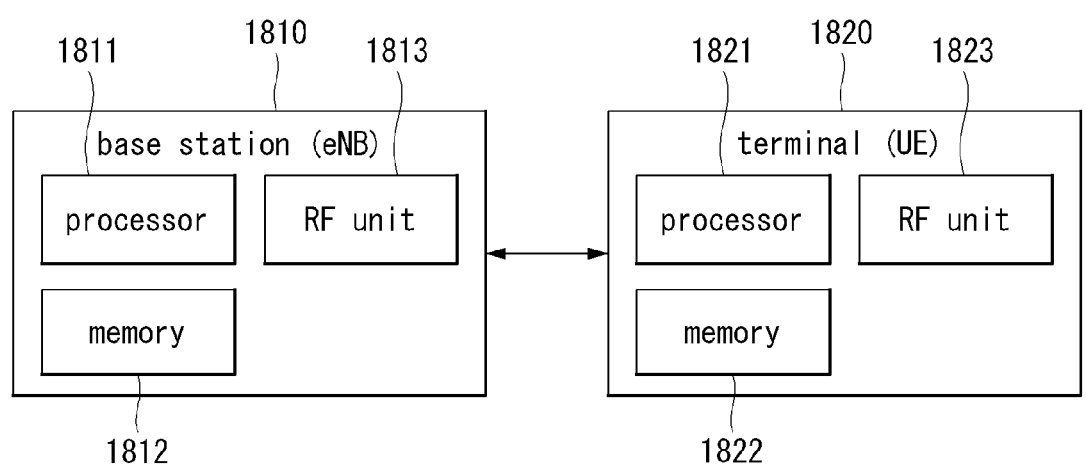

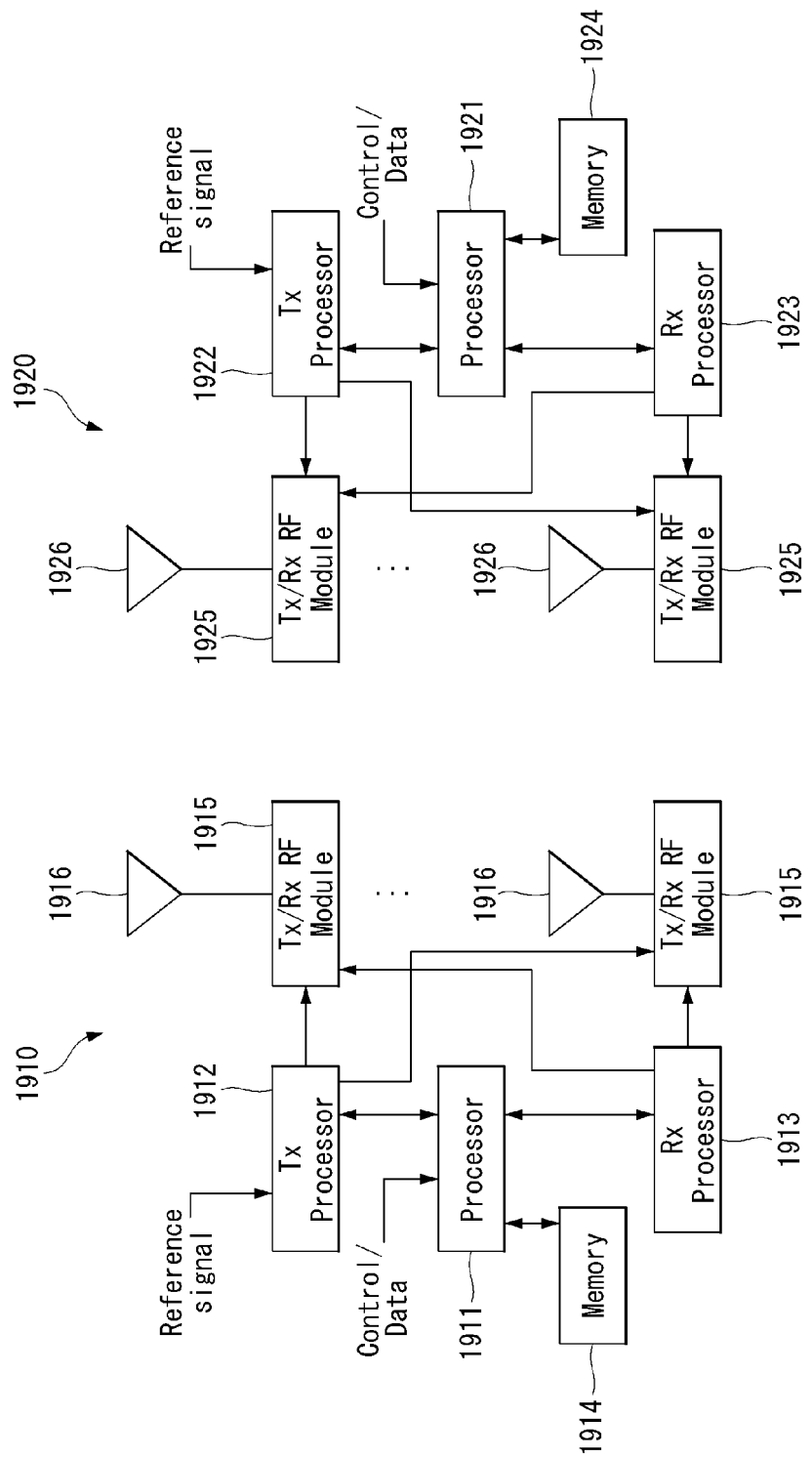
[FIG. 19]

METHOD AND APPARATUS FOR TRANSMITTING OR RECEIVING SYSTEM INFORMATION IN WIRELESS COMMUNICATION SYSTEM SUPPORTING TDD NARROWBAND

CROSS-REFERENCE TO RELATED APPLICATIONS

This application is the National Stage filing under 35 U.S.C. 371 of International Application No. PCT/KR2019/003446, filed on Mar. 25, 2019, which claims the benefit of KR Application No. 10-2018-0039946, filed on Apr. 5, 2018, No. 10-2018-0053625, filed on May 10, 2018, No. 10-2018-0054542, filed on May 11, 2018, No. 10-2018-0056961, filed on May 18, 2018 and U.S. Provisional Application No. 62/674,571, filed on May 21, 2018, the contents of which are all hereby incorporated by reference herein in their entirety.

TECHNICAL FIELD

This specification relates to a wireless communication system supporting a TDD narrowband and, more particularly, to a method for transmitting and receiving system information in a TDD NB-IoT system and an apparatus therefor.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The technical problem of the present disclosure is to provide a method for transmitting and receiving system information on a non-anchor carrier in a TDD NB-IoT system.

Objects of the present disclosure are not limited to the above-mentioned objects. That is, other objects that are not mentioned may be obviously understood by those skilled in the art to which the present disclosure pertains from the following description.

Technical Solution

According to an aspect of the present invention, there is provided a method for a terminal to receive system information in a time division duplex (TDD) system supporting narrowband (NB)-Internet of things (IoT), the method including: receiving, from a base station, first system information through an anchor carrier, wherein the first system information includes operation mode information for an operation mode of the system; determining a location of a non-anchor carrier for receiving second system information based on the operation mode information; and receiving, from the base station, the second system information through the non-anchor carrier, wherein the operation mode information is configured as a guard band or an in-band.

The in-band may be an in-band-differentPCI.

When the operation mode information is configured as the guard band, the non-anchor carrier may be a carrier on the same side as the anchor carrier or a carrier on an opposite side to the anchor carrier.

The first system information may further include information representing that a number of cell-specific reference signal (CRS) ports of the non-anchor carrier is equal to a number of narrowband reference signal (NRS) ports of the anchor-carrier or four.

According to another aspect of the present invention, there is provided a terminal receiving system information in a time division duplex (TDD) system supporting NB-IoT, the terminal including: a transmitter that transmits a radio signal; a receiver that receives the radio signal; and a processor that controls the transmitter and the receiver, wherein the processor may control the receiver to receive, from a base station, first system information through an anchor carrier, wherein the first system information includes operation mode information for an operation mode of the system; determine a location of a non-anchor carrier for receiving second system information based on the operation mode information; and control the receiver to receive, from the base station, the second system information through the non-anchor carrier, and wherein the operation mode information is configured as a guard band or an in-band.

According to another aspect of the present invention, there is provided a method for a base station to transmit system information in a time division duplex (TDD) system supporting narrowband (NB)-Internet of things (IoT), the method including: transmitting, to a terminal, first system information through a anchor carrier, wherein the first system information includes operation mode information for an operation mode of the system; and transmitting, to the terminal, second system information through a non-anchor carrier, wherein a location of the non-anchor carrier is determined based on the operation mode information, and wherein the operation mode information is configured as a guard band or an in-band.

Advantageous Effects

The present specification has an effect of allowing system information to be transmitted and received on a non-anchor carrier by defining a location of system information and a related procedure on a non-anchor carrier.

Effects which can be achieved by the present disclosure are not limited to the above-mentioned effects. That is, other objects that are not mentioned may be obviously understood by those skilled in the art to which the present disclosure pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

FIG. 1 is a diagram showing an example of an LTE radio frame structure.

FIG. 2 is a diagram showing an example of a resource grid for a downlink slot.

FIG. 3 shows an example of a downlink subframe structure.

FIG. 4 shows an example of an uplink subframe structure.

FIG. 5 shows an example of a frame structure type 1.

FIG. 6 is a diagram showing another example of a frame structure type 2.

FIG. 7 shows an example of a random access symbol group.

FIG. 8 is a diagram showing an example of a method for interpreting signaling information of an SIB1-NB non-anchor carrier in a MIB-NB when an anchor carrier proposed in this specification is a guard band operation mode.

FIG. 9 is a diagram showing another example of a method for interpreting signaling information of an SIB1-NB non-anchor carrier in a MIB-NB when an anchor carrier proposed in this specification is a guard band operation mode.

FIG. 10 is a diagram showing an example of the transmission location of an SIB1-NB proposed in this specification.

FIGS. 11 and 12 show examples of the transmission location of an SIB1-NB according to a repetition number proposed in this specification.

FIG. 13 is a diagram showing an example of the codeword and resource mapping of an SIB1-NB proposed in this specification.

FIG. 14 is a diagram showing an example of the location of a subframe in which an NPSS/NSSS/NPBCH/SIB1-NB is transmitted on an anchor-carrier proposed in this specification.

FIG. 15 is a diagram showing another example of the location of a subframe in which an NPSS/NSSS/NPBCH/SIB1-NB/NRS is transmitted on an anchor carrier proposed in this specification.

FIG. 16 is a flowchart showing an example of a terminal operation for performing the method proposed in the present disclosure.

FIG. 17 is a flowchart showing an example of a base station operation for performing the method proposed in the present disclosure.

FIG. 18 illustrates a block diagram of a wireless communication apparatus to which methods proposed in this specification may be applied.

FIG. 19 is another example of a block diagram of a wireless communication apparatus to which methods proposed in this specification may be applied.

MODE FOR DISCLOSURE

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base is station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System

FIG. 1 is a diagram showing an example of an LTE radio frame structure.

In FIG. 1, the radio frame includes 10 subframes. The subframe includes 2 slots in a time domain. Time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in the time domain. An OFDM symbol is for representing one symbol period because 3GPP LTE uses OFDMA in downlink. The OFDM symbol may be referred to as an SC-FDMA symbol or a symbol period. A resource block (RB) is a resource allocation unit and a plurality of contiguous subcarriers in one slot. The structure of the radio frame is illustrative. Accordingly, the number of subframes included in the radio frame, the number of slots included in a subframe, or the number of OFDM symbols included in a slot may be modified in various manners.

FIG. 2 is a diagram showing an example of a resource grid for a downlink slot.

In FIG. 2, the downlink slot includes a plurality of OFDM symbols in a time domain. In this specification, for example, one downlink slot is illustrated as including 7 OFDM symbols and one resource block (RB) is illustrated as including 12 subcarriers in a frequency domain. However, the present invention is not limited to the above examples. Each element of the resource grid is referred to as a resource element (RE). One RB includes 12×7 REs. The number NDL of RBs included in the downlink slot is different depending on a downlink transmission bandwidth. The structure of an uplink slot may be the same as that of a downlink slot.

FIG. 3 shows an example of a downlink subframe structure.

In FIG. 3, a maximum of 3 OFDM symbols positioned in the front part of the first slot within a subframe is a control area to which a control channel is allocated. The remaining OFDM symbols correspond to a data area to which a PDSCH is allocated. Examples of downlink control channels used in I3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe, and carries information on OFDM symbols used for the transmission of control channels within a subframe. The PHICH is a response to uplink transmission and carries a HARQ acknowledgment (ACK)/negative-acknowledgment (NACK) signal. Control information transmitted through a PDCCH is referred to as downlink control information (DCI). DCI includes uplink or downlink scheduling information or includes an uplink transmission (Tx) power control command for given UE groups.

A PDCCH may carry the transport format and resource allocation of a downlink shared channel (DL-SCH), resource allocation information of an uplink shared channel (UL-SCH), paging information on a paging channel (PCH), system information on a DL-SCH, resource allocation of a higher layer control message such as a random access response transmitted on a PDSCH, a set of Tx power control commands for UEs within an arbitrary UE group, the Tx power control command of a voice over IP (VoIP), activation, etc. A plurality of PDCCHs may be transmitted within the control area. A UE may monitor a plurality of PDCCHs. A PDCCH is transmitted on an aggregation of one or some contiguous control channel elements (CCEs). A CCE is a logical allocation unit used to provide a PDCCH with a coding rate based on the state of a radio channel. A CCE corresponds to a plurality of resource element groups. The format of a PDCCH and the number of available bits of the PDCCH is determined based on the correlation between the number of CCEs and a coding rate provided by the CCEs. A BS determines a PDCCH format based on DCI that needs to be transmitted to a UE, and attaches a cyclic redundancy check (CRC) to control information. The CRC is masked with a unique identifier (called radio network temporary identifier (RNTI)) depending on the owner or use of a PDCCH. If a PDCCH is for a specific UE, a CRC may be masked with a unique identifier (e.g., cell-RNTI (C-RNTI)) of the specific UE. For another example, if a PDCCH is for a paging message, a CRC may be masked with a paging indicator identifier (e.g., paging-RNTI (P-RNTI)). If a PDCCH is for system information (system information block (SIB) to be described more specifically), a CRC may be masked with a system information identifier and a system information RNTI (SI-RNTI). A CRC may be masked with a random access-RNTI (RA-RNTI) in order to indicate a random access response, that is, a response to the transmission of a random access preamble by a UE.

FIG. 4 shows an example of an uplink subframe structure.

In FIG. 4, the uplink subframe may be divided into a control area and a data area in a frequency domain. A physical uplink control channel (PUCCH) for carrying uplink control information is allocated to the control area. A physical uplink shared channel (PUSCH) for carrying user data is allocated to the data area. In order to maintain a single carrier characteristic, one UE does not transmit a PUCCH and a PUSCH at the same time. A PUCCH for one UE is allocated to an RB pair within a subframe. An RB belonging to an RB pair occupies different subcarriers in two slots. This is called that an RB pair allocated to a PUCCH is frequency-hopped at a slot boundary.

Hereinafter, an LTE frame structure is described more specifically.

The sizes of various fields in the time domain is represented as the number of time units of $T_s=1/(15000 \times 2048)$ seconds unless described otherwise through the LTE specification.

Downlink and uplink transmissions are organized as a radio frame having duration of $T_f=307200 \times T_s=10$ m. Two radio frame structures are supported.

Type 1: applicable to FDD
Type 2: applicable to TDD

Frame Structure Type 1

The frame structure type 1 may be applied to both full duplex and half duplex FDD. Each radio frame is $T_f=307200$ $T_s=10$ ms length, and is configured with slots, that is, $T_f=307200$ $T_s=10$ ms. The slots are numbered from 0 to 19. A subframe is defined as two contiguous slots, and a subframe i includes slots 2i and 2i+1.

In the case of FDD, 10 subframes are available for downlink transmission, and 10 subframes are available for uplink transmission every 10 ms interval.

Uplink and downlink transmissions are separated in the frequency domain. In a half duplex FDD operation, a UE cannot transmit and receive data at the same time, but there is no limit in full duplex FDD.

FIG. 5 shows an example of a frame structure type 1.

Frame Structure Type 2

The frame structure type 2 may be applied to FDD. The length of each radio frame of a length $T_f=307200 \times T_s=10$ ms includes two half-frames, each one having $15360 \cdot T_s=0.5$ ms. Each half-frame includes 5 subframes of length $30720 \cdot T_s=1$ ms. Supported uplink-downlink configurations are listed in Table 2. In this case, in each subframe within a radio frame, "D" indicates that a subframe has been reserved for downlink transmission, "U" indicates that a subframe has been reserved for uplink transmission, and "S" indicates a special subframe having three fields of a downlink pilot time slot (DwPTS), a guard period (GP) and an uplink pilot time slot (UpPTS). On the premise that a DwPTS, GP and UpPTS have a total length $30720 \cdot T_s=1$ ms, the length of the DwPTS and UpPTS is provided by Table 1. In each subframe i, a length within each subframe is defined as two slots 2i and 2i+1, that is, $T_{slot}=15360 \cdot T_s=0.5$ m.

An uplink-downlink configuration having switch-point periodicity from downlink to uplink in both 5 ms and 10 ms is supported. In the case of switch-point periodicity from downlink to uplink of 5 ms, a special subframe is present in both two half-frames. In the case of switch-point periodicity from downlink to uplink of 10 ms, the special subframe is present only in the first half-frame. Subframes 0 and 5 and a DwPTS are always reserved for downlink transmission. An UpPTS and a subframe subsequent to the special subframe are always reserved for uplink transmission.

FIG. 6 is a diagram showing another example of a frame structure type 2.

Table 1 shows an example of the configuration of a special subframe.

TABLE 1

| Special subframe configuration | normal cyclic prefix in downlink | | | extended cyclic prefix in downlink | | |
| --- | --- | --- | --- | --- | --- | --- |
| | | UpPTS | | | UpPTS | |
| | DwPTS | normal cyclic prefix in uplink | extended cyclic prefix in uplink | DwPTS | normal cyclic prefix in uplink | extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows an example of an uplink-downlink configuration.

TABLE 2

| Uplink-Downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

NB-IoT

A narrowband-Internet of things (NB-IoT) is a standard for supporting low complexity, low cost devices, and has been defined to perform only a relatively simple operation compared to the existing LTE devices. The NB-IoT follows the basic structure of LTE, but operates based on the following defined contents. If the NB-IoT reuses a channel or signal of LTE, it may follow the standard defined in the existing LTE.

Uplink

The following narrowband physical channels are defined.

Narrowband physical uplink shared channel (NPUSCH)

Narrowband physical random access channel (NPRACH)

The following uplink narrowband physical signals are defined.

Narrowband demodulation reference signal

In a subcarrier $N_{sc}^{UL}$ aspect, an uplink bandwidth and slot duration $T_{slot}$ are given in Table 3.

Table 3 shows an example of NB-IoT parameters.

TABLE 3

| Subcarrier Spacing | $N_{sc}^{UL}$ | $T_{slot}$ |
| --- | --- | --- |
| $\Delta f = 3.75$ kHz | 48 | $61440 \cdot T_s$ |
| $\Delta f = 15$ kHz | 12 | $15360 \cdot T_s$ |

A single antenna port p=0 is used for all uplink transmissions.

Resource Unit

A resource unit is used to describe the mapping of an NPUSCH and a resource element. The resource unit is defined as contiguous symbols of $N_{symb}^{UL}N_{slots}^{UL}$ in the time domain, and is defined as contiguous subcarriers of $N_{sc}^{RU}$ in the frequency domain. In this case, $N_{sc}^{RU}$ and $N_{symb}^{UL}$ are given in Table 4.

Table 4 shows an example of supported combinations of $N_{sc}^{RU}$, $N_{slots}^{UL}$ and $N_{symb}^{UL}$.

TABLE 4

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |
| 2 | 3.75 kHz | 1 | 4 |  |
|  | 15 kHz | 1 | 4 |  |

Narrowband Uplink Shared Channel (NPUSCH)

A narrowband physical uplink shared channel is supported by two formats:

NPUSCH format 1 used to carry an UL-SCH

NPUSCH format 2 used to carry uplink control information

Scrambling is performed according to Paragraph 5.3.1 of TS36.211. A scrambling sequence generator is initialized as $c_{ini}=n_{RNTI} \cdot 2^{14}+n_f \bmod 2 \cdot 2^{13}+[n_s/2]+N_{ID}^{Ncell}$. In this case, $n_s$ is the first slot of codeword transmission. In the case of NPUSCH repetition, a scrambling sequence is re-initialized as $n_s$ and n f configured as the first slot and a frame, respectively, used for repetition transmission after all $M_{identical}^{PUSCH}$ codeword transmission according to the above equation. Quantity $M_{identical}^{NPUSCH}$ is provided by Paragraph 10.1.3.6 of TS36.211.

Table 5 specifies modulation mappings applicable to narrowband physical uplink shared channel.

TABLE 5

| NPUSCH format | $N_{sc}^{RU}$ | Modulation method |
|---|---|---|
| 1 | 1 | BPSK, QPSK |
|  | >1 | QPSK |
| 2 | 1 | BPSK |

An NPUSCH may be mapped to one or more resource units $N_{RU}$, such as that provided by Paragraph 3GPP TS 36.213. The one or more resource units are transmitted $M_{rep}^{NPUSCH}$ times.

In order to follow transmit power $P_{NPUSCH}$ defined in 3GPP TS 36.213, the block $z(0), \ldots, z(M_{rep}^{NPUSCH}-1)$ of complex-value symbols is multiplied by a size scaling element $\beta_{NPUSCH}$, and is mapped to subcarriers allocated for the transmission of an NPUSCH as a sequence that starts from z(0). Mapping to a resource element (k, 1) allocated for transmission and corresponding to subcarriers not used for the transmission of reference signals becomes an increment sequence of an index k, a subsequent index l starting from the first slot of an allocated resource unit.

Prior to continuous mapping to the following slot of z(•) after $N_{slots}$ slot mapping, $N_{slots}$ slots are repeated as an $M_{identical}^{NPUSCH}-1$ additional number. In this case, Equation 1 is as follows:

$$M_{identical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases} \quad \text{[Equation 1]}$$

$$N_{slots} = \begin{cases} 1 & \Delta f = 3.75 \text{ kHz} \\ 2 & \Delta f = 15 \text{ kHz} \end{cases}$$

If mapping to an $N_{slots}$ slot or the repetition of the mapping includes a resource element overlapping a given configured NPRACH resource according to NPRACH-ConfigSIB-NB, the NPUSCH transmission of the overlapped $N_{slots}$ slots is postponed until next $N_{slots}$ slots do not overlap a given configured NPRACH resource.

Mapping of $z(0), \ldots, z(M_{rep}^{NPUSCH}-1)$ is repeated until $M_{rep}^{NPUSCH}N_{RU}N_{slots}^{UL}$ slots are transmitted. After transmissions and/or postponements by an NPRACH of a $256 \cdot 30720 T_s$ time unit, if NPUSCH transmission is postponed, the gap of a $40 \cdot 30720 T_s$ time unit is inserted. The postponement part attributable to an NPRACH matched with the gap is counted as part of the gap.

If a higher layer parameter npusch-AllSymbols is configured to be false, the resource elements of an SC-FDMA symbol overlapping a symbol configured as an SRS according to srs-SubframeConfig is calculated as NPUSCH mapping, but is not used for the transmission of an NPUSCH. If the higher layer parameter npusch-AllSymbols is configured to be true, all symbols are transmitted.

Uplink control information on an NPUSCH without UL-SCH data 1 bit information of HARQ-ACK $o_0^{ACK}$ or is coded according to Table 6. In this case, $o_0^{ACK}=1$ with respect to ACK, and $o_0^{ACK}=0$ with respect to NACK.

Table 6 shows an example of HARQ-ACK codewords.

TABLE 6

| HARQ-ACK | HARQ-ACK |
|---|---|
| $<o_0^{ACK}>$ | $<b_0, b_1, b_2, \ldots, b_{15}>$ |
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

In an NB-IoT UL slot i for a serving cell, UE transmit power for NPUSCH transmission is provided like Equations 2 and 3.

When the repetition number of allocated NPUSCH RUs is greater than 2, $$P_{NPUSCH,c}(i) = P_{CMAX,c}(i) \text{ [dBm]} \quad \text{[Equation 2]}$$

Otherwise, $$P_{NPUSCH,c}(i) = \min \begin{cases} P_{CMAX,c}(i), \\ 10\log_{10}(M_{NPUSCH,c}(i)) + \\ P_{O\_NPUSCH,c}(j) + \alpha_c(j) \cdot PL_c \end{cases}_{[dbm]} \quad \text{[Equation 3]}$$

In this case, $P_{CMAX,c}(i)$ is configured UE transmit power defined in 3GPP TS36.101 in an NB-IoT UL slot i with respect to a serving cell c.

$M_{NPUSCH,c}$ is {¼} with respect to 3.75 kHz subcarrier spacing, and is {1,3,6,12} to with respect to 15 kHz subcarrier spacing.

$P_{O\_NPUSCH,c}(j)$ has the sum of a component $P_{O\_NOMINAL\_NPURCH,c}(j)$ provided by higher layers with respect to the serving cell c and a component $P_{O\_UE\_NPUSCH,c}(i)$ provided by higher layers with respect to j=1. In this case, j∈{1, 2}. j=1 with respect to NPUSCH (re)transmissions corresponding to a dynamic-scheduled grant, and j=2 with respect to NPUSCH (re)transmissions corresponding to a random access response grant.

$P_{O\_UE\_NPUSCH,c}(2)=0$ and $P_{O\_NORMINAL\_NPUSCH,c}(2)=P_{O\_PRE}+\Delta_{PREAMBLE\_Msg3}$. In this case, parameters preambleInitialReceivedTargetPower $P_{O\_PRE}$ and $\Delta_{PREAMBLE\_Msg3}$ are signaled from higher layers with respect to the serving cell c.

With respect to j=1, $\alpha_c(j)=1$ is provided by higher layers with respect to the NPUSCH format 2; $\alpha_c(j)$ is provided by higher layers with respect to the NPUSCH format 1 with respect to the serving cell c. $\alpha_c(i)=1$ with respect to j=2.

$PL_c$ is downlink pathloss estimation calculated in dB by a UE with respect to the serving cell c, and $PL_c$=nrs-Power+nrs-PowerOffsetNonAnchor—higher layer-filtered NRSRP. In this case, nrs-Power is provided by higher layers and lower Paragraph 16.2.2 of 3GPP 36.213. If nrs-powerOffsetNonAnchor is not provided by higher layers, it is set to zero. NRSRP is defined in 3GPP TS 36.214 with respect to the serving cell c, and a higher layer filter configuration is defined in 3GPP TS 36.331 with respect to the serving cell c.

When a UE transmits an NPUSCH in an NB-IoT UL slot i with respect to the serving cell c, a power headroom is calculated using Equation 4.

$$PH_c(i)=P_{CMAX,c}(i)-\{P_{O\_NPUSCH,c}(1)+\alpha_c(1)\cdot PL_c\} \text{ [dB]} \quad \text{[Equation 4]}$$

UE Procedure for Transmitting Format 1 NPUSCH

When an NPDCCH having the DCI format N0 ended in an NB-IoT DL subframe n for a UE is detected in a given serving cell, the UE performs corresponding NPUSCH transmission using the NPUSCH format 1 in N contiguous NB-IoT UL slots $n_i$, that is, =0, 1, ..., N-1, based on NPDCCH information at the end of an n+$k_0$ DL subframe. In this case, The subframe n is the last subframe in which the NPDCCH is transmitted, and is determined by the start subframe of the NPDCCH transmission and the DCI subframe repetition number field of corresponding DCI. Furthermore, $N=N_{Rep}N_{RU}N_{slots}^{UL}$. In this case, the value of $N_{Rep}$ is determined by the repetition number field of the corresponding DCI. The value of $N_{RU}$ is determined by the resource allocation field of the corresponding DCI. The value of $N_{slots}^{UL}$ is the number of NB-IoT UL slots of a resource unit corresponding to the number of subcarriers allocated in the corresponding DCI.

$n_0$ is the first NB-IoT UL slot that starts after the end of the subframe n+$k_0$.

The value of $k_0$ is determined by the scheduling delay field ($I_{Delay}$) of the corresponding DCI according to Table 7.

Table 7 shows an example of k0 for the DCI format N0.

TABLE 7

| $I_{Delay}$ | $k_0$ |
|---|---|
| 0 | 8 |
| 1 | 16 |
| 2 | 32 |
| 3 | 64 |

Resource allocation information of an uplink DCI format N0 for NPUSCH transmission is indicated by a scheduled UE.

Set of contiguously allocated subcarriers ($n_{sc}$) of a resource unit determined by the subcarrier indication field of corresponding DCI Multiple resource units ($N_{RU}$) determined by the resource allocation field of corresponding DCI according to Table 9

Repetition number ($N_{Rep}$) determined by the repetition number field of corresponding DCI according to Table 10

The subcarrier spacing Δf of NPUSCH transmission is determined by the uplink subcarrier spacing field of a narrowband random access response grant according to Lower Paragraph 16.3.3 of 3GPP TS36.213.

In the case of NPUSCH transmission having subcarrier spacing Δf=3.75 kHz, $n_{sc}=I_{sc}$. In this case, $I_{sc}$ is the subcarrier indication field of DCI.

In the case of NPUSCH transmission having subcarrier spacing Δf=15 kHz, the subcarrier indication field ($I_{sc}$) of DCI determines a set of contiguously allocated subcarriers ($n_{sc}$) according to Table 8.

Table 8 shows an example of subcarriers allocated to an NPUSCH having Δf=15 kHz.

TABLE 8

| Subcarrier indication field ($I_{sc}$) | Set of allocated subcarriers ($n_{sc}$) |
|---|---|
| 0-11 | $I_{sc}$ |
| 12-15 | 3($I_{sc}$ − 12) + {0, 1, 2} |
| 16-17 | 6($I_{sc}$ − 16) + {0, 1, 2, 3, 4, 5} |
| 18 | {0, 1, 2, 3, 4, 5, 6, 7, 8, 9, 10, 11} |
| 19-63 | Reserved |

Table 9 shows an example of the number of resource units for an NPUSCH.

TABLE 9

| $I_{RU}$ | $N_{Ru}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 10 shows an example of the repetition number of an NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

A reference signal sequence $\bar{r}_u(n)$ for $N_{sc}^{RU}=1$ is defined by Equation 5.

$$\bar{r}_u(n) = \frac{1}{\sqrt{2}}(1+j)(1-2c(n))w(n \bmod 16),$$

$$0 \le n < M_{rep}^{NPUSCH} N_{RU} N_{slots}^{UL}$$
[Equation 5]

In this case, the binary sequence c(n) is defined by 7.2 of TS36.211, and needs to be initialized as $c_{init}=35$ when NPUSCH transmission starts. The value w(n) is provided by Table 1-11. In this case, when group hopping is not enabled with respect to the NPUSCH format 1, $u=N_{ID}^{Ncell} \bmod 16$ for the NPUSCH format 2. When group hopping is enabled with respect to the NPUSCH format 1, the value w(n) is provided by Paragraph 10.1.4.1.3 of 3GPP TS36.211.

Table 11 shows an example of w(n).

TABLE 11

| u | w(0), . . . , w(15) |
|---|---|
| 0  | 1  1  1  1   1  1  1  1   1  1  1  1   1  1  1  1 |
| 1  | 1 −1  1 −1   1 −1  1 −1   1 −1  1 −1   1 −1  1 −1 |
| 2  | 1  1 −1 −1   1  1 −1 −1   1  1 −1 −1   1  1 −1 −1 |
| 3  | 1 −1 −1  1   1 −1 −1  1   1 −1 −1  1   1 −1 −1  1 |
| 4  | 1  1  1  1  −1 −1 −1 −1   1  1  1  1  −1 −1 −1 −1 |
| 5  | 1 −1  1 −1  −1  1 −1  1   1 −1  1 −1  −1  1 −1  1 |
| 6  | 1  1 −1 −1  −1 −1  1  1   1  1 −1 −1  −1 −1  1  1 |
| 7  | 1 −1 −1  1  −1  1  1 −1   1 −1 −1  1  −1  1  1 −1 |
| 8  | 1  1  1  1   1  1  1  1  −1 −1 −1 −1  −1 −1 −1 −1 |
| 9  | 1 −1  1 −1   1 −1  1 −1  −1  1 −1  1  −1  1 −1  1 |
| 10 | 1  1 −1 −1   1  1 −1 −1  −1 −1  1  1  −1 −1  1  1 |
| 11 | 1 −1 −1  1   1 −1 −1  1  −1  1  1 −1  −1  1  1 −1 |
| 12 | 1  1  1  1  −1 −1 −1 −1  −1 −1 −1 −1   1  1  1  1 |
| 13 | 1 −1  1 −1  −1  1 −1  1  −1  1 −1  1   1 −1  1 −1 |
| 14 | 1  1 −1 −1  −1 −1  1  1  −1 −1  1  1   1  1 −1 −1 |
| 15 | 1 −1 −1  1  −1  1  1 −1  −1  1  1 −1   1 −1 −1  1 |

A reference signal sequence for the NPUSCH format 1 is provided by Equation 6.

$$r_u(n) = \bar{r}_u(n)$$
[Equation 6]

A reference signal sequence for the NPUSCH format 2 is provided by Equation 7.

$$r_u(3n+m) = \bar{w}(m)\bar{r}_u(n), m=0,1,2$$
[Equation 7]

In this case, w(m) is defined as Table 5.5.2.2.1-2 of 3GPP TS36.211 having a sequence index selected based on $$\left(\sum_{i=0}^{7} c(8n_s + i)2^i\right) \bmod 3$$

with $c_{init}=N_{ID}^{Ncell}$.

A reference signal sequences $r_u(n)$ for $N_{sc}^{RU}>1$ is defined by the cyclic shift α of a base sequence according to Equation 8.

$$r_u(n) = e^{j\alpha n} e^{j\phi(n)\pi/4}, 0 \le n < N_{sc}^{RU}$$
[Equation 8]

In this case, φ(n) is provided by Table 10.1.4.1.2-1 with respect to $N_{sc}^{RU}=3$, is provided by Table 12 with respect to $N_{sc}^{RU}=6$, and is provided by Table 13 with respect to $N_{sc}^{RU}=12$.

When group hopping is not enabled, a base sequence index u is provided by higher layer parameters threeTone-BaseSequence, sixTone-BaseSequence, and twelveTone-BaseSequence, respectively, with respect to $N_{sc}^{RU}=3$, $N_{sc}^{RU}=6$, and $N_{s}^{RU}c=12$. When group hopping is not signaled by higher layers, a base sequence is provided by Equation 9.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases}$$

When group hopping is enabled, the base index u is provided by Paragraph 10.1.4.1.3 of 3GPP TS36.211.

A cyclic shift for $N_{sc}^{RU}=3$ and $N_{sc}^{RU}=6$, as defined in Table 14, are derived from respective higher layer parameters threeTone-CyclicShift and sixTone-CyclicShift. α=0 for $N_{sc}^{RU}=12$.

Table 12 is a table showing an example of φ(n) for $N_{sc}^{RU}=3$

TABLE 12

| u | φ(0), φ(1), φ(2) | | |
|---|---|---|---|
| 0  | 1 | −3 | −3 |
| 1  | 1 | −3 | −1 |
| 2  | 1 | −3 |  3 |
| 3  | 1 | −1 | −1 |
| 4  | 1 | −1 |  1 |
| 5  | 1 | −1 |  3 |
| 6  | 1 |  1 | −3 |
| 7  | 1 |  1 | −1 |
| 8  | 1 |  1 |  3 |
| 9  | 1 |  3 | −1 |
| 10 | 1 |  3 |  1 |
| 11 | 1 |  3 |  3 |

Table 13 is a table showing another example of φ(n) for $N_{sc}^{RU}=6$.

TABLE 13

| u | φ(0), . . . , φ(5) | | | | | |
|---|---|---|---|---|---|---|
| 0 |  1 |  1 |  1 |  1 |  3 | −3 |
| 1 |  1 |  1 |  3 |  1 | −3 |  3 |
| 2 |  1 | −1 | −1 | −1 |  1 | −3 |
| 3 |  1 | −1 |  3 | −3 | −1 | −1 |
| 4 |  1 |  3 |  1 | −1 | −1 |  3 |
| 5 |  1 | −3 | −3 |  1 |  3 |  1 |
| 6 | −1 | −1 |  1 | −3 | −3 | −1 |
| 7 | −1 | −1 | −1 |  3 | −3 | −1 |

TABLE 13-continued

| u | φ(0), ..., φ(5) | | | | | |
|---|---|---|---|---|---|---|
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Table 14 is a table showing an example of α.

TABLE 14

| $N_{sc}^{RU} = 3$ | | $N_{sc}^{RU} = 6$ | |
|---|---|---|---|
| 3 tone - cyclic shift (threeTone-CyclicShift) | α | 6 tone - cyclic shift (sixTone-CyclicShift) | α |
| 0 | 0 | 0 | 0 |
| 1 | 2π/3 | 1 | 2π/6 |
| 2 | 4π/3 | 2 | 4π/6 |
|  |  | 3 | 8π/6 |

For a reference signal for the NPUSCH format 1, sequence-group hopping may be enabled. In this case, the sequence-group number u of the slot $n_s$ is defined by a group hopping pattern $f_{gh}(n_s)$ and a sequence-shift pattern $f_{ss}$ according to Equation 10.

$$u=(f_{gh}(n_s)+f_{ss}) \bmod N_{seq}^{RU} \quad \text{[Equation 10]}$$

In this case, the number of reference signal sequences, $N_{seq}^{RU}$ available for each resource unit size is provided by Table 15.

Table 15 shows an example of $N_{seq}^{RU}$.

TABLE 15

| $N_{sc}^{RU}$ | $N_{seq}^{RU}$ |
|---|---|
| 1 | 16 |
| 3 | 12 |
| 6 | 14 |
| 12 | 30 |

Sequence-group hopping is enabled or disabled by cell-specific parameters groupHoppingEnabled provided by higher layers. Sequence group hopping for an NPUSCH may be disabled by a specific UE through a higher-layer parameter groupHoppingDisabled unless NPUSCH transmission corresponds to the retransmission of the same transport block or a random access response grant as part of a contention-based random access procedure.

A group hopping pattern $f_{gh}(n_s)$ is provided by Equation 11.

$$f_{gh}(n_s) = (\Sigma_{i=0}^{7} c(8n'_s+i) \cdot 2^i) \bmod N_{seq}^{RU} \quad \text{[Equation 11]}$$

In this case, $n'_s=n_s$ for $N_{sc}^{RU}>1$, and $n'_s$ is the slot number of the first slot of a resource unit. The pseudo-random sequence c(i) is defined by Paragraph 7.2.

The pseudo-random sequence generator is initialized as $$c_{init} = \left\lfloor \frac{N_{ID}^{Ncell}}{N_{seq}^{RU}} \right\rfloor$$

at the start of a resource unit with respect to $N_{sc}^{RU}=1$ and in each even-numbered slot with respect to $N_{sc}^{RU}>1$.

A sequence-shift pattern $f_{ss}$ is provided by Equation 12.

$$f_{ss}=(N_{ID}^{cell}+\Delta_{ss}) \bmod N_{seq}^{RU} \quad \text{[Equation 12]}$$

In this case, $\Delta_{ss} \in \{0,1,\ldots,29\}$ is provided by a higher-layer parameter groupAssignmentNPUSCH. If the value is not signaled, $\Delta_{ss}=0$.

A sequence r(•) needs to be multiplied by a size scaling factor $\beta_{NPUSCH}$ and needs to be mapped to subcarriers as a sequence that starts as r(0)

A set of subcarriers used for a mapping process needs to be the same as corresponding NPUSCH transmission defined in Paragraph 10.1.3.6 of 3GPP 36.211.

In mapping to resource elements (k,l), an increment sequence of the slot number needs to be the first k, subsequently l, and the last. The values of the symbol index l within the slot are provided in Table 16.

Table 16 shows an example of demodulation reference signal locations for an NPUSCH.

TABLE 16

| NPUSCH format | Values for l | |
|---|---|---|
|  | Δf = 3.75 kHz | Δf = 15 kHz |
| 1 | 4 | 3 |
| 2 | 0, 1, 2 | 2, 3, 4 |

SF-FDMA Baseband Signal Generation

With respect to $N_{sc}^{RU}>1$, the time-contiguous signal $s_l(t)$ of an SC-FDMA symbol l within a slot is defined by Paragraph 5.6 as a value $N_{RB}^{UL}N_{sc}^{RB}$ substituted with $N_{sc}^{UL}$.

With respect to $N_{sc}^{RU}=1$, the time-contiguous signal $s_{k,l}(t)$ for the subcarrier index k of an SC-FDMA symbol l within an uplink slot is defined by Equation 13.

$$s_{k,l}(t) = a_{k^{(-)},l} \cdot e^{j\phi_{k,l}} \cdot e^{j2\pi(k+1/2)\Delta f(t-N_{CP,l}T_s)}$$

$$k^{(-)} = k + \lfloor N_{sc}^{UL}/2 \rfloor$$

$0 \leq t < (N_{CP,l}+N)T_s$. In this case, parameters for Δf=15 kHz and Δf=3.75 kHz are provided by Table 17. $a_{k^{(-)},l}$ is the modulation value of the symbol l, and phase rotation $\varphi_{k,l}$ is defined by Equation 14.

$$\varphi_{k,l} = \rho(\tilde{l} \bmod 2) + \hat{\varphi}_k(\tilde{l}) \quad \text{[Equation 14]}$$

$$\rho = \begin{cases} \frac{\pi}{2} & \text{for BPSK} \\ \frac{\pi}{4} & \text{for QPSK} \end{cases}$$

$$\hat{\varphi}_k(\tilde{l}) = \begin{cases} 0 & \tilde{l} = 0 \\ \hat{\varphi}_k(\tilde{l}-1) + 2\pi\Delta f(k+1/2)(N+N_{CP,l})T_s & \tilde{l} > 0 \end{cases}$$

$\tilde{l} = 0, 1, \ldots, M_{rep}^{NPUSCH}N_{RU}N_{slots}^{UL}N_{symb}^{UL} - 1$ $l = \tilde{l} \bmod N_{symb}^{UL}$ In this case, $\tilde{l}$ is a symbol counter reset when transmission starts, and is increased with respect to each symbol during transmission.

Table 17 shows an example of SC-FDMA parameters for $N_{sc}^{RU}=1$.

TABLE 17

| Parameter | Δf = 3.75 kHz | Δf = 15 kHz |
|---|---|---|
| N | 8192 | 2048 |
| Cyclic prefix length | 256 | 160 for l = 0 |
| $N_{CP, l}$ | | 144 for l = 1, 2, . . . , 6 |
| Set of values for k | −24, −23, . . . , 23 | −6, −5, . . . , 5 |

SC-FDMA symbols within a slot need to start at l=0 and to be transmitted in an increment sequence of l. In this case, an SC-FDMA symbol l>0 starts at time $\Sigma_{l'=0}^{l-1}(N_{CP,l'}+N)T_s$ within the slot. With respect to Δf=3.75 kHz, $2304T_s$ within $T_{slot}$ is not transmitted and is used for a guard period.

Narrowband physical random access channel (NPRACH)

A physical layer random access preamble is based on a single-subcarrier frequency-hopping symbol group. A symbol group is shown as a random access symbol group of FIG. 1-8, and has a cyclic prefix having a length of $T_{CP}$ and a sequence of 5 identical symbols having a total length of $T_{SEQ}$. Parameter values are listed in Table 18. The parameter values are listed as random access preamble parameters of Table 18.

FIG. 7 shows an example of a random access symbol group.

Table 18 shows an example of random access preamble parameters.

TABLE 18

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

A preamble including 4 symbol groups transmitted without a gap is transmitted $N_{rep}^{NPRACH}$ times.

When a random access preamble is triggered by a MAC layer, the transmission of the random access preamble is limited to specific time and frequency domains.

An NPRACH configuration provided by higher layers includes the follows.

NPRACH resource periodicity $N_{period}^{NPRACH}$,

Frequency location $N_{scoffset}^{NPRACH}$ (nprach-Subcarrier-Offset) of a first subcarrier allocated to an NPRACH, The number of subcarriers $N_{sc}^{NPRACH}$ (nprach-NumSubcarriers) allocated to an NPRACH, The number of start subcarriers $N_{sc\_cont}^{NPRACH}$ (nprach-NumCBRA-StartSubcarriers) allocated to contention-based NPRACH random access NPRACH repetition number $N_{start}^{NPRACH}$ per attempt (nprach-StartTime), NPRACH start time $NN_{start}^{NPRACH}$ (nprach-StartTime), Fraction $NN_{MSG3}^{NPRACH}$ (nprach-SubcarrierMSG3-RangeStart) for calculating a start subcarrier index for an NPRACH subcarrier range reserved for the indication of UE support to multi-tone msg3 transmission NPRACH transmission may start a $N_{start}^{NPRACH} \cdot 30720T_s$ time unit after the start of a radio frame that fulfills $n_f \mod(N_{period}^{NPRACH}/10)=0$. After the transmission of a 4·64 $(T_{CP}+T_{SEQ})$, the gap of a $40 \cdot 30720T_s$ time unit is inserted.

NPRACH configurations, that is, $N_{scoffset}^{NPRACH}+N_{sc}^{NPRACH}>N_{sc}^{UL}$, are not valid.

NPRACH start subcarriers allocated to contention-based a random access are divided into two sets of subcarriers {0, 1, . . . , $N_{sc_{cont}}^{NPRACH}N_{MSG3}^{NPRACH}-1$} and {$N_{sc\_cont}^{NPRACH}N_{MSG3}^{NPRACH}$, . . . ,$N_{sc_{cont}}^{NPRACH}-1$}. In this case, if present, the second set indicates UE support for multi-tone msg3 transmission.

The frequency location of NPRACH transmission is restricted within an $N_{sc}^{RA}=12$ subcarrier. Frequency hopping is used within 12 subcarriers. In this case, the frequency location of an $i^{th}$ symbol group is provided by $n_{sc}^{RA}(i)=n_{start}+\tilde{n}_{sc}^{RA}(i)$. In this case, $n_{start}=N_{scoffset}^{NPRACH}+\lfloor n_{init}/N_{sc}^{RA}\rfloor \cdot N_{sc}^{RA}$, and Equation 15 is as follows.

$$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$ [Equation 15]

$$f(t) = \left(f(t-1) + \left(\sum_{n=10t+1}^{10t+9} c(n)2^{n-(10t+1)}\right) \bmod (N_{sc}^{RA}-1) + 1\right) \bmod N_{sc}^{RA}$$

$$f(-1) = 0$$

In this case, $\tilde{n}_{SC}^{RA}(0)=n_{init} \bmod N_{sc}^{RA}$ having $n_{init}$ is a subcarrier selected by the MAC layer from {0,1, . . . , $N_{sc}^{NPRACH}-1$}. A pseudo-random sequence c(n) is provided by Paragraph 7.2 of GPP TS36.211. A pseudo-random sequence generator is initialized as $c_{init}=N_{ID}^{Ncell}$.

A time-contiguous random access signal $s_i(t)$ for a symbol group i is defined by Equation 16.

$$s_i(t) = \beta_{NPRACH}e^{j2\pi(n_{SC}^{RA}(i)+Kk_0+1/2)\Delta f_{RA}(t-T_{CP})}$$ [Equation 16]

In this case, $0 \leq t < T_{SEQ}+T_{CP}$. $\beta_{NPRACH}$ is a size scaling factor for following transmit power $P_{NPRACH}$ defined in Paragraph 16.3.1 of 3GPP TS 36.213. $k_0=-N_{sc}^{UL}/2$, $K=\Delta f/\Delta f_{RA}$ describes the difference of subcarrier spacing between a random access preamble and uplink data transmission. The location of the frequency domain controlled by a parameter $n_{sc}^{RA}(i)$ is derived from Paragraph 10.1.6.1 of 3GPP TS36.211. The variable $\Delta f_{RA}$ is provided by Table 19.

Table 19 shows an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements that carry information generated from higher layers, and is an interface defined between 3GPP TS 36.212 and 3GPP TS 36.211.

The following downlink physical channels are defined.
Narrowband physical downlink shared channel (NPDSCH)
Narrowband physical broadcast channel (NPBCH)
Narrowband physical downlink control channel (NPDCCH)

A downlink narrowband physical signal corresponds to a set of resource elements used by physical layers, but does not carry information generated from higher layers. The following downlink physical signals are defined:
A narrowband reference signal (NRS)
A narrowband synchronization signal
A narrowband physical downlink shared channel (NPDSCH)

A scrambling sequence generator is initialized as $c_{ini}=n_{RNTI} \cdot 2^{14}+n_f \mod 2 \cdot 2^{13}+\lfloor n_s/2 \rfloor + N_{ID}^{Ncell}$. In this case, $n_s$ is the first slot of codeword transmission. In the case of NPDSCH repetitions and an NPDSCH carrying a BCCH, a scrambling sequence generator is initialized again according to expressions described with respect to each repetition. In the case of the NPDSCH repetitions, when an NPDSCH does not carry a BCCH, a scrambling sequence generator is initialized again according to the above-described expressions after each $\min(M_{rep}^{NPDSCH},4)$ transmission of codeword having $n_s$ and $n_f$ configured as the first slot and frame used for repetition transmission, respectively.

Modulation is performed using a QPSK modulation method.

An NPDSCH may be mapped to one or more subframes $N_{SF}$, as provided by Paragraph 16.4.1.5 of 3GPP TS 36.213. Each of the one or more subframes needs to be transmitted NPDSCH $M_{rep}^{NPDSCH}$ times.

With respect to each antenna port used for the transmission of a physical channel, the blocks $y^{(p)}(0), \ldots y^{(p)}(M_{symb}^{ap}-1)$ of complex-value symbols need to be mapped to resource elements (k,l) satisfying all the following criteria in a current subframe.
A subframe is not used for the transmission of an NPBCH, NPSS or NSSS, and
They are assumed to be not used for an NRS by a UE, and
They do not overlap resource elements used for a CRS (if present), and
The index l of the first slot satisfies $l \geq l_{DataStart}$ in a subframe. In this case, $l_{DataStart}$ is provided by Paragraph 16.4.1.4 of 3GPP TS 36.213.

In a sequence starting at $y^{(p)}(0)$, mapping to the resource elements (k,l) through an antenna port p that satisfies the above criteria of $y^{(p)}(0), y^{(p)}(M_{symb}^{ap}-1)$ is an increment sequence of the first index k and an index l, which start from the first slot of the subframe and end at the second slot. In the case of an NPDSCH not carrying a BCCH, after mapping to a subframe, Before continuing mapping to a next subframe of $y^{(p)}(\cdot)$, $M_{rep}^{NPDSCH}-1$ part for a subframe is repeated with respect to subframes. Thereafter, the mapping of $y^{(p)}(0), \ldots y^{(p)}(M_{symb}^{ap}-1)$ is repeated until $M_{rep}^{NPDSCH}N_{SF}$ subframes are transmitted. In the case of an NPDSCH carrying a BCCH, $y^{(p)}(0), \ldots y^{(p)}(M_{symb}^{ap}-1)$ is mapped to NSF subframes as a sequence and is then repeated until the $M_{rep}^{NPDSCH}N_{SF}$ subframes are transmitted.

NPDSCH transmission may be configured by higher layers as transmission gaps where the NPSDCH transmission is postponed. When $R_{max}<N_{gap,threshold}$, a gap is not present in NPDSCH transmission. In this case, $N_{gap,threshold}$ is provided by a higher layer parameter dl-GapThreshold, and $R_{max}$ is provided by 3GPP TS 36.213. A gap start frame and subframe are provided by $(10n_f+\lfloor n_s/2 \rfloor) \mod N_{gap,period}=0$. In this case, gap periodicity $N_{gap,period}$ is provided by a higher layer parameter dl-GapPeriodicity. Gap duration of a plurality of subframes is provided by $N_{gap,duration}=N_{gap,coeff}N_{gap,period}$. In this case, $N_{gap,coeff}$ is provided by a higher layer parameter dl-GapDurationCoeff. In the case of an NPDSCH carrying a BCCH, transmission gaps are not present.

If a subframe is not an NB-IoT downlink subframe, a UE does not expect an NPDSCH a subframe i other the transmission of an NPDSCH carrying SystemInformationBlock-Type1-NB in a subframe 4. In the case of NPDSCH transmissions, NPDSCH transmission is postponed up to a next NB-IoT downlink subframe in subframes not the NB-IoT downlink subframes.

UE Procedure for Receiving NPDSCH

An NB-IoT UE needs to assume a subframe as an NB-IoT DL subframe in the following case.
A UE determines that a subframe does not include NPSS/NSSS/NPBCH/NB-SIB1 transmission, and
In the case of an NB-IoT carrier in which a higher layer parameter operationModeInfo is received, a UE obtains SystemInformationBlockType1-NB and configures a subframe as an NB-IoT DL subframe.
In the case of an NB-IoT carrier in which DL-Carrier-ConfigCommon-NB is present, a subframe is configured as an NB-IoT DL subframe by downlinkBitmap-NonAnchor, that is, a higher layer parameter.

In the case of an NB-IoT UE supporting twoHARQ-Processes-r14, a maximum of 2 downlink HARQ processes need to be present.

When an NPDCCH having the DCI format N1, N2 ended in a subframe n intended for a UE is detected by a given serving cell, the UE needs to start in a n+5 DL subframe and to decode corresponding NPDSCH transmission of an N contiguous NB-IoT DL subframe(s) having i=0, 1, ..., N−1 for NPDCCH information. In this case, The subframe n is the last subframe in which an NPDCCH is transmitted, and is determined from the start subframe of NPDSCH transmission and the DCI subframe repetition number field of corresponding DCI;
A subframe(s) ni wherein i=0,1, ..., N−1 is N contiguous NB-IoT DL subframe(s) other than subframes used for SI messages. In this case, n0<n1< ..., nN−1,
$N=N_{Rep}N_{SF}$. In this case, the value of $N_{Rep}$ is determined by the repetition number field of corresponding DCI. The value of $N_{SF}$ is determined by the resource allocation field of corresponding DCI.

$k_0$ is the number of NB-IoT DL subframe(s) from a DL subframe n+5 to a DL subframe $n_0$. In this case, $k_0$ is determined by a scheduling delay field ($I_{Delay}$) with respect to the DCI format N1, and is $k_0=0$ with respect to the DCI format N2. In the case of DCI CRC scrambled by a G-RNTI, $k_0$ is determined by a scheduling delay field ($I_{Delay}$) according to Table 21. If not, $k_0$ is determined by a scheduling delay field ($I_{Delay}$) according to Table 20. The value of $R_{m,ax}$ follows Lower in Paragraph 16.6 of 3GPP 36.213 for a corresponding DCI format N1.

Table 20 shows an example of $k_0$ for the DCI format N1.

TABLE 20

| | $k_0$ | |
|---|---|---|
| $I_{Delay}$ | $R_{max} < 128$ | $R_{max} \geq 128$ |
| 0 | 0 | 0 |
| 1 | 4 | 16 |

TABLE 20-continued

| | $k_0$ | |
|---|---|---|
| $I_{Delay}$ | $R_{max} < 128$ | $R_{max} \geq 128$ |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 21 shows an example of $k_0$ for the DCI format N1 having a DCI CRC scrambled by a G-RNTI.

TABLE 21

| $I_{Delay}$ | $k_0$ |
|---|---|
| 0 | 0 |
| 1 | 4 |
| 2 | 8 |
| 3 | 12 |
| 4 | 16 |
| 5 | 32 |
| 6 | 64 |
| 7 | 128 |

After the end of NPUSCH transmission by a UE, the UE does not expect to receive transmissions in 3 DL subframes.

Resource allocation information of the DCI format N1, N2 (paging) for an NPSICH is indicated by a scheduled UE.

Table 22 shows an example of the number of subframes of an NPDSCH. The number of subframes ($N_{SF}$) determined by a resource allocation field ($I_{SF}$) in corresponding DCI according to Table 22.

A repetition number ($N_{Rep}$) determined by the repetition number field ($I_{Rep}$) in corresponding DCI according to Table 23.

TABLE 22

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 23 shows an example of the repetition number of an NPDSCH.

TABLE 23

| $I_{REP}$ | $N_{REP}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The repetition number of an NPDSCH carrying SystemInformationBlockType1-NB is determined based on the parameter schedulingInfoSIB1 configured by higher layers, and follows Table 24.

Table 24 shows an example of the repetition number of an SIB1-NB.

TABLE 24

| Value of schedulingInfoSIB1 | NPDSCH repetition number |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

A start radio frame for the first transmission of an NPDSCH carrying SystemInformationBlockType1-NB is determined according to Table 125.

Table 25 shows an example of a start radio frame for the first transmission of an NPDSCH on which an SIB1-NB is carried.

TABLE 25

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell} \bmod 4 = 0$ | 0 |
| | $N_{ID}^{Ncell} \bmod 4 = 1$ | 16 |
| | $N_{ID}^{Ncell} \bmod 4 = 2$ | 32 |
| | $N_{ID}^{Ncell} \bmod 4 = 3$ | 48 |
| 8 | $N_{ID}^{Ncell} \bmod 2 = 0$ | 0 |
| | $N_{ID}^{Ncell} \bmod 2 = 1$ | 16 |
| 16 | $N_{ID}^{Ncell} \bmod 2 = 0$ | 0 |
| | $N_{ID}^{Ncell} \bmod 2 = 1$ | 1 |

A start OFDM symbol for an NPDSCH is provided by the index $l_{DataStart}$ of the first slot of a subframe k, and is determined as follows.

When the subframe k is a subframe used to receive an SIB1-NB, When the value of the higher layer parameter operationModeInfo is set to '00' or '01', $l_{DataStrart}=3$ Otherwise, $l_{Datastrart}=0$ If not, When the value of a higher layer parameter eutraControlRegionSize is present, $l_{DataStrart}$ is provided by a higher layer parameter eutraControlRegionSize.

Otherwise, $l_{DataStrart}=0$

UE Procedure for Reporting ACK/NACK

When NPDSCH transmission intended for a UE and ended in an NB-IoT subframe n for which ACK/NACK needs to be provided is detected, the use of the NPUSCH format 2 in N contiguous NB-IoT UL slots by the UE needs to be provided and started when n+$k_0$−1 DL subframe transmission of an NPUSCH carrying an ACK/NACK response is ended. In this case, N=$N_{Rep}^{AN} N_{slots}^{UL}$, and the value of $N_{Rep}^{AN}$ is provided by a higher layer parameter ack-NACK-NumRepetitions-Msg4 configured for an NPRACH resource associated with Msg4 NPDSCH transmission and by a higher layer parameter ack-NACK-Num-Repetitions if not. The value of $N_{slots}^{UL}$ is the number of slots within a resource unit.

A subcarrier allocated for ACK/NACK and the value of k0 are determined by the ACK/NACK resource field of the DCI format of a corresponding NPDCCH according to Table 16.4.2-1 and Table 16.4.2-2 of 3GPP TS36.213.

UE Procedure for Reporting ACK/NACK

When NPDSCH transmission intended for a UE and ended in an NB-IoT subframe n for which ACK/NACK needs to be provided is detected, the use of the NPUSCH format 2 in N contiguous NB-IoT UL slots by the UE needs to be provided and started when n+$k_0$−1 DL subframe transmission of an NPUSCH carrying an ACK/NACK response is ended. In this case, N=$N_{Rep}^{AN} N_{slots}^{UL}$, and the value of $N_{Rep}^{AN}$ is provided by a higher layer parameter ack-NACK-NumRepetitions-Msg4 configured for an NPRACH resource associated with Msg4 NPDSCH transmission and by a higher layer parameter ack-NACK-Num-Repetitions if not. The value of $N_{slots}^{UL}$ is the number of slots within a resource unit.

A subcarrier allocated for ACK/NACK and the value of k0 are determined by the ACK/NACK resource field of the DCI format of a corresponding NPDCCH according to Table 16.4.2-1 and Table 16.4.2-2 of 3GPP TS36.213.

Scrambling is performed according to Paragraph 6.6.1 of 3GPP TS 36.211 using $M_{bit}$ indicating the number of bits to be transmitted through an NPBCH. $M_{bit}$ is the same as 1600 with respect to a normal cyclic prefix. A scrambling sequence is initialized as $c_{init}=N_{ID}^{Ncell}$ with respect to radio frames satisfying $n_f$ mod 64=0.

Modulation is performed on each antenna port using a QPSK modulation method, and is transmitted in a subframe 0 during 64 contiguous radio frames that starts at each radio frame satisfying n f mod 64=0.

Layer mapping and precoding are performed according to Paragraph 6.6.3 of 3GPP TS 36.211 wherein P∈{1,2}. A UE assumes that antenna ports $R_{2000}$ and $R_{2001}$ are used for the transmission of a narrowband physical broadcast channel.

The block $y^{(p)}(0), \ldots y^{(p)}(M_{symb}-1)$ of complex-value symbols for each antenna port is transmitted in a subframe 0 during 64 contiguous radio frames that start at each radio frame satisfying n f mod 64=and needs to be mapped to elements (k,l) not reserved for the transmission of reference signals as a sequence starting from contiguous radio frames that start at y(0). An increment sequence is the first index k, and a subsequent index l. After the mapping to a subframe, before continuing to perform mapping to the subframe 0 of $y^{(p)}(\cdot)$ in a subsequent radio frame, the subframe is repeated to the subframe 0 in 7 subsequent radio frames. The first three OFDM symbols of the subframe are not used in the mapping process. For the mapping purpose, a UE assume narrowband reference signals for antenna ports 2000 and 2001 present regardless of an actual configuration and cell-specific reference signals for antenna ports 0-3. The frequency shift of the cell-specific reference signals is calculated by substituting cell $N_{ID}^{cell}$ with $N_{ID}^{NCell}$ in the calculation of $v_{shift}$ of Paragraph 6.10.1.2 of 3GPP TS 36.211.

Narrowband Physical Downlink Control Channel (NPDCCH)

A narrowband physical downlink control channel carries control information. A narrowband physical control channel is transmitted through one or an aggregation of two contiguous narrowband control channel elements (NCCEs). In this case, a narrowband control channel element corresponds to 6 contiguous subcarriers in a subframe. In this case, an NCCE 0 occupies subcarriers 0 to 5, and an NCCE 1 occupies subcarriers 6 to 11. An NPDCCH supports several formats listed in Table 1-26. In the case of the NPDCCH format 1, all NCCEs belong to the same subframe. is One or two NPDCCHs may be transmitted within a subframe.

Table 26 shows an example of supported NPDCCH formats.

TABLE 26

| NPDCCH format | Number of NCCEs |
|---|---|
| 0 | 1 |
| 1 | 2 |

Scrambling needs to be performed according to Paragraph 6.8.2 of TS36.211. is A scrambling sequence needs to be initialized at the start of a subframe $k_0$ according to Paragraph 16.6 of TS36.213 after every fourth NPDCCH subframe having $c_{init}=\lfloor n_s/2 \rfloor 2^9 + N_{ID}^{cell}$. In this case, $n_s$ is the first slot of an NPDCCH subframe in which scrambling is (re-) initialized.

Modulation is performed using a QPSK modulation method according to Paragraph 6.8.3 of TS36.211.

Layer mapping and precoding is performed according to Paragraph 6.6.3 of TS36.211 using the same antenna port as that of an NPBCH.

The block $y(0), \ldots y(M_{symb}-1)$ of complex-value symbols is mapped as resource elements (k,l) in a sequence that starts at y(0) through associated antenna ports that satisfy all the following criteria:

They are the part of an NCCE(s) allocated for NPDCCH transmission, and

They are assumed to be not used for the transmission of an NPBCH, NPSS, or NSSS, and They are assumed to be not used for an NRS by a UE, and They do not overlap resource elements used for a PBCH, PSS, SSS, or CRS as defined in Paragraph 6 of TS36.211 (if present), and The index l of the first slot of a subframe satisfies l≥$l_{NPDCCHStart}$. In this case, $l_{NPDCCHStart}$ is provided by Paragraph 16.6.1 of 3GPP TS 36.213.

Mapping to a resource elements (k, l) through an antenna port p satisfying the above-described criteria is an increment sequence of the first index k, a subsequent index l that start from the first slot of a subframe and end at the second slot.

NPDCCH transmission may be configured by higher layers having transmission gaps where NPDCCH transmission is postponed. A configuration is the same as that described with respect to the NPDSCH of Paragraph 10.2.3.4 of TS36.211.

If a subframe is not an NB-IoT downlink subframe, a UE does not expect an NPDCCH in a subframe i. In the case of NPDCCH transmissions, NPDCCH transmissions are postponed up to an NB-IoT downlink subframe in subframes not NB-IoT downlink subframes.

DCI Format

DCI Format N0

The DCI format N0 is used for the scheduling of an NPUSCH in one UL cell. The following information is transmitted by the DCI format N0.

Flag for format N0/format N1 distinction (1 bit), subcarrier indication (6 bits), resource allocation (3 bits), scheduling delay (2 bits), modulation and coding method (4 bits), redundancy Version (1 bit), a repetition number (3 bits), a new data indicator (1 bit), a DCI subframe repetition number (2 bits)

DCI Format N1

The DCI format N1 is used for the scheduling of one NPDSCH codeword and a random access procedure initiated by an NPDCCH sequence in one cell. DCI corresponding to the NPDCCH sequence is carried by an NPDCCH. The following information is transmitted by the DCI format N1:

Flag for format N0/format N1 distinction (1 bit), NPDCCH sequence indicator (1 bit)

The format N1 is used for a random access procedure initiated by an NPDCCH sequence only when an NPDCCH sequence indicator is set to "1", a format N1 CRC is scrambled as a C-RNTI, and the remaining all fields are configured as follows:

The start number of NPRACH repetitions (2 bits), subcarrier indication (6 bits) of an NPRACH, and all the remaining bits of the format N1 are set to 1.

Otherwise,

Scheduling delay (3 bits), resource allocation (3 bits), a modulation and coding method (4 bits), a repetition number (4 bits), a new data indicator (1 bit), an HARQ-ACK resource (4 bits), a DCI subframe repetition number (2 bits)

When a format N1 CRC is scrambled as an RA-RNTI, the following field of the above fields is reserved.

A new data indicator, HARQ-ACK resource

When the number of information bits of the format N1 is smaller than the number of information bits of the format N0, zero is attached to the format N1 until a payload size becomes identical with that of the format N0.

DCI Format N2

The DCI format N2 is used for paging and direct indication. The following information is transmitted by the DCI format N2.

A flag (1 bit) for paging/direct indication distinction
where flag=0:
Direct indication information (8 bit), reservation information bits are added until the size becomes the same size as the size of the format N2 where flag=1.
where flag=1:
Resource allocation (3 bits), a modulation and coding method (4 bits), a repetition number (4 bits), a DCI subframe repetition number (3 bits)

NPDCCH-Related Procedure

A UE needs to monitor an NPDCCH candidate set configured by higher layer signaling for control information. In this case, the monitoring means that an attempt is made to decode each of NPDCCHs within a set according to all monitored DCI formats.

An NPDCCH search space $NS_k^{(L',R)}$ within an aggregation level $L' \in \{1, 2\}$ and a repetition level $R \in \{1, 2, 4, 8, 16, 32, 64, 128, 256, 512, 1024, 2048\}$ is defined by a set of NPFCCH candidates. In this case, each candidate is repeated as a set of R contiguous NB-IoT downlink subframes other than subframes used for the transmission of SI messages that start in a subframe k.

The location of the start subframe k is provided by $k=k_b$. In this case, $k=k_b$ is a b-th contiguous NB-IoT DL subframe in a subframe k0 other than subframes used for the transmission of SI messages $b=u \cdot R$, $u=0, 1, \ldots,$ $$\frac{R_{max}}{R} - 1,$$

and the subframe k0 is a subframe that satisfies a condition $(10n_f+\lfloor n_s/2 \rfloor) \mod T) = \lfloor \alpha_{offset} \cdot T \rfloor$. In this case, $T=R_{max} \cdot G$, $T \geq 4$. G and $\alpha_{offset}$ are provided by a higher layer parameter.

With respect to a type 1-NPDCCH common search space, k=k0, and is determined from the locations of NB-IoT paging opportunity subframes.

When a UE is configured as an NB-IoT carrier by higher layers in order to monitor an NPDCCH UE-specific search space, The UE monitors the NPDCCH UE-specific search space through the NB-IoT carrier configured by higher layers, The UE does not expect to receive an NPSS, NSSS, NPBCH through the NB-IoT carrier configured by higher layers.

Otherwise,

The UE monitors the NPDCCH UE-specific search space through the same NB-IoT carrier in which an NPSS/NSSS/NPBCH has been detected.

In the first slot of a subframe k, a start OFDM symbol for an NPDCCH provided by an index $l_{NPDCCHStart}$ is determined as follows.

If a higher layer parameter eutraControlRegionSize is present, $l_{NPDCCHStart}$ is provided by a higher layer parameter eutraControlRegionSize.

Otherwise, $l_{NPDCCHStart}=0$

Narrowband Reference Signal (NRS)

Before a UE obtains operationModeInfo, the UE may assume that narrowband reference signals are transmitted in a subframe #9 not including an NSSS and in subframes #0 and #4.

When the UE receives the higher layer parameter operationModeInfo indicating a guard band or standalone, Before the UE obtains SystemInformationBlockType1-NB, the UE may assume that narrowband reference signals are transmitted in a subframe #9 not including an NSSS and subframes #0, #1, #3, #4.

After the UE obtains SystemInformationBlockType1-NB, the UE may assume that narrowband reference signals are transmitted in the subframe #9 not including an NSSS, the subframes #0, #1, #3, #4, and an NB-IoT downlink subframe, and does not expect narrowband reference signals in other downlink subframes.

When a UE receives a higher layer parameter operationModeInfo indicating inband-SamePCI or inband-DifferentPCI, Before the UE obtains SystemInformationBlockType1-NB, the UE may assume that narrowband reference signals are transmitted in a subframe #9 not including an NSSS and subframes #0, #4.

After the UE obtains SystemInformationBlockType1-NB, the UE may assume is that narrowband reference signals are transmitted in the subframe #9 not including an NSSS, the subframes #0, #4, and an NB-IoT downlink subframe, and does not expect narrowband reference signals in other downlink subframes.

Narrowband Primary Synchronization Signal (NPSS)

A sequence $d_l(n)$ used for a narrowband primary synchronization signal is generated from the Zadoff-Chu sequence of a frequency domain according to Equation 17.

$$d_l(n) = S(l) \cdot e^{-j\frac{\pi u n(n+1)}{11}}, n = 0, 1, \cdots, 10 \quad \text{[Equation 17]}$$

In this case, a Zadoff-Chu root sequence index u=5 and S(l) for different symbol indices l is provided in Table 27.

Table 27 shows an example of S(l).

TABLE 27

| Cyclic prefix length | S(3), . . . , S(13) |
|---|---|
| Normal | 1  1  1  1  −1  −1  1  1  1  −1  1 |

The same antenna port needs to be used for all the symbols of a narrowband primary synchronization signal within a subframe.

A UE should not assume that a narrowband primary synchronization signal is transmitted through the same antenna port as a given downlink reference signal. The UE should not assume that the transmissions of a narrowband primary synchronization signal in a given subframe use the same antenna port or ports as a narrowband primary synchronization signal in given other subframes.

A sequences $d_l(n)$ needs to be mapped to resource elements (k, l) as an increment sequence of the first index k=0, 1, . . . , $N_{sc}^{RB}$−2 and a subsequent index=3, 4, . . . , $2N_{symb}^{DL}$−1 in a subframe 5 within all radio frames. With respect to resource elements (k,l) overlapping resource elements in which a cell-specific reference signals is transmitted, a corresponding sequence element d(n) is not used for an NPSS, but is counted as a mapping process.

Narrowband Secondary Synchronization Signals (NSSS)

A sequence d(n) used for a narrowband secondary synchronization signal is generated from a frequency domain Zadoff-Chu sequence according to Equation 18.

$$d(n) = b_q(n) \cdot e^{-j2\pi\theta_f n} \cdot e^{-j\frac{\pi u n'(n'+1)}{131}} \quad \text{[Equation 18]}$$

In this case, $n = 0, 1, \cdots, 131$ $n' = n \bmod 131$ $m = n \bmod 128$ $u = N_{ID}^{Ncell} \bmod 126 + 3$ $q = \left\lfloor \frac{N_{ID}^{Ncell}}{126} \right\rfloor$ A binary sequence $b_q(n)$ is provided by Table 28. The cyclic shift $\theta_f$ of a frame number $n_f$ is provided by $$\theta_f = \frac{33}{132}(n_f/2)$$

mod 4.

Table 28 shows an example of $b_q(n)$.

TABLE 28

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 −1 1 1 −1 −1 1 1 −1 1 −1 −1 1 1 −1 1 −1 −1 1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1] |
| 2 | [1 −1 −1 1 −1 1 1 1 −1 1 1 1 −1 1 1 −1 −1 1 1 −1 1 1 −1 1 −1 −1 1 1 1 −1 1 1 −1 1 1 1 −1 −1 1 −1 1 −1 −1 1 −1 1 −1 −1 1 1 1 −1 −1 1 −1 1 1 1 −1 −1 1 −1 −1 1 −1 1 1 1 −1 1 −1 −1 1 −1 1 1 1 −1 1 1 −1 1 −1 1 1 −1 1 1 −1 1 1 1 −1 1 1 1 1 −1 −1 1 1 1 −1 1 1 1 −1 1 1 −1 1 −1 −1 1 −1 −1 1 −1 −1 1 −1 1 1 1 −1 −1 1 1 −1 1 −1 −1 1 1] |
| 3 | [1 −1 1 −1 1 1 −1 1 1 −1 1 −1 −1 1 −1 1 1 1 −1 1 −1 −1 1 1 1 −1 −1 1 1 −1 1 1 1 −1 −1 1 −1 −1 1 1 1 −1 −1 1 1 1 −1 −1 1 1 1 −1 1 1 −1 1 −1 −1 1 −1 1 −1 1 1 −1 1 −1 −1 1 1 −1 −1 1 1 1 −1 1 −1 1 1 −1 1 −1 −1 1 −1 −1 1 1 −1 1 1 −1 1 1 −1 −1 1 −1 −1 1 1 1 −1 1 −1 −1 1 1 −1 1 −1 1 −1 1 1 −1 1 1 1 −1 −1 1 1 −1 1 1 −1 1 1 −1 1 1 1 −1] |

The same antenna port needs to be used by all the symbols of a narrowband secondary synchronization signal within a subframe.

A UE should not assume that a narrowband secondary synchronization signal is transmitted through the same antenna port as a given downlink reference signal. The UE should not assume that the transmissions of a narrowband secondary synchronization signal in a given subframe uses the same antenna port or ports as the narrowband secondary synchronization signal of a given another subframe.

A sequence d(n) should be mapped to resource elements (k,l) as a sequence starts at d(0) in the sequence of the first index k through 12 allocated subcarriers and then the sequence of an index l through the last $N_{symb}^{NSSS}$ symbols allocated in radio frames to satisfy n f mod 2=0. In this case, $N_{symb}^{NSSS}$ is provided by Table 29.

Table 29 shows an example of the number of NSSS symbols.

TABLE 29

| Cyclic prefix length | $N_{symb}^{NSSS}$ |
|---|---|
| Normal | 11 |

Generation of OFDM Baseband Signal

If the higher layer parameter operationModeInfo does not indicates "inband-SamePCI" and samePCI-Indicator does not indicate "samePCI", the time-contiguous signal $s_l^{(p)}(t)$ through the antenna port p of an OFDM symbol l in a downlink slot is defined by Equation 19.

$$s_l^{(p)}(t) = \sum_{k=-\lfloor N_{SC}^{RB}/2 \rfloor}^{\lceil N_{SC}^{RB}/2 \rceil - 1} a_{k^{(-)},l}^{(p)} \cdot e^{j2\pi(k+\frac{1}{2})\Delta f(t - N_{CP,i}T_S)} \quad \text{[Equation 19]}$$

$0 \leq t < (N_{CP,i}+N) \times T_s$. In this case, $k^{(-)} = k + \lfloor N_{sc}^{RB}/2 \rfloor$, N=2048, $\Delta f$=15 kHz, and $a_{k,l}^{(p)}$ is the contents of a resource element (k,l) through an antenna port.

When the higher layer parameter operationModeInfo indicates "inband-SamePCI" or samePCI-Indicator indicates "samePCI", the time-contiguous signal $s_{l'}^{(p)}(t)$ through the antenna port p of an OFDM symbol l'. In this case, l'=l+ $N_{symb}^{DL}(n_s \bmod 4) \in \{0, \ldots, 27\}$ is an OFDM symbol index in at the start of the last even-numbered subframe, and is defined by Equation 20.

$$s_l^{(p)}(t) = \sum_{k=-\lfloor N_{RB}^{DL} N_{SC}^{RB}/2 \rfloor}^{-1} e^{\theta_k^{(-)}} a_{k^{(-)},1}^{(p)} \cdot$$
$$e^{j2\pi k \Delta f \left(t - N_{CP,1'} \bmod N_{symb}^{DL} T_S\right)} +$$
$$\sum_{k=1}^{\lceil N_{RB}^{DL} N_{SC}^{RB}/2 \rceil} e^{\theta_k^{(+)}} a_{k^{(+)},1}^{(p)} \cdot e^{j2\pi k \Delta f \left(t - N_{CP,1'} \bmod N_{symb}^{DL} T_S\right)} \quad \text{[Equation 20]}$$

$0 \leq t < (N_{CP,i}+N) \times T_s$. In this case, if $k^{(-)} = k + \lfloor N_{RB}^{DL} N_{sc}^{RB}/2 \rfloor$ and $k^{(+)} = k + \lfloor N_{RB}^{DL} N_{sc}^{RB}/2 \rfloor - 1$ and a resource element (k,l') is used for narrowband IoT, $\theta_{k,l'} = j2\pi f_{NB-IoT} T_s (N + \Sigma_{i=0}^{l'} N_{CP,i \bmod 7})$, and otherwise is 0. $f_{NB-IoT}$ is a value obtained by subtracting the center frequency location of an LTE signal from the frequency location of a carrier of a narrowband IoT PRB.

In specific 3GPP spec., only a normal CP is supported for narrowband IoT downlink.

Hereinafter, a physical layer process of a narrowband physical broadcast channel (NPBCH) is described more specifically.

Scrambling

Scrambling is performed according to Paragraph 6.6.1 of 3GPP TS 36.211 using $M_{bit}$ indicating the number of bits to be transmitted through an NPBCH. $M_{bit}$ is the same as 1600 for a normal cyclic prefix. A scrambling sequence is initialized as $c_{init} = N_{ID}^{Ncell}$ in radio frames that satisfy n f mod 64=0.

Modulation

Modulation is performed using the modulation method of Table 10.2.4.2-1 according to Paragraph 6.6.2 of TS36.211.

Table 30 shows an example of a modulation method for an NPBCH.

TABLE 30

| Physical channel | Modulation methods |
| --- | --- |
| NPBCH | QPSK |

Layer Mapping and Precoding

Layer mapping and precoding is performed according to Paragraph 6.6.3 of 3GPP TS 36.211 where PE {1,2}. A UE assumes that antenna ports $R_{2000}$ and $R_{2001}$ are used for the transmission of a narrowband physical broadcast channel.

Mapping to resource elements

A block $y^{(p)}(0), y^{(p)}(M_{symb}-1)$ of complex-value symbols for each antenna port needs to be transmitted in a subframe 0 during 64 contiguous radio frames that start at each radio frame satisfying $n_f$ mod 64=and needs to be mapped to elements (k,l) not reserved for the transmission of reference signals starting from contiguous radio frames that start at y(0) as a sequence, and needs to be an increment sequence of the first index k, a subsequent index 1. After the mapping to the subframe, before continuing to mapping to a subframe 0 of $y^{(p)}(\ )$ in a subsequent radio frame, a subframe is repeated to a subframe 0 in subsequent 7 radio frames. The first three OFDM symbols of the subframe are not used for a mapping process.

For the mapping purpose, a UE assumes narrowband reference signals for antenna ports 2000 and 2001 present regardless of an actual configuration and cell-specific reference signals for antenna ports 0-3. The frequency shift of the cell-specific reference signals is calculated by substituting cell $N_{ID}^{cell}$ with $N_{ID}^{cell}$ in the calculation of $v_{shift}$ of Paragraph 6.10.1.2 of 3GPP TS 36.211.

Information related to an MIB-NB and an SIBN1-NB is described more specifically.

MasterinformationBlock-NB

MasterinformationBlock-NB includes system information transmitted through a BCH.

Signaling radio bearer: N/A
RLC-SAP: TM
Logical channel: BCCH
Direction: E-UTRAN to UE Table 31 shows an example of a MasterinformationBlock-NB format.

TABLE 31

```
-- ASN1START
MasterInformationBlock-NB ::=    SEQUENCE {
    systemFrameNumber-MSB-r13        BIT STRING (SIZE (4)),
    hyperSFN-LSB-r13                 BIT STRING (SIZE (2)),
    schedulingInfoSIB1-r13           INTEGER (0..15),
    systemInfoValueTag-r13           INTEGER (0..31),
    ab-Enabled-r13                   BOOLEAN,
    operationModeInfo-r13            CHOICE {
        inband-SamePCI-r13               Inband-SamePCI-NB-r13,
        inband-DifferentPCI-r13          Inband-DifferentPCI-NB-r13,
        guardband-r13                    Guardband-NB-r13,
        standalone-r13                   Standalone-NB-r13
    },
    spare                            BIT STRING (SIZE (11))
}
```

TABLE 31-continued

```
ChannelRasterOffset-NB-r13 ::= ENUMERATED {khz-7dot5, khz-2dot5, khz2dot5,
khz7dot5}
Guardband-NB-r13 ::=            SEQUENCE {
    rasterOffset-r13                ChannelRasterOffset-NB-r13,
    spare                           BIT STRING (SIZE (3))
}
Inband-SamePCI-NB-r13 ::=       SEQUENCE {
    eutra-CRS-SequenceInfo-r13      INTEGER (0..31)
}
Inband-DifferentPCI-NB-r13 ::=  SEQUENCE {
    eutra-NumCRS-Ports-r13          ENUMERATED {same, four},
    rasterOffset-r13                ChannelRasterOffset-NB-r13,
    spare                           BIT STRING (SIZE (2))
}
Standalone-NB-r13 ::=           SEQUENCE {
    spare                           BIT STRING (SIZE (5))
}
-- ASN1STOP
```

Table 32 shows the description of the Masterinformation-Block-NB field.

TABLE 32

| MasterInformationBlock-NB field descriptions |
|---|
| ab-Enabled |
| A value TRUE indicates that a UE should obtain SystemInformationBlockType14-NB before an RRC connection configuration or resumption is initiated and access barring is enabled.<br>eutra-CRS-SequenceInfo |
| Information of a carrier including an NPSS/NSSS/NPBCH.<br>Each value is associated with an E-UTRA PRB index as an offset in the middle of an LTE system arranged by a channel raster offset.<br>eutra-NymCRS-Ports |
| The number of E-UTRA CRS antenna ports. A port or 4 antenna ports having the same number of NRSs.<br>hyperSFN-LSB |
| Indicate two least significant bits of a Hyper SFN. The remaining bits are present in SystemInformationBlockType1-NB.<br>operationModeInfo |
| Refer to a deployment scenario (in-band/guard band/standalone) and related information TS 36.211 [21] and TS 36.213 [23].<br>Inband-SamePCI indicates in-band deployment, and an NB-IoT and LTE cell share the same physical cell ID and have the same number of NRSs and CRS ports.<br>Inband-Different PCI indicates in-band deployment, and an NB-IoT and LTE cell have different physical cell IDs.<br>Guardband indicates guard band deployment.<br>Standalone indicates standalone deployment.<br>rasterOffset |
| an NB-IoT offset from LTE channel raster.<br>Unit of kHz of a set {−7.5, −2.5, 2.5, 7.5}.<br>schedulingInfoSIB1 |
| This field includes indices of a table defined in TS 36.213 [23, Table 16.4.1.3-3] that defines SystemInformationBlockType1-NB scheduling information.<br>systemFrameNumber-MSB |
| Defines four most significant bits of an SFN. As indicated in TS 36.211 [21], six least significant bits of an SFN are implicitly obtained by decoding an NPBCH.<br>systemInfoValueTag |
| Common for all SIBs other than an MIB-NB, SIB14-NB and SIB16-NB. |

SystemInformationBlockType1-NB

A SystemInformationBlockType1-NB message includes related information when evaluating whether a UE is permitted to access a cell, and defines the scheduling of other system information.

Signalling radio bearer: N/A
RLC-SAP: TM
Logical channel: BCCH
Direction: E-UTRAN to UE Table 33 shows an example of the SystemInformationBlockType1 (SIB1)-NB message.

TABLE 33

```
-- ASN1START
SystemInformationBlockType1-NB ::=   SEQUENCE {
    hyperSFN-MSB-r13              BIT STRING (SIZE (8)),
    cellAccessRelatedInfo-r13     SEQUENCE {
        plmn-IdentityList-r13         PLMN-IdentityList-NB-r13,
        trackingAreaCode-r13          TrackingAreaCode,
        cellIdentity-r13              CellIdentity,
        cellBarred-r13                ENUMERATED {barred, notBarred},
        intraFreqReselection-r13      ENUMERATED {allowed, notAllowed}
    },
    cellSelectionInfo-r13         SEQUENCE {
        q-RxLevMin-r13                Q-RxLevMin,
        q-QualMin-r13                 Q-QualMin-r9
    },
    p-Max-r13                     P-Max                         OPTIONAL,              -- Need OP
    freqBandIndicator-r13         FreqBandIndicator-NB-r13,
    freqBandInfo-r13              NS-PmaxList-NB-r13                   OPTIONAL,       -- Need OR
    multiBandInfoList-r13         MultiBandInfoList-NB-r13             OPTIONAL,       -- Need OR
    downlinkBitmap-r13            DL-Bitmap-NB-r13                     OPTIONAL,
    eutraControlRegionSize-r13    ENUMERATED {n1, n2, n3}              OPTIONAL,  -- Cond inband
    nrs-CRS-PowerOffset-r13       ENUMERATED {dB-6,        dB-4dot77,  dB-3,
                                              dB-1dot77, dB0,          dB1,
                                              dB1dot23,  dB2,          dB3,
                                              dB4,       dB4dot23,     dB5,
                                              dB6,       dB7,          dB8,
                                              dB9}  OPTIONAL,          -- cond inband-SamePCI
    schedulingInfoList-r13        SchedulingInfoList-NB-r13,
    si-WindowLength-r13           ENUMERATED {ms160, ms320, ms480,
                                              ms960,   ms1280, ms1600, spare1},
    si-RadioFrameOffset-r13       INTEGER (1..15)               OPTIONAL,  -- Need OP
    systemInfoValueTagList-r13    SystemInfoValueTagList-NB-r13OPTIONAL,
    lateNonCriticalExtension      OCTET STRING                         OPTIONAL,
    nonCriticalExtension          SEQUENCE { }                         OPTIONAL
}
PLMN-IdentityList-NB-r13 ::=  SEQUENCE (SIZE (1..maxPLMN-r11)) OF PLMN-IdentityInfo-NB-r13
PLMN-IdentityInfo-NB-r13 ::=  SEQUENCE {
    plmn-Identity-r13             PLMN-Identity,
    cellReservedForOperatorUse-r13        ENUMERATED              {reserved, notReserved},
    attachWithoutPDN-Connectivity-r13     ENUMERATED {true}       OPTIONAL  -- Need OP
}
SchedulingInfoList-NB-r13 ::= SEQUENCE (SIZE (1..maxSI-Message-NB-r13)) OF SchedulingInfo-NB-r13
SchedulingInfo-NB-r13::= SEQUENCE {
    si-Periodicity-r13       ENUMERATED {rf64, rf128, rf256, rf512,
                                         rf1024, rf2048, rf4096, spare},
    si-RepetitionPattern-r13 ENUMERATED {every2ndRF, every4thRF,
                                         every8thRF, every16thRF},
    sib-MappinqInfo-r13      SIB-MappingInfo-NB-r13,
    si-TB-r13    ENUMERATED {b56, b120, b208, b256, b328, b440, b552, b680}
}
SystemInfoValueTagList-NB-r13 ::=   SEQUENCE (SIZE (1.. maxSI-Message-NB-r13)) OF
                                    SystemInfoValueTagSI-r13
SIB-MappingInfo-NB-r13 ::=          SEQUENCE (SIZE (0..maxSIB-1)) OF SIB-Type-NB-r13
SIB-Type-NB-r13 ::=         ENUMERATED {
                            sibType3-NB-r13, sibType4-NB-r13, sibType5-NB-r13,
                            sibType14-NB-r13, sibType16-NB-r13, spare3,
                            spare2, spare1}
-- ASN1STOP
```

Table 34 shows the description of the SystemInformationBlockType1-NB field.

TABLE 34

| SystemInformationBlockType1-MB field descriptions |
| --- |
| attachWithoutPDN-Connectivity |
| If present, the field indicates that attach is supported without a PDN connection specified in TS 24.301 [35] with respect to such a PLMN.<br>cellBarred |
| Barr means that a cell is barred as defined in TS 36.304 [4].<br>cellIdentity |
| Indicate a cell identity.<br>cellReservedForOperatorUse |
| The same as that defined in TS 36.304 [4].<br>cellSelectionInfo |
| Cell selection information, such as that defined in TS 36.304 [4].<br>downlinkBitmapNB-IoT downlink subframe configuration for downlink transmission. |
| If a bitmap is not present, as specified in TS 36.213[23], a UE assumes that all subframes are valid (other than subframes on which an NPSS/NSSS/NPBCH/SIB1-NB is carried).<br>eutraControlRegionSize |
| Indicate the control area size of an E-UTRA cell for an in-band operation mode. A unit is the number of OFDM symbols.<br>freqBandIndicator |
| A list, such as that defined in TS 36.101 [42, Table 6.2.4-1], with respect to the frequency band of freqBandIndicator<br>freqBandInfo |
| A list of additionalPmax and additionalSpectrumEmission, such as that defined in TS 36.101 [42, Table 6.2.4-1], with respect to the frequency band of freqBandIndicator.<br>hyperSFN-MSB |
| Indicate eight most significant bits of a hyper-SFN. A complete hyper-SFN is constructed along with the hyper SFN-LSB of an MIB-NB. The hyper-SFN is increased one by one when the SFN wraps around.<br>intraFreqReselection |
| As defined in TS 36.304 [4], treated as being barred by a UE or if the most significant rank cell is barred, it is used to control cell reselection through intra-frequency cells.<br>multiBandInfoList |
| As defined in TS 36.101 [42, Table 5.5-1], additional frequency band indicators, a list of additionalPmax and additionalSpectrumEmission values. If a UE supports the frequency band of a freqBandIndicator IE, the frequency band is applied. Otherwise, the first listed band supported by a UE in a multiBandInfoList IE is applied.<br>nrs-CRS-PowerOffset |
| an NRS power offset between an NRS and an E-UTRA CRS. dB unit, a default value of 0.<br>plmn-IdentityList |
| A list of PLMN identities. The first listed PLMN-Identity is a primary PLMN.<br>p-Max |
| A value applicable to a cell. If not present, a UE applies maximum power according to the UE capability.<br>q-QualMin |
| A parameter "Qqualmin" of TS 36.304 [4].<br>q-RxLevMin |
| A parameter Qrxlevmin of TS 36.304 [4]. An actual value Qrxlevmin = IE value * 2 [dB].<br>schedulingInfoList |
| Indicate additional scheduling information of SI messages.<br>si-Periodicity |
| Periodicity of an SI-message of a radio frame. For example, rf256 indicates 256 radio frames, rf512 denotes 512 radio frame, etc. |

TABLE 34-continued

SystemInformationBlockType1-MB field descriptions si-RadioFrameOffset

The offset of a radio frame number for calculating the start of an SI window.
If the field is not present, an offset is not applied.
si-RepetitionPattern Indicate start radio frames within an SI window used for SI message transmission. A
value very2ndRF corresponds to all second radio frames starting from the first radio
frame of an SI window used for SI transmission, and a value every4thRF corresponds to
a fourth radio frame, etc.
si-TB This field indicates on SI transport block size as the number of bits used to broadcast a
message.
si-WindowLength A common SI scheduling window for all SIs. In this case, ms160 indicates 160
milliseconds, and ms320 indicates 320 millisecond, etc.
sib-MappingInfo A list of SIBs mapped to such a SystemInformation message. Mapping information of
an SIB2 is not present; this is always present in the first SystemInformation message
listed in the schedulingInfoList list.
systemInfoValueTagList Indicate SI message-specific value tags. As in SchedulingInfoList, this includes the
entries of the same number and is listed as the same side sequence.
systemInfoValueTagSI An SI message-specific value tag, such as that specified in 5.2.1.3. Common to all
SIBs within an SI message other than SIB14.

TABLE 35

| Conditional presence | Description |
| --- | --- |
| inband | When an IE operationModeInfo of an MIB-NB is configured as inband-SamePCI or inband-Different PCI, the field is mandatory. Otherwise, the field is not present. |
| inband-SamePCI | When an IE operationModeInfo of an MIB-NB is configured as inband-SamePCI, the field is mandatory. Otherwise, the field is not present. |

The abbreviations and definition of terms to be described are arranged prior to the description of a method of transmitting and receiving SIB1-NBs in a TDD NB-IoT system proposed in this specification. Abbreviation MIB-NB: masterinformationbiock-narrowband SIB1-NB: systeminformationblock1-narrowband CRS: cell specific reference signal or common reference signal ARFCN: absolute radio-frequency channel number PRB: physical resource block PRG: precoding resource block group PCI: physical cell identifier N/A: non-applicable EARFCN: E-UTRA absolute radio frequency channel number RRM: radio resource management RSRP: reference signal received power RSRQ: reference signal received quality TBS: transport block size TDD/FDD: time division duplex/frequency division duplex Definition NB-IoT: NB-IoT enables access to a network service through an E-UTRA using a channel bandwidth limited to 200 kHz.

NB-IoT inband operation: NB-IoT operates as an inband using a resource block(s) within a normal E-UTRA carrier.

NB-IoT a guard band operation: NB-IoT operates as a guard band when a resource block(s) not used within the guard band of an E-UTRA carrier is used.

NB-IoT standalone operation: NB-IoT operates as standalone when its own spectrum is used. For example, a spectrum used by a current GERAN system instead of one or more GSM carriers and a scattered spectrum for potential IoT deployment.

Anchor carrier: a carrier in which an NPSS/NSSS/NPBCH is transmitted with respect to TDD or an NPSS/NSSS/NPBCH/SIB-NB is transmitted with respect to FDD by a user equipment in NB-IoT.

Non-anchor carrier: a carrier in which an NPSS/NSSS/NPBCH/SIB-NB is not transmitted with respect to FDD or an NPSS/NSSS/NPBCH is not transmitted with respect to TDD by a user equipment in NB-IoT.

Channel raster: a minimum unit by which a user equipment reads a resource. In the case of an LTE system, channel raster has a value of 100 kHz.

Furthermore, "I" described in this specification may be interpreted as "and/or." "A and/or B" may be interpreted as the same meaning as "includes at least one of A or (and/or) B."

A method of transmitting an SIB1-NB in a TDD NB-IoT system proposed in this specification hereinafter is described more specifically.

A method proposed in this specification includes a concept in which an SIB1-NB is transmitted on a third carrier not an anchor-carrier.

The third carrier may be referred to as the above-described non-anchor carrier.

Furthermore, a method proposed in this specification includes a series of procedures related to the interpretation of a message included in an SIB1-NB.

A method proposed in this specification is described based on an NB-IoT system, for convenience of description, but may be applied to other communication systems having low energy/low costs, such as MTC and enhanced MTC (eMTC).

In this case, in a method proposed in this specification, a channel, a parameter, etc. described in this specification may be differently defined or represented depending on the characteristics of each system.

Furthermore, an overall description or procedure, etc. of the above-described NB-IoT may be applied to materialize a method proposed in this specification.

A method of transmitting an SIB1-NB proposed in this specification is basically configured with (1) a carrier location where system information is transmitted, (2) a subframe location and repetition number where an SIB1-NB is transmitted, (3) a subframe location where an NRS may be expected without system information, (4) the interpretation and configuration of an SIB1-NB message, (5) an operation related to the RRM or CE level of a user equipment when system information is transmitted on a non-anchor carrier, (6) a DL/UL non-anchor carrier configuration and (7) the number of NRS and CRS ports when an SIB1-NB is transmitted on a non-anchor carrier.

Carrier location where system information may be transmitted

First, a carrier location where system information may be transmitted is described.

If a downlink subframe is not sufficient depending on an UL/DL configuration, a base station may transmit system information (e.g., an SIB1-NB and the remaining other SIBx-NBs separately) to a user equipment on a non-anchor carrier.

This may be limitedly allowed only in a specific UL/DL configuration and/or may be limitedly allowed for a specific operation mode only and/or may be limitedly allowed for only specific some repetition numbers of an SIB1-NB and/or may be limitedly allowed depending on the number of cell specific reference signal (CRS) and narrowband reference signal (NRS) antenna ports.

The specific UL/DL configuration may be an UL/DL configuration in which two or more downlink subframes are not present other than subframes #0, 5, 9 and a special subframe, for example.

The specific operation mode may be an in-band operation mode, for example.

The specific some repetition numbers of the SIB1-NB are values derived by schedulingInfoSIB1. For example, in repetition numbers 4 and 8, the transmission of an SIB1-NB on a non-anchor carrier may not be permitted.

Furthermore, when an SIB1-NB is transmitted on a non-anchor carrier, the repetition number of an SIB1-NB on a non-anchor carrier or the number of subframes used for SIB1-NB transmission during a specific section may be differently interpreted depending on schedulingInfoSIB1 information within an MIB-NB and a carrier location where an SIB1-NB is transmitted.

If an SIB1-NB is transmitted on a non-anchor carrier as described above, this may be basically divided into two types as follows.

(1) When an SIB1-NB is transmitted on a non-anchor carrier only (2) When an SIB1-NB is transmitted on both an anchor-carrier and a non-anchor carrier When an SIB1-NB is transmitted on a carrier not an anchor-carrier, the operation mode of an MIB-NB may be identically applied to the carrier of the SIB1-NB and/or a carrier on which the remaining other SIBx-NBs are transmitted.

The same is true of an operation mode and all types of information within 7-bits operationModeInfo.

Furthermore, the remaining SIBx-NB not an SIB1-NB may be transmitted in a specific one non-anchor carrier.

Carrier location information of an SIB1-NB and the remaining other SIBx-NB carrier location information may be included in an MIB-NB and SIB1-NB, respectively.

The MIB-NB and the SIB1-NB are not notified in a form, such as ARFCN-ValueEUTRA, because they may not be transmitted using sufficient downlink resources like the remaining other SIBx-NBs.

A carrier location where an SIB1-NB is transmitted may be defined as a relative PRB location (one of one or more pre-determined offset values) with an anchor-carrier.

Furthermore, a carrier location where the remaining SIBx-NBs are transmitted may be defined as a relative PRB location with an anchor-carrier (one of one or more pre-determined offset values and the range of the offset values may be the same as or different from the range of an offset value for providing notification of an SIB1-NB transmission location) or may be defined a relative PRB location with a carrier where an SIB1-NB is transmitted.

In this case, when an SIB1-NB is transmitted on both an anchor-carrier and a non-anchor carrier, a base station may first provide notification of a relative PRB location of the anchor-carrier with the location of the non-anchor carrier (on which the SIB1-NB is transmitted).

This may be similarly applied to a guardband operation mode and a standalone operation mode.

That is, the guardband and standalone operation modes are used as a unit in which an PRB concept indicates a unit of 180 kHz, and may be used to express a relative location between carriers as described above.

In general, this may be different from a case where a channel number of a form, such as ARFCN-ValueEUTRA, is used when a non-anchor carrier is configured in an NB-IoT system.

Furthermore, in providing notification of the carrier location of an SIB1-NB, in order to provide notification of the carrier location in an MIB-NB as a relative PRB interval with an anchor-carrier, the number of carriers on which an SIB1-NB may be transmitted may need to be limited.

In this case, when the resource allocation of an LTE system is considered (e.g., when the unit of a PRG and RBG is considered), a non-anchor carrier on which an SIB1-NB may be transmitted needs to include at least one high value and one low value from the viewpoint of the frequency rather than an anchor carrier.

The same is true of a case where an SIB1-NB may be transmitted on a non-anchor carrier in the guardband operation mode.

Of course, the same is true of a case where an SIB1-NB may be transmitted on a non-anchor carrier even in the standalone operation mode.

For example, in the case of an n-band operation mode, if the location of an anchor-carrier corresponds to a PRB k-th within an LTE system band, a non-anchor carrier location on which an SIB1-NB may be transmitted needs to include at least one value smaller than k and at least one value greater than k.

If two PRB locations lower than k and two PRB locations higher than k are included in a non-anchor carrier on which an SIB1-NB may be transmitted, the PRB index of the non-anchor carrier on which an SIB1-NB may be transmitted may be represented as a sequence {k−k1, k−k2, k+k3, k+k4} from a low PRB number.

In this case, "2" is only an embodiment and may be a value greater than another value 1 or 2. Furthermore, the numbers of non-anchor carriers on which the SIB1-NBs of a PRB location lower than k and a PRB location lower than k may be transmitted may not be the same.

In this case, k1 and k2, k3, k4 may not have a specific relation.

However, the numbers may be defined to have values, such as "k1 and k4." Likewise, the numbers may be defined to have values, such as "k2 and k3."

In other words, {k−k1, k−k2, k+k2, k+k1} is obtained, and k1 and k2 may be contiguous values, but k2 may be a value smaller than 1.

The reason for this is that a base station does not want to use N PRBs neighboring an anchor-carrier for the power boosting of the anchor-carrier.

If such a limit is not present, k1 and k2 may be selected as 2 and 1, respectively.

As described above, an MIB-NB may indicate a carrier location k' where an SIB1-NB is transmitted within a non-anchor carrier set on which the SIB1-NB may be transmitted.

This may be implemented by newly adding an independent field within the MIB-NB.

Furthermore, k1 and k2 (also k3 and k4) may be configured as different values depending on the operation mode of an anchor-carrier or the operation mode of a non-anchor carrier on which an SIB1-NB is transmitted or the operation mode of an anchor-carrier and the operation mode of a non-anchor carrier on which an SIB1-NB is transmitted.

In the description, in a specific field of an MIB-NB used to indicate the carrier location of an SIB1-NB, one state may mean that the SIB1-NB is transmitted on an anchor carrier.

Alternatively, an independent one field-A (e.g., defined as 1 bit) may be used to provide notification of whether an SIB1-NB is transmitted on an anchor carrier.

In such a case, whether a field-B (different information configured as 1 bit or more) is present or an interpretation method of the field-B may be different depending on an interpretation of a field-A.

For example, when it is indicated that an SIB1-NB is transmitted on an anchor carrier in the field-A, a user equipment does not expect the field-B or may interpret the field-B as information on the location of a subframe in which the SIB1-NB may be transmitted within the anchor carrier.

When it is indicated that an SIB1-NB is transmitted on a non-anchor carrier in the field-B, a user equipment may use the field-B to obtain information on a carrier on which an SIB1-NB is transmitted.

When an SIB1-NB is not transmitted on an anchor carrier, if a case where the SIB1-NB is "transmitted on only a non-anchor carrier" or a case where the SIB1-NB may be transmitted on both an "anchor-carrier and non-anchor carrier" may be selected by an MIB-NB, the field-A may have a size of at least 2 bits.

The above-described SIB-NB transmission carrier location may be different in each cell depending on a cell identifier (ID).

For example, a set of carriers on which an SIB1-NB may be transmitted may be differently configured depending on the cell ID.

Furthermore, the interpretation of the location of a carrier on which an SIB1-NB may be transmitted may be defined to also include cell ID information along with information indicated in an MIB-NB.

If it is necessary to indicate the location k' of a carrier on which an SIB1-NB is transmitted or the location of a subframe in which an SIB1-NB is transmitted using a different method within a non-anchor carrier set depending on an operation mode, an MIB-NB may use the following methods.

Characteristically, the following methods are methods capable of using some statuses that are not used among 7 bits operationModeInfo within the MIB-NB.

(1) Use In-Band Different PCI Field
   a carrier (on which an SIB1-NB is transmitted) may be indicated using "eutra-CRS-SequenceInfo" 5 bits
   when an SIB1-NB is transmitted on an anchor carrier, a subframe #0, 8 or other subframe may be indicated using some bits of "eutra-CRS-SequenceInfo".

(2) Use Guardband Field
   a carrier (on which an SIB1-NB is transmitted) may be indicated using "eutra-CRS-SequenceInfo" 5 bits.
   when an SIB1-NB is transmitted on an anchor carrier, a subframe #0, 8 or other subframe may be indicated using some bits of "eutra-CRS-SequenceInfo".

(3) Use Standalone Field
   a carrier (on which an SIB1-NB is transmitted) may be indicated using "eutra-CRS-SequenceInfo" 5 bits.
   when an SIB1-NB is transmitted on an anchor carrier, a subframe #0, 8 or other subframe may be indicated using some bits of "eutra-CRS-SequenceInfo".

If an anchor-carrier is the guard band operation mode, the operation mode of a carrier on which an SIB1-NB may be transmitted may also be limited to the guard band operation mode.

This is for avoiding confusion in the information interpretation and application is of an MIB-NB and an SIB1-NB between an anchor-carrier and a non-anchor carrier on which the SIB1-NB is transmitted.

In such a case, that is, if an operation mode is designated as a guard-band in an MIB-NB and an SIB1-NB carrier is designated as a non-anchor carrier, the SIB1-NB may be limited to be positioned in a guard-band on the side opposite to a guard-band including an anchor-carrier in an in-band system (LTE system).

This is different depending on the size of a guard-band. In general, this may be indirectly calculated based on the bandwidth of in-band LTE.

That is, when the bandwidth of an in-band LTE system is small, the number of (non-)anchor carriers capable of serving NB-IoT of a 180 kHz bandwidth in a left/right (or up/down) guard-band may be limited.

Accordingly, when a user equipment can be aware of the bandwidth of an in-band LTE system, the user equipment may easily calculate the location of a carrier on the opposite side where an SIB1-NB is transmitted.

For example, when an anchor-carrier is a guard band operation mode and an SIB1-NB is transmitted on a non-anchor carrier, a user equipment may be notified of a system bandwidth using unused bits or reserved bits or unused states of an MIB-NB. The user equipment may be aware of a non-anchor on which the SIB1-NB is transmitted on the opposite side based on the system bandwidth.

Furthermore, if the bandwidth of an in-band LTE system is wide, that is, in a guard-band widened compared to an in-band system bandwidth, a non-anchor carrier neighboring an anchor-carrier may be present even within a guard-band on one side.

If such a case is considered, when an anchor-carrier is a guard band operation mode, the number of case for carrier on which an SIB1-NB may be transmitted may be 4.

That is, 1) an SIB1-NB may be transmitted on an anchor carrier, 2) an SIB1-NB may be transmitted on a left (or down) non-anchor carrier neighboring an anchor-carrier, 3) an SIB1-NB may be transmitted on a right (or up) non-anchor carrier neighboring an anchor-carrier, 4) an SIB1-NB may be transmitted on a non-anchor carrier symmetrical (or measurement relation location) to an anchor-carrier in a guard-band on the side opposite to a guard-band to which the anchor-carrier belongs on the basis of an in-band system.

In this case, the definition of the neighboring carrier or the symmetric carrier on the opposite side means a logical relation. A physical relation (anchor-carrier and non-anchor carrier on which an SIB1-NB is transmitted) may be pre-defined or configured as a specific equation, etc. in 3GPP TS 36.xxx.

When an SIB1-NB is transmitted on a non-anchor carrier, a combination of an anchor-carrier and the non-anchor carrier on which an SIB1-NB is transmitted may be the same as 1) to 3) below.

1) In-band anchor carrier+in-band non-anchor carrier
   Same PCI+same PCI
   Different PCI+different PCI
2) Guard-band anchor carrier+guard-band non-anchor carrier (or in-band non-anchor carrier)
   Guard-band (up/down)+guard-band (up/down)
   Guard-band (up/down)+guard-band (down/up)
   Guard-band (up/down)+inband same PCI
   Guard-band (up/down)+inband different PCI
3) Standalone anchor carrier+standalone non-anchor carrier In this case, in the case of the guard band operation mode, up and down mean an upper or lower frequency location in a frequency region based on each inband.

Furthermore, in accordance with a table—arranged based on 3GPP TS 36.104, if an inband bandwidth is 3 MHz or less, the guard band operation mode is not used.

Furthermore, if the guard band operation mode is used, it is recommended that the location of a carrier is used from a carrier closest to an inband.

Table 36 is a table showing an example of NB-IoT operation modes that may be permitted in system bands.

TABLE 36

| System bandwidth | | 1.4 MHz | 3 MHz | 5 MHz | 10 MHz | 15 MHz | 20 MHz |
|---|---|---|---|---|---|---|---|
| $N_{RB}$ | | 6 | 15 | 25 | 50 | 75 | 100 |
| # NB IoT carriers | In-band | N/A | 9 | 19 | 44 | 69 | 94 |
| | Guard-band | N/A | N/A | >0, but according to TS 36.104, it should be placed adjacent to the LTE PRB edge as close as possible | | | |
| | Stand-alone | N/A | N/A | N/A | N/A | N/A | N/A |

In order to determine a combination of the listed anchor-carrier and non-anchor carrier used to transmit an SIB1-NB, there is a method using unused or reserved bits of operationModeInfo-r13 7 bits of an MIB-NB.

Hereinafter, b1, b2, . . . , bN are represented in order to logically distinguish between unused or reserved bits in a bit unit when the number of unused or reserved bits is N.

b(n−1) and bn may not be contiguous, and b1 may not be the first or last bit of unused or reserved bits. In this case, n is a natural number between 1 to N.

1. inband-SamePCI-r13
   1) eutra-CRS-SequenceInfo-r13 {0 . . . 31}
   2) reserved bits: 0
2. inband-Different PCI-r13
   1) eutra-NumCRS-Ports-r13 {same, four}
   2) fasterOffset-r13 {−7.5, −2.5, 2.5, 7.5}
   3) Reserved bits: 2

The inband-Different PCI (physical cell ID) mode may be used to provide notification of whether an SIB1-NB is directly transmitted on an anchor carrier or transmitted on a non-anchor carrier in a reserved bit.

That is, when an anchor-carrier is an inband-Different PCI mode, "11 spare bits for future extension" of an MIB-NB may not be used to represent information on a carrier on which an SIB1-NB is transmitted.

Furthermore, some bit(s) of 2 reserved bits may be used to provide notification of location information of a corresponding carrier when an SIB1-NB is transmitted on a non-anchor carrier.

As a simple embodiment, the location of a non-anchor carrier on which an SIB1-NB is transmitted may be used to determine {0, −2G, −G, +G} using 2 bits based on an anchor-carrier.

In this case, G may be mapped as a PRB value or 180 kHz×G.

Furthermore, the value G be indicated using the remaining unused bit(s).

Furthermore, 0 may mean that an SIB1-NB is transmitted on an anchor-carrier.

3. guardband-r13
   1) rasterOffset-r13 {−7.5, −2.5, 2.5, 7.5}

A user equipment may be aware whether an anchor-carrier is relatively a low frequency or a high frequency from an inband bandwidth based on the rasteroffset-r13 information.

A user equipment may determine whether inband bandwidth information is (5 MHz or 15 MHz) or (10 MHz or 20 MHz).

That is, the user equipment cannot identify a value between 5 MHz and 15 MHz and does not identify a value between 10 MHz and 20 MHz, but may identify at least two groups.

In this case, channel raster indicates a minimum unit by which the user equipment reads a resource. In the case of an LTE system, channel raster has a value of 100 kHz.

A user equipment sequentially monitors frequency values corresponding to a minimum frequency bandwidth (6 RB, 1.08 MHz) as possible at channel raster (e.g., 100 kHz) intervals.

The channel raster offset may have four values of ±2.5 kHz (+2.5 kHz, −2.5 kHz) and ±7.5 kHz (+7.5 kHz, −7.5 kHz), for example.

The values may indicate a value obtained by subtracting an integer multiple of 100 kHz from the center frequency of a PRB based on 100 kHz (the center frequency of PRB—a multiple of 100 kHz).

2) reserved bits: 3

Unused 3 bits may be used to determine the operation mode of a non-anchor carrier on which an SIB1-NB is transmitted as follows.

Furthermore, some of the following cases may be omitted.

That is, the case of Guard-band (up/down)+inband same PCI may not be present.

① b1

This value may be used to clearly determine bandwidth information of an inband not distinguished based on the above rasterOffset-r13.

② {b2,b3}

In the above-described "combination of an anchor-carrier and a non-anchor carrier on which an SIB1-NB is transmitted", when a guard-band is an anchor-carrier, 2 bits may be used as follows in order to determine the operation mode of a non-anchor carrier on which an SIB1-NB is transmitted and the guard-band location of a non-anchor carrier on which an SIB1-NB is transmitted (non-anchor carrier the same side as the anchor-carrier or non-anchor carrier on the side opposite to the anchor-carrier).

A. Guard-Band (Up/Down)+Guard-Band (Up/Down)

This indicates that a non-anchor carrier on the same side as an anchor-carrier is used for SIB1-NB transmission. For example, {b2,b3}={0,0}.

For example, when a non-anchor carrier on which an SIB1-NB is transmitted in the reserved bits of an MIB-NB has been indicated to be a neighbor high (or low) frequency compared to an anchor carrier, a user equipment may assume that a corresponding guard-band is indirectly locationed in a frequency higher (or lower) than the frequency of an LTE system.

A non-anchor carrier on which an SIB1-NB is transmitted may be calculated to be 180 kHz higher (or lower) than an anchor carrier frequency.

The reason for this is that there is an assumption that an anchor-carrier deployed in the guard-band primarily uses the closest frequency in the LTE in-band.

B. Guard-Band (Up/Down)+Guard-Band (Down/Up)

This indicates that a non-anchor carrier on the side opposite to an anchor-carrier is used for SIB1-NB transmission.

For example, when an anchor-carrier is a high frequency (up) from an in-band, a non-anchor carrier on which an SIB1-NB is transmitted may be a low frequency (down) from the in-band. For example, {b2,b3}={0,1}.

For example, if a non-anchor carrier on which an SIB1-NB is transmitted has been indicated to be a neighbor high (or low) frequency compared to an anchor carrier in the reserved bits of an MIB-NB, a user equipment may assume that a corresponding guard-band is indirectly positioned in a lower (or higher) frequency than the frequency of an LTE system.

A non-anchor carrier on which an SIB1-NB is transmitted may be calculated to be higher (or lower) than an anchor carrier frequency by the sum of the in-band bandwidth (assuming that it may be obtained by the description) of an LTE system, 180 kHz, and an offset (it may be a different value depending on an LTE system bandwidth and may be a value of 0 or 45 kHz, for example).

The reason for this is that there is an assumption that an anchor-carrier deployed in the guard-band primarily uses the closest frequency in the LTE in-band.

C. Guard-Band (Up/Down)+Inband Same PCI

A non-anchor carrier on which an SIB1-NB is transmitted is present in an in-band and may indicate the same PCI mode. For example, {b2,b3}={1,0}.

In this case, in order to demodulate and decode the SIB1-NB, a user equipment needs to be aware of the number of NRS ports and an accurate location of a non-anchor carrier on which the SIB1-NB is transmitted.

First, the number of NRS ports may be assumed to be the same as a value obtained from an anchor-carrier.

Furthermore, an accurate location of a non-anchor carrier on which an SIB1-NB is transmitted may be calculated based on in-band bandwidth information obtained by combining the above-described rasterOffset-r13 and b1 and location information of a non-anchor carrier on which an SIB1-NB is transmitted within the in-band. The corresponding information may be used as the same purpose as information transmitted through eutra-CRS-SequenceInfo-r13 in the in-band operation mode.

As a simple embodiment, when an in-band bandwidth obtained by combing rasterOffset-r13 and b1 is 20 MHz and an anchor-carrier is a low frequency (low frequency on the basis of a PRB index 0), the CRS location and sequence of a non-anchor carrier on which an SIB1-NB is transmitted may be precisely calculated when a PRB index 0 is obtained.

For example, if a non-anchor carrier on which an SIB1-NB is transmitted has been indicated to be a neighbor high (or low) frequency compared to an anchor carrier in the reserved bits of an MIB-NB, a user equipment may assume that a corresponding guard-band is indirectly locationed in a frequency lower (or higher) than the frequency of an LTE system.

The user equipment may calculate the PRB index of the non-anchor carrier on which an SIB1-NB is transmitted as a value 0 (the greatest PRB index supported in an LTE system bandwidth).

The reason for this is that there is an assumption that an anchor-carrier deployed in the guard-band primarily uses the closest frequency in the LTE in-band.

D. Guard-Band (Up/Down)+Inband Different PCI

A non-anchor carrier on which an SIB1-NB is transmitted is present in an inband, and may indicate a different PCI mode. For example, {b2,b3}={1,1}. In this case, in order to be precisely aware of SIB1-NB rate-matching information, it is necessary to be precisely aware of the number of CRS antenna ports of an inband.

As the simplest method, the number of CRS ports may be defined to be always 4 or the number of NRS and CRS ports may be re-defined as a specific combination.

For example, {the number of NRS ports, the number of CRS ports} may be defined like {1, 2}, {2, 4} or {1, 4}, {2, 1}. In such a case, an accurate number of CRS ports of an in-band may be indicated in an SIB1-NB.

For example, if a non-anchor carrier on which an SIB1-NB is transmitted has been indicated to be a neighbor high (or low) frequency compared to an anchor carrier in the reserved bits of an MIB-NB, a user equipment may assume that a corresponding guard-band is indirectly positioned in a frequency lower (or higher) than the frequency of an LTE system.

The user equipment may calculate the PRB index of the non-anchor carrier on which an SIB1-NB is transmitted as a value 0 (the greatest PRB index supported in an LTE system bandwidth). The reason for this is that there is an assumption that an anchor-carrier deployed in the guard-band primarily uses the closest frequency in the LTE in-band.

In the A to D, the case of C (Guard-band (up/down)+ inband same PCI) is not considered, both {1,0} and {1,1} of {b2,b3} are assumed to be a Guard-band (up/down)+inband different PCI combination, and {1,0} and {1,1} information may be used to represent the number of CRS ports.

This may be defined identically with eutra-NumCRS-Ports-r13 information of inband-Different PCI-NB-r13.

That is, the information of {1,0} and {1,1} of {b2,b3} may be used to indicate that the number of CRS ports of an inband non-anchor carrier on which an SIB1-NB is transmitted is the same as the number of NRS ports of an anchor-carrier or 4.

In the A to D, if an NB-IoT carrier is deployed in the guard-band, an offset may be defined between an in-band edge and a guard-band depending on an LTE system bandwidth.

For example, the offset value may be 45 kHz, which may be a different value depending on the bandwidth.

In general, the corresponding value may be determined based on the RF requirement of a base station/user equipment, such as TS36.104, etc.

The offset may be explicitly defined between the in-band edge and the guard-band depending on an LTE system bandwidth in 3GPP TS 36.xxx.

A user equipment may differently determine whether to apply the offset value in interpreting he reserved bit.

For example, if an anchor-carrier is the guard band operation mode and an SIB1-NB is transmitted on a neighbor in-band non-anchor carrier, an actual location of the neighbor in-band non-anchor carrier may be calculated by applying the offset or not depending on an LTE system bandwidth.

Likewise, if an SIB1-NB is transmitted on a guard-band on the side opposite to an anchor-carrier, a corresponding location may be calculated by applying an offset between a guard-band edge and an in-band edge or not depending on an LTE system bandwidth.

③ {b2,b3}—a method of using {b2,b3} if a case where a non-anchor carrier on which an SIB1-NB is transmitted is transmitted on an in-band on the side opposite to an anchor carrier based on an LTE center carrier (fc) is not supported is described.

If an SIB1-NB is transmitted on a non-anchor carrier and a relative location (higher/lower frequency based on an anchor-carrier, for example) of the corresponding non-anchor carrier is notified using the reserved bit(s) of an MIB-NB, a user equipment may be aware whether the corresponding non-anchor carrier is a non-anchor carrier of a neighboring guardband or corresponds to the lowest/highest PRB location of an LTE in-band neighboring the anchor-carrier.

That is, when an anchor carrier is positioned in a guardband, if the anchor carrier is permitted to include only a carrier closest to an in-band edge (in-band edge among guardband NB-IoT carriers permitted in the in-band edge defined in the RAN4 standard or standard. This may be defined as a value of 0 Hz or 45 kHz, etc. depending on an in-band system bandwidth in 3GPP TS 36.xxx document) or if the anchor-carrier is the guardband operation mode, if there is a condition that an SIB1-NB must be closest to an LTE in-band edge at least in order to transmit the SIB1-NB on a non-anchor carrier, whether the corresponding non-anchor carrier is the in-band operation mode may be aware based on only information (information obtained from the reserved bits of an MIB-NB) on the non-anchor carrier (on which the SIB1-NB is transmitted) from the anchor carrier.

The reason for this is that when an anchor carrier is positioned in the guard band, whether it is the guard band of a low frequency or the guard band of a high frequency from the center frequency of an LTE in-band can be aware based on rasterOffset-r13.

In this case, when the non-anchor carrier on which an SIB1-NB is transmitted is positioned in the guardband, there is a problem in that whether the non-anchor carrier is positioned on the same side as the anchor-carrier (a relatively low or high frequency from the LTE center frequency) or positioned on the side opposite to the anchor-carrier is unaware.

In this case, when the non-anchor carrier is transmitted in the guardband on the side opposite to the anchor carrier, it is assumed that only a frequency symmetrical to the anchor-carrier based on the LTE center frequency is permitted.

One state of {b2,b3} may be used to determine location (the same side or opposite side) information of the above-described guardband.

For example, when an anchor-carrier is lower than an LTE center frequency (fc), when a relative frequency location of an SIB1-NB non-anchor carrier obtained from an MIB-NB reserved bit is lower than that of an anchor carrier, it may be aware that the corresponding non-anchor carrier is a guardband on the same side as the anchor carrier.

When a non-anchor carrier on which an SIB1-NB is transmitted is higher than that of an anchor carrier, it may be aware that the corresponding non-anchor carrier is an LTE in-band edge (the lowest PRB index).

In the above-described case, if the relative frequency location of the SIB1-NB non-anchor carrier is assumed to be lower than that of the anchor carrier, when the state1 of {b2,b3} is indicated, it may be interpreted that the corresponding non-anchor carrier is positioned in a guardband symmetric to LTE fc on the side opposite to the anchor carrier.

Furthermore, the remaining state2, state3, state4 may be used to determine an operation mode and the number of CRS ports when an SIB1-NB non-anchor carrier obtained from an MIB-NB is positioned in the most neighbor in-band PRB from an anchor carrier.

For example, the state2 may indicate that a corresponding non-anchor carrier is an in-band samePCI mode.

In this case, the number of CRS ports may be assumed to be the same as the number of NRS ports of an anchor-carrier.

The state3 and state4 may be used to additionally indicate the number of CRS ports when a corresponding non-anchor carrier is an in-band different PCI mode.

That is, when the state3 is indicated, it may be assumed that a corresponding non-anchor carrier is an in-band different PCI mode and the number of CRS ports is the same as the number of NRS ports of an anchor-carrier.

When the state4 is indicated, a corresponding non-anchor carrier is an in-band different PCI mode and the number of CRS ports is 4.

4. standalone-r13 reserved bits: 5

In the case of the standalone mode, this may be used to provide notification whether an SIB1-NB is directly transmitted on an anchor-carrier or transmitted on a non-anchor carrier in the reserved bit of the standalone-r13 field.

That is, if an anchor-carrier is the standalone mode, the "11 spare bits for future extension" of an MIB-NB may not be used to represent information on a carrier on which an SIB1-NB is transmitted.

Furthermore, some bit(s) of 5 reserved bits of the standalone-r13 field may be used to provide notification of location information of a corresponding carrier if they correspond to a case where an SIB1-NB is transmitted on a non-anchor carrier.

As a simple embodiment, 2 bits of the 5 reserved bits of the standalone-r13 field may be used to determine the location of a non-anchor carrier on which an SIB1-NB is transmitted based on an anchor-carrier {−2G, −G, +G, +2G}.

In this case, G may be mapped as a virtual PRB value or 180 kHz×G.

Furthermore, the value G may be indicated using the remaining unused bit(s).

Furthermore, relative frequency location information of a non-anchor carrier on which an SIB1-NB is transmitted from an anchor-carrier (information indicating whether the frequency location is higher or lower than the anchor carrier) is obtained through another signaling of an MIB-NB. The relative offset size of the anchor-carrier and the non-anchor carrier may be notified using some of corresponding reserved bits.

That is, in the example, when the location of a carrier used for SIB1-NB transmission is obtained as −G or +G logical or absolute frequency unit (Hz) information from an anchor-carrier through another-bit information of an MIB-NB, a detailed G value may be defined using some of the reserved 5 bits of the standalone-r13 field.

In this case, the G value may not be an integer.

For example, in the case of the standalone operation mode, a band that may be occupied by an NB-IoT carrier may be defined as 200 kHz not 180 kHz in order to add an explicit guard-band (guard band for reducing an interference influence between neighbor channels or carriers not the NB-IoT operation mode) to an NB-IoT standalone carrier.

In such a case, the relative frequency location of a non-anchor carrier on which an SIB1-NB is transmitted with respect to an anchor carrier may need to be defined as a 200 kHz unit not 180 kHz.

This value may be different depending on the carrier frequency (e.g., EARFCN).

That is, a method of converting the relative frequency location of a non-anchor carrier on which an SIB1-NB is transmitted with respect to an anchor carrier into the center frequency value of an actual non-anchor carrier may be different depending on the operation mode.

In particular, the standalone operation mode may be interpreted as an offset unit having a different value (index) indicated in an MIB-NB.

If the above-described methods are used, when an anchor-carrier is the guard band operation mode as in FIG. 8 or 9, the location and operation mode of a non-anchor carrier on which an SIB1-NB may be transmitted may be transmitted to a user equipment.

Furthermore, in the number of two cases of a combination of states not used in FIGS. 8 and 9, a non-anchor carrier on which an SIB1-NB is transmitted may be used to indicate a non-anchor carrier, not neighboring in an LTE in-band, as a carrier on which an SIB1-NB is transmitted in a guard-band on the side opposite to an anchor carrier.

FIG. 8 is a diagram showing an example of a method for interpreting signaling information of an SIB1-NB non-anchor carrier in a MIB-NB when an anchor carrier proposed in this specification is a guard band operation mode.

In drawings corresponding to the LTE in-bands of FIG. 8, a slashed part indicates an LTE bandwidth.

The LTE bandwidth may be obtained using 1 additional bit in rasterOffset-r13 in guardband-r13 and guardband-r13 of an MIB-NB.

In the drawing corresponding to Example 1 of FIG. 8, the first slashed part on the left side of the LTE band means "when SIB1-NB non-anchor carrier is indicated by 1 bit in MIB-NB as the lower PRB relative to anchor PRB and 2 spare bits in guardband-r13 is "0"."

Furthermore, in the drawing corresponding to Example 1 of FIG. 8, the second slashed part on the left side of the LTE band means "anchor carrier (its relative location to LTE in-band can be obtained by using rasterOffset-r13 in guardband-r13 of MIB-NB)."

Furthermore, in the drawing corresponding to Example 1 of FIG. 8, the third slashed part on the left side of the LTE band (i.e., the left part (PRB) of the LTE band) means "when SIB1-NB non-anchor carrier is indicated by 1 bit in MIB-NB as the higher PRB relative to anchor PRB and 2 spare bits in guardband-r13 is '2'(in-band different PCI) or '3'(in-band same PCI)."

Furthermore, in the drawing corresponding to Example 1 of FIG. 8, the first slashed part (PRB) on the right side of the LTE band means "when SIB1-NB non-anchor carrier is indicated by 1 bit in MIB-NB as the higher PRB relative to anchor PRB and 2 spare bits in guardband-r13 is "1"."

Furthermore, in a drawing corresponding to Example 2 of FIG. 8, the first slashed part on the left side of an LTE band means "when SIB1-NB non-anchor carrier is indicated by 1 bit in MIB-NB as the lower PRB relative to anchor PRB and 2 spare bits in guardband-r13 is "1"."

Furthermore, in the drawing corresponding to Example 2 of FIG. 8, the first slashed part on the right side of the LTE band I (i.e., the right part (PRB) of the LTE band) means "when SIB1-NB non-anchor carrier is indicated by 1 bit in MIB-NB as the higher PRB relative to anchor PRB and 2 spare bits in guardband-r13 is '2' (in-band different PCI) or '3' (in-band same PCI)."

Furthermore, in the drawing corresponding to Example 2 of FIG. 8, the second slashed part on the right side of the LTE band means "anchor carrier(its relative location to LTE in-band can be obtained by using rasterOffset-r13 in guardband-r13 of MIB-NB)."

Furthermore, in the drawing corresponding to Example 2 of FIG. 8, the third slashed part (PRB) on the right side of the LTE band means "when SIB1-NB non-anchor carrier is indicated by 1 bit in MIB-NB as the higher PRB relative to anchor PRB and 2 spare bits in guardband-r13 is "0"."

All the PRBs corresponding to the slashed parts in Examples 1 and 2 of FIG. 8 are non-anchor carriers used for SIB1-NB transmission.

FIG. 9 is a diagram showing another example of a method for interpreting signaling information of an SIB1-NB non-anchor carrier in a MIB-NB when an anchor carrier proposed in this specification is a guard band operation mode.

In drawings corresponding to LTE in-bands of FIG. 9, a slashed part indicates an LTE bandwidth.

The LTE bandwidth may be obtained using 1 additional bit in rasterOffset-r13 in guardband-r13 and guardband-r13 of an MIB-NB.

In the drawing corresponding to Example 1 of FIG. 9, the first slashed part on the left side of the LTE band means "when SIB1-NB non-anchor carrier is indicated by 1 bit in MIB-NB as the lower PRB relative to anchor PRB and 2 spare bits in guardband-r13 is "0"."

Furthermore, in the drawing corresponding to Example 1 of FIG. 9, the second slashed part on the left side of the LTE band means an "anchor carrier (its relative location to LTE in-band can be obtained by using rasterOffset-r13 in guardband-r13 of MIB-NB)."

Furthermore, in the drawing corresponding to Example 1 of FIG. 9, the third slashed part on the left side of the LTE band (i.e., the left part (PRB) of the LTE band) means "when SIB1-NB non-anchor carrier is indicated by 1 bit in MIB- NB as the higher PRB relative to anchor PRB and 2 spare bits in guardband-r13 is '2'(in-band different PCI) or '3'(in-band same PCI)."

In the drawing corresponding to Example 1 of FIG. 9, the first slashed part on the right side of the LTE band (i.e., the right part (PRB) of the LTE band) means "when SIB1-NB non-anchor carrier is indicated by 1 bit in MIB-NB as the higher PRB relative to anchor PRB and 2 spare bits in guardband-r13 is '2' (in-band different PCI) or '3' (in-band same PCI)."

Furthermore, in the drawing corresponding to Example 1 of FIG. 9, the second slashed part (PRB) on the right side of the LTE band means "when SIB1-NB non-anchor carrier is indicated by 1 bit in MIB-NB as the higher PRB relative to anchor PRB and 2 spare bits in guardband-r13 is "1"."

Furthermore, in the drawing corresponding to Example 2 of FIG. 9, the first slashed part on the left side of the LTE band means "when SIB1-NB non-anchor carrier is indicated by 1 bit in MIB-NB as the lower PRB relative to anchor PRB and 2 spare bits in guardband-r13 is "1"."

Furthermore, in the drawing corresponding to Example 1 of FIG. 9, the second slashed part on the left side of the LTE band (i.e., the left part (PRB) of the LTE band) means "when SIB1-NB non-anchor carrier is indicated by 1 bit in MIB-NB as the higher PRB relative to anchor PRB and 2 spare bits in guardband-r13 is '2'(in-band different PCI) or '3'(in-band same PCI)."

In the drawing corresponding to Example 2 of FIG. 9, the first slashed part on the right side of the LTE band (i.e., the right part (PRB) of the LTE band) means "when to SIB1-NB non-anchor carrier is indicated by 1 bit in MIB-NB as the higher PRB relative to anchor PRB and 2 spare bits in guardband-r13 is '2'(in-band different PCI) or '3'(in-band same PCI)."

Furthermore, in the drawing corresponding to Example 2 of FIG. 9, the second slashed part on the right side of the LTE band means "anchor carrier (its relative location to LTE in-band can be obtained by using rasterOffset-r13 in guardband-r13 of MIB-NB)."

Furthermore, in the drawing corresponding to Example 2 of FIG. 9, the third slashed part (PRB) on the right side of the LTE band means "when SIB1-NB non-anchor carrier is indicated by 1 bit in MIB-NB as the higher PRB relative to anchor PRB and 2 spare bits in guardband-r13 is "0"."

All the PRBs corresponding to the slashed parts in Examples 1 and 2 of FIG. 9 are non-anchor carriers used for SIB1-NB transmission.

Additional information for providing notification of information on a carrier on which an SIB1-NB is transmitted along with the proposed method may be indicated using some bit(s) of the "11 spare bits for future extension" of an MIB-NB.

This may be omitted when an anchor-carrier is inband-Different PCI or standalone.

As a simple embodiment, the following methods may be used when corresponding information is transmitted using 2 bits ({b1,b2}).

1) Bitmap Method

This may mean that when b1 is "0", an SIB1-NB is transmitted on an anchor-carrier and if not (when b1 is "1"), an SIB1-NB is transmitted on a specific non-anchor carrier.

B2 is not used or may be disregarded when b1 is "0".

Alternatively, when b1 is "0", b2 may be used to indicate the location of a subframe in which an SIB1-NB is transmitted on an anchor-carrier.

This may be limited to interpret b2 as information indicating the location of an SIB1-NB subframe only when an SIB1-NB repetition number is 16.

When b2 is 0 and 1, this may mean that an each SIB1-NB is transmitted at a location having a −G or +G PRB (or −/+G×180 kHz) offset from an anchor-carrier.

In this case, G may be a value specified in 3GPP TS 36.xxx or a value different depending on a cell ID or SIB1-NB repetition number or operation mode, etc.

In particular, when an anchor-carrier is a guardband operation mode and an SIB1-NB is transmitted on a non-anchor carrier, G may indicate information on whether an SIB1-NB is transmitted at a location having a specific offset in a guardband on the same side as an anchor-carrier or whether an SIB1-NB is transmitted at a location having a specific offset in a guardband (the side opposite to an anchor-carrier) on the side opposite to an anchor-carrier or whether an inband non-anchor carrier in which an SIB1-NB is transmitted has a specific offset based on the lowest PRB index or whether an inband non-anchor carrier on which an SIB1-NB is transmitted has a specific offset based on the highest PRB index depending on {b1,b2,b3} of the guardband-r13.

In this case, a user equipment may differently determine whether G will be interpreted as +/−G or interpreted as +G, +2G or interpreted as −G, −2G depending on a relative distance because it is aware of the relative distance between a guardband anchor-carrier and an inband.

Furthermore, when an SIB1-NB is transmitted in an inband non-anchor carrier, an offset is not specified based on the lowest or highest PRB index, but an offset may be calculated based on a specific reference PRB index.

As the most simple example, a PRB index closest to a PRB in which the primary synchronization signal (PSS)/secondary synchronization signal (SSS) of an inband is transmitted may be a reference PRB index.

If the number of bits used for such a purpose is 3, b1 may be for providing notification of whether an SIB1-NB is transmitted in an anchor-carrier. When an SIB1-NB is transmitted on a non-anchor carrier, b2 and b3 may be for providing notification of the location of the corresponding carrier in more various manners.

2) Table Method

In order to transfer the same information as that of the above-described Bitmap method, {b1,b2} may be defined in a table, such as {0,0}, {0,1}, {1,0}, {1,1}.

In this case, a method of omitting b2 based on a value of b1 cannot be applied.

Position and Repetition Number of Subframe in which SIB1-NB May be Transmitted

Second, the location and repetition number of a subframe in which an SIB1-NB may be transmitted is described more specifically.

A carrier on which an SIB1-NB may be transmitted may be basically divided into three types as follows. The subframe location and/or repetition number in which each SIB1-NB may be transmitted may be different.

1. When an SIB1-NB is Transmitted on an Anchor Carrier (1) When an SIB1-NB is Transmitted in a Fixed Subframe Index The SIB1-NB may be transmitted in a subframe #0 in which a narrowband secondary synchronization signal (NSSS) is not transmitted.

In this case, the SIB1-NB may be transmitted based on a cell ID and an SIB1-NB repetition number like FIGS. 8 and 10.

Interference between cells may be avoided like the existing FDD with respect to repetition numbers 4 and 8.

In contrast, if the repetition number is 16, an SIB1-NB may act as interference between a cell having an odd number cell ID and a cell having an even-numbered cell ID.

Furthermore, the starting radio frame number of SIB1-NB transmission may be configured like Table 37.

(2) When an SIB1-NB is Selectively Transmitted in One or More Subframe Indices

Information that determines a subframe index at which an SIB1-NB is actually transmitted among one or more subframe indices may be directly indicated as specific information indicated in an MIB-NB (e.g., there may be information that explicitly provides notification of the location of a subframe index or a parameter associated with some information of an UL/DL configuration along with the information (or solely) or may be configured so that subframe index information indicated in an MIB-NB is differently interpreted based on a cell ID.

Characteristically, an SIB1-NB may have a form in which it is always transmitted in a subframe #0 in which an NSSS is not transmitted on an anchor-carrier and a subframe index indicated in an MIB-NB is additionally transmitted in an indicated subframe.

A subframe index at which an SIB1-NB may be transmitted may be #0, 4, 8 and 6. A subframe index at which an SIB1-NB is actually transmitted may be selected (or indicated) using the above-described method.

A subframe index at which an SIB1-NB is actually transmitted may be associated with information of an UL/DL configuration.

In this case, a user equipment may derive an SIB1-NB transmission subframe index from some of UL/DL configuration information provided in an MIB-NB or the user equipment may analogize some of UL/DL configuration information from an SIB1-NB transmission subframe index indicated in an MIB-NB.

For example, in an UL/DL configuration #1, an SIB1-NB may be transmitted in a subframe #0 or #4 only. In UL/DL configurations #2 to #5, an SIB1-NB may be transmitted in a subframe #0 or #8 (or #6 not #8) only.

If an UL/DL configuration #6 is supported, an SIB1-NB may be transmitted only in a subframe #0 in which an NSSS is not transmitted. A repetition number 16 may not be supported.

Furthermore, the starting radio frame number of SIB1-NB transmission may be configured like Table 37.

If some of UL/DL configuration information is indicated within an MIB-NB and the number of subframe indices in which an SIB1-NB may be transmitted from some information of an UL/DL configuration that may be aware by a user equipment from corresponding information is greater than one, a subframe index at which an SIB1-NB is actually transmitted in may be selected as cell ID a corresponding cell.

As a simple example, when an SIB1-NB is transmitted in one of two subframe indices based on a cell ID, a subframe index may be determined depending on whether "((cell_ID-(cell_ID%NRep))/NRep)%2" is 0 or 1.

If an SIB1-NB transmitted in an anchor-carrier may be transmitted in a subframe #0 or subframe #4 and a subframe index may be indicated in an MIB-NB, a starting radio frame number/index at which an SIB1-NB repetition starts within 2560 msec may be defined like Table 38.

Furthermore, this may be limited to only a case where the SIB1-NB repetition number is 16.

That is, a user equipment may obtain information indicating that an SIB1-NB is transmitted in the place (e.g., subframe #4) not the subframe #0 through the MIB-NB, and may be then aware of a radio frame index at which the SIB1-NB transmission starts based on the cell ID of a corresponding cell.

In contrast, if information indicating that an SIB1-NB is transmitted in a subframe #0 is obtained through the MIB-NB and an SIB1-NB repetition number is 16, SIB1-NB transmission may be assumed to always start from a No. 1 radio frame number within 2560 msec regardless of a cell ID as in Table 37.

In other words, when an SIB1-NB is transmitted on an anchor-carrier and a repetition number is 16, a radio frame index at which SIB1-NB transmission starts may be differently interpreted depending on whether a subframe index at which the SIB1-NB is transmitted is #0 or #4.

As a corresponding example, Table 37 (when an SIB1-NB is transmitted in a subframe #0) and Table 38 (when an SIB1-NB is transmitted in a subframe #4) may be taken into consideration.

2. When an SIB1-NB is Transmitted on a Non-Anchor Carrier Only

The number of subframes used for SIB1-NB transmission in a specific section may be N times greater than a value when an SIB1-NB is transmitted on an anchor-carrier.

The reason for this is that power boosting of a non-anchor carrier may be difficult to apply compared to an anchor-carrier.

N may be determined by downlink transmit power of an anchor-carrier and downlink transmit power of a non-anchor carrier on which an SIB1-NB is transmitted.

If the relation between downlink transmit power of a carrier on which an SIB1-NB is transmitted and downlink transmit power of an anchor-carrier is notified in an MIB-NB, N may be derived or analogized from corresponding information.

Alternatively, in contrast, the N value may be notified in an MIB-NB, and the relation between downlink transmit power of a carrier on which an SIB1-NB is transmitted and downlink transmit power of an anchor-carrier may be derived (or analogized).

In this case, "the number of subframes used for SIB1-NB transmission within a specific section" is value or concept corresponding to an "SIB1-NB repetition number."

The "SIB1-NB repetition number" indicates the number of an SIB1-NB transmission time interval (TTI) number used for SIB1-NB transmission by a specific cell within an SIB1-NB modification period.

"The number of subframes used for SIB1-NB transmission within a specific section" indicates the number of subframes used for SIB1-NB transmission within a specific absolute time interval (e.g., 160 msec or 40.96 sec).

N of subframe indices #0, #5, #9 may be selected as a subframe index at which an SIB1-NB may be transmitted and used.

For example, in the case of N2, the subframe indices #0 and 9 may be used. In the subframe indices #0 and #9, radio frame numbers may be selected as an odd number and an even number, respectively, in order to contiguously transmit the SIB1-NB.

In this case, if system frame number (SFN) information of the SIB1-NB transmitted in different radio frames is different and corresponding information is included in some of the SFN information of SIB1-NB contents, the SFN of a radio frame in which a specific first or last SIB1-NB starts to be transmitted may be a basis.

Alternatively, subframe indices #0 and #5 not used as a multimedia broadcast multicast service single frequency network (MBSFN) subframe may be used.

The N2 means a case where an SIB1-NB repetition number indicated within an MIB-NB is interpreted as being a twice-times greater value when an SIB1-NB is transmitted on a non-anchor carrier.

That is, the SIB1-NB repetition number indicated within an MIB-NB is the repetition number of an SIB1-NB when an SIB1-NB is transmitted on an anchor carrier.

If an SIB1-NB is transmitted on a non-anchor carrier, the repetition number of the SIB1-NB indicated in an MIB-NB may be differently interpreted.

Likewise, in the case of N4, corresponding information is interpreted as being four times greater. Such a series of procedure and interpretation may be different depending on whether the location of a carrier on which an SIB1-NB is transmitted is an anchor-carrier or a non-anchor carrier, how far is an SIB1-NB relatively positioned from an anchor-carrier when it is transmitted on a non-anchor carrier (e.g., whether it is a PRB interval smaller than X) or an operation mode.

In this case, the operation mode may be the operation mode of an anchor-carrier, may be the operation mode of a non-anchor carrier in which the SIB1-NB is transmitted, or may be a combination of the operation modes of an anchor-carrier and a non-anchor carrier in which the SIB1-NB is transmitted.

As a simple example, it may be N2 (N=2) when a non-anchor carrier on which an SIB1-NB is transmitted is an inband operation mode, and may be N4 (N=4) when a non-anchor carrier on which an SIB1-NB is transmitted is a guardband operation mode.

In this case, in the case of N4, a subframe index at which the SIB1-NB may be transmitted may be a subframe #0, #4, #5, #9.

In the case of the N2 and N4, the number of subframes used to transmit an SIB1-NB transport block (TB) once needs to be maintained to 8. An SIB1-NB transmission period needs to be fixed to 2560 msec.

To this end, the number of radio frames used to transmit an SIB1-NB may be different.

That is, the number of subframes used for SIB1-NB transmission within one radio frame may be 2 (in the case of N2) or 4 (in the case of N4).

In the case of N2, characteristically, neighbor subframes used for SIB1-NB transmission may be present in different radio frames.

If the number of subframes used for SIB1-NB transmission within a radio frame is different as described above, the starting index of the radio frame used for SIB1-NB transmission may be differently defined.

As a simple example, a radio frame number (nf mod 256) value for the NB-SIB1 repetitions of Table 38 may be different.

In the case of N2, it is simply given as (start radio frame number value of Table 37 defined based on an SIB1-NB repetition number and a cell ID−1)/2 or (start radio frame number value of Table 37 defined based on an SIB1-NB repetition number and a cell ID−1)/2+1, and an SIB1-NB transmission window may be defined as 80 msec.

As a similar method, in the case of N4, it is simply given as (start radio frame number value of Table 38 defined based on an SIB1-NB repetition number and a cell ID−1)/4 or (start radio frame number value of Table 38 defined based on an SIB1-NB repetition number and a cell ID−1)/4+1. An SIB1-NB transmission window may be defined as 40 msec.

Although an SIB1-NB is transmitted on a non-anchor carrier, if an SIB1-NB repetition number is the same as that of an anchor-carrier, the same start radio frame number as that of Table 38 may be used or the start radio frame number value of Table 38-1 may be defined.

The above contents may be represented like Table 39, Table 40 and Table 41 in a table form.

In each table, the number of NPDSCH repetitions is the repetition number of an SIB1-NB transmitted on a non-anchor carrier. This is a value derived from the SIB1-NB repetition number of an MIB-NB.

If an SIB1-NB is transmitted in N subframes within one radio frame, in the SIB1-NB transmitted in the N-times subframes, as in FIG. 10, there may be (1) a method of sequentially transmitting A to H sub-blocks and (2) a method of contiguously transmitting each sub-block in a subframe N times (or value greater than 1) and contiguously transmitting a next sub-block N times.

In this case, the A to H sub-blocks indicate a unit in which the sub-block is transmitted in one subframe at the circular-buffer output of an SIB1-NB codeword.

If a specific sub-block is repeatedly transmitted as in the method of (2), there may be a disadvantage in that inter-cell interference occurs.

Accordingly, although sub-blocks are transmitted within the same radio frame, scrambling needs to be differently applied.

For example, in the current scrambling equation $c_{init} = n_{RNTI} \cdot 2^{15} + (N_{ID}^{Ncell} + 1)((n, \mod 61) + 1)$, when sub-blocks are repeatedly transmitted within the same radio frame, scrambling between the sub-blocks may be modified to be differently applied although a radio frame number and nRNTI, $N_{ID}^{Ncell}$, nf are the same.

For example, scrambling may be defined as a different cinit having a specific offset between subframes.

Alternatively, scrambling may be performed in a form phase-rotated in an I/Q-level for each RE between sub-blocks (subframes) repeatedly transmitted within the same radio frame.

This may be similar to or identical with a method of applying the phase-rotation of an I/O-level in an NPBCH (e.g., the first equation in 10.2.4.4 of TS.36.211).

$$\theta_f(i) = \begin{cases} 1, & \text{if } c_f(2i) = 0 \text{ and } c_f(2i+1) = 0 \\ -1, & \text{if } c_f(2i) = 0 \text{ and } c_f(2i+1) = 1 \\ j, & \text{if } c_f(2i) = 1 \text{ and } c_f(2i+1) = 0 \\ -j, & \text{if } c_f(2i) = 1 \text{ and } c_f(2i+1) = 1 \end{cases} \quad \text{[Equation 21]}$$

A scrambling sequence $c_f(j)$, j=0, . . . , 199 is given in 7.2 of TS 36.211.

3. When an SIB1-NB is Transmitted on Both an Anchor-Carrier and a Non-Anchor Carrier A subframe index at which SIB1-NB is transmitted may be configured to not overlap between an anchor-carrier and a non-anchor carrier.

Alternatively, although subframe indices are the same, actually transmitted radio frames may be configured to be different.

This may be for providing a user equipment with a change to improve performance by receiving both SIB1-NBs transmitted on an anchor-carrier and a non-anchor carrier.

The "1. when an SIB1-NB is transmitted on an anchor carrier only" and the "2. when an SIB1-NB is transmitted on a non-anchor carrier only" may be extended and applied with respect to each anchor-carrier and non-anchor carrier.

FIG. 10 is a diagram showing an example of the transmission location of an SIB1-NB proposed in this specification.

In this case, a drawing corresponding to FIG. 10 is large and thus divided into FIGS. 10a, 10b and 10c, and FIGS. 10a, 10b and 10c are drawings completing the one drawing.

FIGS. 11 and 12 show examples of the transmission location of an SIB1-NB according to a repetition number proposed in this specification.

Specifically, FIG. 11 is a diagram showing an example of the transmission location of an SIB1-NB when the repetition number is 4, and FIG. 12 is a diagram showing an example of transmission location of an SIB1-NB when the repetition number is 8.

Table 37 is a table showing the location of a starting radio frame for the first transmission of an NPDSCH on which an SIB1-NB is carried.

TABLE 37

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 1 |
|   | $N_{ID}^{Ncell}$ mod 4 = 1 | 17 |
|   | $N_{ID}^{Ncell}$ mod 4 = 2 | 33 |
|   | $N_{ID}^{Ncell}$ mod 4 = 3 | 49 |
| 8 | $N_{ID}^{Ncell}$ mod 2 = 0 | 1 |
|   | $N_{ID}^{Ncell}$ mod 2 = 1 | 17 |
| 16 | $N_{ID}^{Ncell}$ mod 2 = 0 | 1 |
|   | $N_{ID}^{Ncell}$ mod 2 = 1 | 1 |

Table 38 is a table showing an example of a starting radio frame for the first transmission of an NPDSCH on which an SIB1-NB is carried.

TABLE 38

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 1 |
|   | $N_{ID}^{Ncell}$ mod 4 = 1 | 17 |
|   | $N_{ID}^{Ncell}$ mod 4 = 2 | 33 |
|   | $N_{ID}^{Ncell}$ mod 4 = 3 | 49 |
| 8 | $N_{ID}^{Ncell}$ mod 2 = 0 | 1 |
|   | $N_{ID}^{Ncell}$ mod 2 = 1 | 17 |
| 16 | $N_{ID}^{Ncell}$ mod 2 = 0 | 0 (or 1) |
|   | $N_{ID}^{Ncell}$ mod 2 = 1 | 1 (or 0) |

Table 39 is a table showing an example of a starting radio frame for the first transmission of an NPDSCH on which an SIB1-NB is carried.

TABLE 39

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 1 (or 0) |
|   | $N_{ID}^{Ncell}$ mod 4 = 1 | 17 (or 16) |
|   | $N_{ID}^{Ncell}$ mod 4 = 2 | 33 (or 32) |
|   | $N_{ID}^{Ncell}$ mod 4 = 3 | 49 (or 48) |
| 8 | $N_{ID}^{Ncell}$ mod 2 = 0 | 1 (or 0) |
|   | $N_{ID}^{Ncell}$ mod 2 = 1 | 17 (or 16) |
| 16 | $N_{ID}^{Ncell}$ mod 2 = 0 | 0 (or 1) |
|   | $N_{ID}^{Ncell}$ mod 2 = 1 | 1 (or 0) |

Table 40 is a table showing another example of a start radio frame for the first transmission of an NPDSCH on which an SIB1-NB is carried.

TABLE 40

| Number of NPDSCH repetitions | $N_{ID}^{Ncell}$ | Starting radio frame number for NB-SIB1 repetitions (nf mod 128) |
|---|---|---|
| 8 | $N_{ID}^{Ncell}$ mod 4 = 0 | 1 (or 0) |
|   | $N_{ID}^{Ncell}$ mod 4 = 1 | 9 (or 8) |
|   | $N_{ID}^{Ncell}$ mod 4 = 2 | 17 (or 16) |
|   | $N_{ID}^{Ncell}$ mod 4 = 3 | 25 (or 24) |
| 16 | $N_{ID}^{Ncell}$ mod 2 = 0 | 1 (or 0) |
|   | $N_{ID}^{Ncell}$ mod 2 = 1 | 9 (or 8) |
| 32 | $N_{ID}^{Ncell}$ mod 2 = 0 | 0 (or 1) |

Table 41 is a table showing another example of a start radio frame for the first transmission of an NPDSCH on which an SIB1-NB is carried.

TABLE 41

| Number of NPDSCH repetitions | $N_{ID}^{Ncell}$ | Starting radio frame number for NB-SIB1 repetitions (nf mod 64) |
|---|---|---|
| 16 | $N_{ID}^{Ncell}$ mod 4 = 0 | 1 (or 0) |
|   | $N_{ID}^{Ncell}$ mod 4 = 1 | 5 (or 4) |
|   | $N_{ID}^{Ncell}$ mod 4 = 2 | 9 (or 8) |
|   | $N_{ID}^{Ncell}$ mod 4 = 3 | 13 (or 12) |
| 32 | $N_{ID}^{Ncell}$ mod 2 = 0 | 1 (or 0) |
|   | $N_{ID}^{Ncell}$ mod 2 = 1 | 5 (or 4) |
| 64 | $N_{ID}^{Ncell}$ mod 2 = 0 | 0 (or 1) |

FIG. 13 is a diagram showing an example of the codeword and resource mapping of an SIB1-NB proposed in this specification.

The location and repetition number of a subframe and/or radio frame in which an SIB1-NB is transmitted may be differently interpreted depending on an operation mode of a carrier on which an SIB1-NB is transmitted.

That is, the location of a subframe and/or radio frame in which an SIB1-NB is transmitted may be different depending on a cell ID and repetition number.

This is provided in an MIB-NB, but may be differently interpreted when an SIB1-NB is transmitted on a non-anchor carrier.

Furthermore, a repetition number indicated in an MIB-NB may be differently interpreted depending on the operation mode of a non-anchor carrier on which an SIB1-NB is transmitted (e.g., a value two times greater than a repetition number indicated by an MIB-NB).

The location of a subframe and/or radio frame in which an SIB1-NB is transmitted may be differently interpreted for each operation mode.

In this case, "for each operation mode" includes the operation mode of an anchor-carrier and the operation mode of a non-anchor carrier on which an SIB1-NB is actually transmitted.

For example, when an anchor carrier is an in-band operation mode, but an SIB1-NB is transmitted on the same carrier, the repetition number is interpreted as one value of {4, 8, 16}.

However, when an SIB1-NB is transmitted on a non-anchor carrier and the corresponding non-anchor carrier is the in-band operation modem, the repetition number may be interpreted as one value of {8, 16, 32}.

Furthermore, when an SIB1-NB is transmitted on a non-anchor carrier and the corresponding non-anchor carrier is the guard band operation mode, the repetition number may be interpreted as one value of {2, 4, 8}.

Subframe in which an NRS Cannot be Expected without System Information

Third, the location of a subframe in which an NRS cannot be always expected without system information is described.

In order to improve demodulation performance of a signal received in a specific subframe, there is a need for cross-subframe channel estimation for estimating a channel using a subframe in which the corresponding signal is received and an NRS included in a preceding and/or following subframe. In particular, when a user equipment receives an MIB-NB and an SIB1-NB without system information, there may be a need for a subframe definition in which an NRS can always be expected even in a subframe not a subframe in which the MIB-NB and the SIB1-NB are transmitted.

The location of a subframe in which an NRS can always be expected as described above is referred to as a "default subframe."

This may be different from downlinkBitmap information configured as an SIB1-NB or other SIBx-NB, or RRC.

First, a default subframe that may be assumed by a user equipment before it detects an MIB-NB may be a subframe #0 and subframe #9 in which the NSSS of an anchor-carrier is not transmitted.

This may not have a relation with whether an SIB1-NB is actually transmitted on an anchor carrier.

A default subframe that may be assumed by a user equipment before it detects an SIB1-NB after an MIB-NB is detected may be divided as follows and differently determined.

1. When an SIB1-NB is Transmitted on an Anchor Carrier

In this case, a default subframe that may be assumed by a user equipment may be a subframe #0 and subframe #9 in which the NSSS of an anchor-carrier is not transmitted, like a default subframe that may be assumed by a user equipment before it detects an MIB-NB.

If some information corresponding to an UL/DL configuration cannot be additionally obtained from an MIB-NB, some subframe may be additionally included as a default subframe characteristically in the corresponding UL/DL configuration.

For example, some subframe may be one of subframes #4, #6 and #8.

This may be derived from some information of an UUDL configuration as described above.

Alternatively, some subframe may be explicitly notified in an MIB-NB.

In this case, a user equipment may assume a default subframe only within an SIB1-NB TTI and/or an SIB1-NB transmission window (160 msec) and/or a radio frame in which a corresponding cell is expected to transmit an SIB-NB.

Alternatively, the corresponding subframe may be explicitly notified directly within an MIB-NB.

Furthermore, the user equipment may expand some section a little ahead of/behind a limited specific section which may include the above-described default subframe, and may expect the default subframe.

A subframe in which a user equipment may expect an NRS in an anchor-carrier may be divided into several steps based on information obtained by a user equipment as follows.

1) Before a User Equipment Obtains operationModeInfo

A subframe in which a user equipment may expect NRS reception before it completes NPBCH detection although it has detected a TDD NB-IoT cell is a subframe #9 and a subframe #0 in which an NSSS is not transmitted.

If an NRS may be always transmitted in a specific pattern (e.g., when the NRS is transmitted in a third OFDM symbol) regardless of the number of DwTS symbols in the downlink pilot time slot (DwPTS) of a subframe #1, a user equipment may expect an NRS even in the DwPTS section of the corresponding subframe.

As a similar method, if an NRS may be always transmitted in a specific pattern regardless of an UL/DL configuration and a special subframe configuration even in a subframe #6, a user equipment may expect an NRS in some OFDM symbols even in the corresponding subframe. This is applied regardless of a carrier on which an SIB1-NB is transmitted.

2) Before a User Equipment Obtains an SIB1-NB after it Obtains operationModeInfo As a method of notifying a user equipment of a subframe in which an NRS may be expected even in a subframe not subframes listed below before SIB1-NB information is obtained, the unused state(s) or unused bit(s) of an MIB-NB may be used.

A. When operationModeInfo Indicates an Inband

①  When an SIB1-NB is present in a subframe #0

An NRS may be expected in the subframe defined in the 1). The same is true of a case where an SIB1-NB is transmitted on a non-anchor carrier.

② In addition, when an SIB1-NB is present in a subframe #4

An NRS may be expected in the subframe defined in the 1). Additionally, an NRS may be expected even in the subframe #4.

The same is true of a case where an SIB1-NB is transmitted on a non-anchor carrier.

In this case, an NRS may be limited to be expected in the subframes #4 of all radio frames, an NRS may be limited to be expected in the subframe #4 of a radio frame in which an SiB12-NB is actually transmitted, an NRS may be limited to be expected only in the subframe #4 of a radio frame between former N radio frames of a radio frame in which an SiB12-NB is actually transmitted and the latter M radio frames of the radio frame in which the SiB12-NB is actually transmitted or an NRS may be limited to be expected only in the subframe #4 of a window section (160 msec, for example, in an anchor-carrier) in which an SIB1-NB TTS is divided into 8 subframes and transmitted. In this case, N and M are natural numbers.

When an SIB1-NB is transmitted in a subframe #4, it may be transmitted in an even-numbered radio frame or odd-numbered radio frame number based on a cell ID, as in Table 10 and FIG. 13.

This is possible only when an SIB1-NB repetition number is 16.

An example of A-1 and A-2 may be checked based on the location of a subframe including R in FIG. 14.

B. In Addition, when operationModeInfo Indicates a Guardband

In the inband operation mode of the A, a user equipment may expect an NRS using the same method at the location of a subframe in which the NRS may be expected.

In the case of the guardband operation mode, if a base station can always transmit an NRS in a specific OFDM symbol(s) in a control region within a DwPTS, a user equipment may expect an NRS in the corresponding OFDM symbol(s) even in the DwPTS of a subframe #1 in addition to the subframe of the A.

This may be identically applied to the standalone operation mode, but the location of an OFDM symbol(s) in which an NRS may be expected in the DwPTS may be different between the guardband and standalone operation modes.

If the location of a subframe in which an NRS may be transmitted within a DwPTS depending on the number of OFDM symbols within the DwPTS, the location of an OFDM symbol in which the NRS may be expected within the corresponding DwPTS may be indicated using some reserved or unused bit(s) within an MIB-NB.

In this case, some or all of 3 bits except rasterOffset-r13 of 2 bits in guardband-r13 of 5 bits may be used as an example of the unused bit(s).

Furthermore, the corresponding information may be differently interpreted and indicated when an SIB1-NB is transmitted on an anchor carrier and when an SIB1-NB is transmitted on a non-anchor carrier or depending on the number of unused bits used in the location of a subframe in which an SIB1-NB is transmitted or a different method (e.g., different table).

C. In Addition, when operationModeInfo is Indicated as Standalone

In the inband operation mode of the A, an NRS may be expected using the same method in the location of a subframe in which a user equipment may expect the NRS.

In the case of the standalone operation mode, if a base station can always transmit an NRS in a specific OFDM symbol(s) in a control region within a DwPTS, a user equipment may expect an NRS the corresponding OFDM symbol(s) even in the DwPTS of a subframe #1 in addition to the subframe of the A.

If the location of a subframe in which an NRS may be transmitted within a DwPTS may be different depending on the number of OFDM symbols within the DwPTS, the location of an OFDM symbol in which the NRS may be expected within the corresponding DwPTS may be indicated using some reserved or unused bit(s) within an MIB-NB.

In this case, some or all of 5 bits in the standalone-r13 field of 5 bits may be used as an example of an unused bit(s).

For example, the standalone operation mode may include a case where a DwPTS is not used in a special subframe. Accordingly, a case for identifying the example may be included, and some of unused bits may be used.

Furthermore, the unused bits may be used to indicate some of UL/DL configuration (including the UL/DL configuration of the existing LTE and an UUDL configuration added in the TDD LTE standalone mode) information in the standalone mode.

That is, although an UL/DL configuration has not been clearly indicated, if there is a subframe in which an NRS may be additionally expected depending on the UUDL configuration, some information of the UL/DL configuration may be indicated using unused bits in order to identify the subframe.

Furthermore, the corresponding information may be differently interpreted and indicated when an SIB1-NB is transmitted on an anchor carrier and when an SIB1-NB is transmitted on a non-anchor carrier or depending on the number of unused bits used in the location of a subframe in which an SIB1-NB is transmitted or a different method (e.g., different table).

FIG. 14 is a diagram showing an example of the location of a subframe in which an NPSS/NSSS/NPBCH/SIB1-NB is transmitted on an anchor-carrier proposed in this specification.

FIG. 15 is a diagram showing another example of the location of a subframe in which an NPSS/NSSS/NPBCH/SIB1-NB/NRS is transmitted on an anchor carrier proposed in this specification.

In this case, the drawing corresponding to FIG. 15 is large and thus divided into FIGS. 15a, 15b, 15c and 15d. FIGS. 15a, 15b, 15c and 15d are drawings completing the one drawing.

2. When an SIB1-NB is Transmitted on a Non-Anchor Carrier

In this case, a default subframe that may be assumed by a user equipment may be indicated in an MIB-NB or may be all the subframes #0, #5, #9 of a carrier on which an SIB1-NB derived based on the indication of an MIB-NB, a cell ID, etc. is transmitted or may be #0 and #5.

Furthermore, the default subframe may be dependently determined by the location of a subframe in which an SIB1-NB is transmitted.

The default subframe may be the subframes #0, #5 and #9 included in some section in a time before and after the subframe in which an SIB1-NB is transmitted, including the subframe in which an SIB1-NB is transmitted.

Furthermore, a user equipment may assume a default subframe only within an SIB1-NB TTI and/or an SIB1-NB transmission window (160 msec) and/or a radio frame in which a corresponding cell expects to transmit an SIB-NB.

Alternatively, a default subframe may be explicitly notified in an MIB-NB.

Furthermore, a user equipment may expand some section a little ahead of/behind a limited specific section that may include the above-described default subframe, and may expect the default subframe.

Furthermore, if some information corresponding to an UL/DL configuration may be additionally obtained in an MIB-NB, some subframes may be additionally included in the default subframe characteristically in the corresponding UL/DL configuration.

For example, some subframe may be one of subframes #4, #6 and #8.

As described above, some subframe may be derived from some information of an UL/DL configuration or may be explicitly notified directly in an MIB-NB.

A subframe in which a user equipment may expect an NRS on a non-anchor carrier on a non-anchor carrier on which an SIB1-NB is transmitted is as follows. In this case, since the location of the carrier on which the SIB1-NB is transmitted is indicated in an MIB-NB, it is assumed that the user equipment has obtained information on the location of the carrier on which the SIB1-NB is transmitted, the number of SIB1-NB repetitions, the location of a radio frame in which the SIB1-NB is transmitted, the location of a subframe in which the SIB1-NB is transmitted, along with all types of information on the MIB-NB.

1) After a User Equipment Obtains operationModeInfo and Before the User Equipment Obtains an SIB1-NB When an SIB1-NB is transmitted on a non-anchor carrier, the location of a subframe and radio frame used for SIB1-NB transmission may be different depending on the number of SIB1-NB repetitions.

It is evident that a user equipment can expect an NRS in a subframe used for SIB1-NB transmission on a non-anchor carrier because information on the location is obtained from an MIB-NB.

Furthermore, an NRS may be expected regardless of the location of a radio frame and subframe in which an SIB1-NB is transmitted in subframes #5, #0 and #9 used for NPSS, NSSS and MIB transmission on an anchor carrier.

Furthermore, in the case of the standalone operation mode, a user equipment may additionally expect an NRS even in subframes #4 and #8.

Furthermore, a user equipment may expect an NRS in a DwPTS section. In this case, the above-described method (method of expecting an NRS in the DwPTS section when an SIB1-NB is transmitted on an anchor-carrier) may be identically used with respect to a case regarding whether an NRS may be expected depending on an operation mode or a case where an NRS may be expected in which OFDM symbol within a DwPTS.

The above-described subframe in which an NRS may be expected may be identically applied for each radio frame, or may be limited to one subframe belonging to a radio frame in which an SIB1-NB is transmitted, or may be limited so that an NRS can be expected only within a radio frame between former N radio frames of a radio frame in which an SiB12-NB is actually transmitted and latter M radio frames of a radio frame in which an SiB12-NB is actually transmitted, or may be limited so that an NRS can be expected only in the subframe of a window section (160 msec, in an anchor-carrier, for example) in which an SIB1-NB TTS is divided into 8 subframes and transmitted.

This may be differently applied depending on a subframe number in which an NRS may be expected and an operation mode. In this case, N and M are natural numbers.

3. When an SIB1-NB is Transmitted on Both an Anchor-Carrier and a Non-Anchor Carrier In this case, a default subframe may follow the (1) method on an anchor carrier that may be assumed by a user equipment, and a default subframe may follow the (2) method on a non-anchor carrier on which an SIB1-NB is transmitted.

In this case, when an SIB1-NB is not transmitted on an anchor carrier, if both a "case where an SIB1-NB is transmitted on a non-anchor carrier" and a "case where an SIB1-NB is transmitted on both an anchor-carrier and a non-anchor carrier" can be configured in an MIB-NB, a default subframe that may be expected by a user equipment on a non-anchor carrier on which an SIB1-NB is transmitted may be different between the "case where an SIB1-NB is transmitted on a non-anchor carrier" and the "case where an SIB1-NB is transmitted on both an anchor-carrier and a non-anchor carrier".

When the remaining SIB-NBs (called SIBx-NBs) other than an SIB1-NB is transmitted on a non-anchor carrier, a subframe section in which a user equipment may expect an NRS may be defined differently from a subframe section when an SIB1-NB is transmitted on a non-anchor carrier.

The reason for this is that in the TDD system, an SIB1-NB is not transmitted in contiguous subframes, but an SIBx-NB is transmitted in a downlink subframe in which the same TBS is contiguous (valid).

That is, although a valid subframe is contiguously present, an SIB1-NB itself is transmitted in a non-contiguous subframe, but an SIBx-NB is contiguously transmitted in a valid subframe. Accordingly, an NRS may be expected within multiple subframes in which the SIBx-NB is transmitted.

Furthermore, an NRS may be additionally expected to be permitted in some N1, N2 (valid) subframes ahead of/behind contiguous subframes in which an SIBx-NB is transmitted for cross-subframe channel estimation.

This is a purpose similar to that a user equipment always does not expect an NRS in a valid subframe on a non-anchor carrier and can expect an NRS only in some (valid) subframe sections ahead of/behind a (contiguous) subframe in which an NPDCCH(/NPDSCH) reception is expected.

Message Interpretation and Configuration of SIB1-NB

Fourth, a method of interpreting and configuring the message of an SIB1-NB is described.

In a TDD NB-IoT system, an SIBx-NB may be transmitted in a third carrier not an anchor-carrier.

In this case, the third carrier is a non-anchor carrier or means a specific carrier or PRB location that is not used by corresponding cell for NPSS/NSSS/NPBCH transmission, but satisfies an anchor carrier raster offset condition.

Furthermore, a TDD system used in this specification is an unpaired system or may be interpreted as the same meaning as a system having the frame structure type 2.

A case where an SIBx-NB is transmitted on a third carrier may be divided as follows. In each case, the message interpretation and configuration of an SIB1-NB and an operation procedure of a user equipment may follow different methods.

1. An SIB1-NB is transmitted on an anchor carrier, but the remaining other SIBx-NBs may be transmitted on a third carrier not an anchor-carrier.

2. An SIB1-NB may be transmitted on a third carrier, and the remaining other SIBx-NBs may be transmitted on the same carrier as an SIB1-NB.

3. An SIB1-NB may be transmitted on a third carrier and the remaining other SIBx-NBs may be transmitted on a carrier different from that of an SIB1-NB.

In this case, the SIBx-NB may be permitted to be transmitted on an anchor carrier.

Position information of the carrier of the SIB1-NB and location information of the remaining other SIBx-NB carriers in the above 1. To 3. May be included in each MIB-NB and SIB1-NB.

The MIB-NB and the SIB1-NB may not be transmitted using sufficient downlink resources like the remaining other SIBx-NB. Accordingly, they are not notified as a channel number of a form, such as ARFCN-ValueEUTRA, and the location of the carrier in which the SIB1-NB is transmitted may be defined as a relative PRB location with an anchor-carrier (one of one or more pre-determined offset values).

The location of a carrier in which the remaining SIBx-NBs are transmitted may be defined as a relative PRB location with an anchor-carrier (one of one or more pre-determined offset values, and the range of the offset value may be the same as or different from the range of an offset value for providing notification of an SIB1-NB transmission location) or may be defined as a relative PRB location with a carrier on which an SIB1-NB is transmitted.

In this case, when an SIB1-NB is transmitted on both an anchor-carrier and a non-anchor carrier, a relative PRB location with the anchor-carrier may be first notified.

In general, this may be different from the use of a channel number of a form, such as ARFCN-ValueEUTRA, when a non-anchor carrier is configured in an NB-IoT system.

When an SIB1-NB is transmitted on a third carrier, it may be necessary to identify whether some of the message of the SIB1-NB is information on an anchor-carrier or information on the third carrier on which the SIB1-NB is transmitted.

That is, some information (type-A) may be interpreted by applying it to an anchor-carrier and the third carrier on which the SIB1-NB is transmitted in common. Some information (type-B) may be interpreted by applying it to only the third carrier on which the SIB1-NB is transmitted.

If a specific identical parameter of the type-A information is not applied to an anchor-carrier and a third carrier on which an SIB1-NB is transmitted in common, but is to be separately applied to the third carrier on which an SIB1-NB is transmitted, another corresponding specific identical parameter may be further included and configured in a message.

As described above, if another specific identical parameter is further present in the type-A and is to be defined as a value different from that of an anchor-carrier in which a third carrier on which an SIB1-NB is transmitted, a message in which such an operation is permitted is called a type-C.

If only one value is allocated to a parameter present in Type-C, like Type-A, this is applied to an anchor-carrier and a third carrier on which an SIB1-NB is transmitted in common and interpreted.

If two values are allocated to a parameter present in Type-Cm one value is applied to an anchor-carrier and the remaining one value is applied to a third carrier on which an SIB1-NB is transmitted.

Furthermore, when an SIB1-NB schedules the remaining other SIBx-NBs, if the SIB1-NB schedules the remaining other SIBx-NBs as a third carrier different from that of the SIB1-NB, a similar issue may occur again.

That is, if an SIB1-NB wants to indicate a specific parameter as a separate value based on a carrier on which an SIBx-NB is transmitted, it may be identified as a message of Type-B or Type-C.

That is, in the case of Type-B, a parameter is directly transferred with respect to the carrier of an SIBx-NB scheduled by an SIB1-NB. In the case of Type-C, if a parameter is applied to all of an anchor-carrier and a third carrier on which an SIB1-NB is transmitted and a third carrier in which an SIBx-NB will be transmitted in common or values more than one value are present in a specific parameter, the parameter may be applied to the anchor-carrier, the third carrier on which an SIB1-NB is transmitted, and the third carrier on which an SIBx-NB is transmitted.

Such a problem does not occur in an FDD NB-IoT system up to Release 15.

The reason for this is that all types of system information are basically transmitted on an anchor-carrier.

For example, cellSelectionInfo information of an SIB1-NB is information related to the cell selection process of a user equipment.

The information may be a value always defined as the measurement of an anchor-carrier.

However, the information may be cell selection-related information based on a measurement value of a corresponding third carrier on which an SIB1-NB is transmitted in order to reduce the complexity of a user equipment (power consumption and time delay may also be included in the complexity) for frequency re-tuning into an anchor-carrier in order to measure radio resource management (RRM) or reference signal received power (RSRP) or reference signal received quality (RSRQ), etc. on the corresponding third carrier in which the user equipment has detected the SIB1-NB.

For example, downlinkBitmap information may indicate the valid or invalid of a subframe.

If the information is included in an SIB1-NB, corresponding downlinkBitmap information may be applied to all of an anchor-carrier and a third carrier on which an SIB1-NB is transmitted in common.

Alternatively, the downlinkBitmap information may be limited to be always applied to only an anchor-carrier.

Furthermore, if two types of downlinkBitmap information are present, one may be downlinkBitmap information for an anchor-carrier and the other may be downlinkBitmap information for a third carrier on which an SIB1-NB is transmitted.

If only one type of downlinkBitmap information is included, it may be assumed that an anchor-carrier and a third carrier on which an SIB1-NB is transmitted use the same downlinkBitmap information.

If an SIB1-NB schedules the remaining other SIBx-NBs in another third carrier, downlinkBitmap information may be applied again similar to the above case.

That is, if only one type of downlinkBitmap information is present within an SIB1-NB, the corresponding downlinkBitmap information may be applied to all of an anchor-carrier and a third carrier on which an SIB1-NB is transmitted and a third carrier on which an SIBx-NB is transmitted.

If only two types of downlinkBitmap are present, what each type of downlinkBitmap information indicates which carrier may be clearly included.

Alternatively, interpretation may be different depending on the location of a carrier on which an SIB1-NB is transmitted.

For example, when an SIB1-NB is transmitted on an anchor-carrier and the remaining SIBx-NBs are scheduled as another third carrier, the first downlinkBitmap may indicate information on the anchor-carrier and the other downlinkBitmap may indicate subframe information of a carrier on which the remaining SIBx-NBs are transmitted.

nrs-CRS-PowerOffset may also be applied in common between an anchor-carrier and a different carrier (carrier on which an SIB1-NB is transmitted and/or an SIBx-NB is transmitted) and interpreted using a method similar to or identical with the method of the above-described downlinkBitmap information.

In this case, information, such as nrs-CRS-PowerOffset, defines only an NRS and CRS power offset always in an anchor-carrier. In the remaining carriers, NRS power information may use a method of adding nrs-PowerOffsetNonAnchor to an SIB1-NB and independently providing notification of an NRS power offset between an anchor-carrier and a specific carrier.

Alternatively, with respect to a third carrier on which an SIB1-NB is transmitted or a third carrier on which the remaining SIBx-NB is transmitted, NRS power-related information may be defined and used as CRS-PowerOffset not nrs-PowerOffsetNonAnchor characteristically, and may be applied using a method similar to or identical with the above-described downlinkBitmap information.

The downlinkBitmap information, the nrs-PowerOffsetNonAnchor information, etc. may derive downlinkBitmap information, a nrs-PowerOffsetNonAnchor degree, etc. of a carrier on which system information is transmitted using a method similar to downlinkBitmapNonAnchor included in CarrierConfigDedicated-NB. That is, downlinkBitmapNonAnchor may be divided into useNoBitmap, useAnchorBitmap, explicitBitmapConfiguration information and may be notified.

In the case of useNoBitmap, all downlink subframes (may include some of or all the special subframe formats of a special subframe) of a corresponding carrier or an indicated carrier may be interpreted as valid downlink subframes.

In the case of useAnchorBitmap, valid downlink subframe information of a corresponding carrier or an indicated carrier may be interpreted as being the same as a value configured for an anchor-carrier.

explicitBitmapConfiguration may independently indicate valid downlink subframe information of a corresponding carrier or an indicated carrier directly.

A case where eutraControlRegionSize may be omitted when SIB1-NB is transmitted on a non-anchor carrier may be different.

In the case of the in-band operation mode, eutraControlRegionSize is transmitted in an SIB1-NB. If an SIB1-NB is transmitted on a non-anchor carrier and an anchor-carrier and the non-anchor carrier have different operation modes, eutraControlRegionSize may always need to be transmitted.

For example, if an anchor-carrier is an in-band operation mode and an SIB1-NB is transmitted in the non-anchor carrier of a guard-band, the SIB1-NB includes eutraControlRegionSize information, and eutraControlRegionSize may indicate the control region size of the anchor-carrier.

Furthermore, if an anchor-carrier is a guard band operation mode and an SIB1-NB is transmitted on the non-anchor carrier of an in-band, the SIB1-NB includes information of eutraControlRegionSize, and eutraControlRegionSize may be used to indicate the control region size of an in-band.

Furthermore, an SIB2-NB may configure a random access-related parameter, which includes information on an NPRACH and an NPDCCH search space for receiving random access response (RAR).

In the FDD NB-IoT system, NPRACH and NPDCCH search space information for a random access response (RAR) configured as an SIB2-NB is applied to only an anchor-carrier.

An SIB22-NB is used for a configuration so that random access can be performed in a non-anchor carrier (a series of processes of transmitting an NPRACH, receiving an RAR to the transmission, and then completing random access).

Furthermore, whether random access can be performed in a non-anchor carrier up to Release 14 is dependent on the capability of a user equipment.

Likewise, in the TDD NB-IoT system, whether random access can be performed in a non-anchor carrier is assumed to be the capability of a user equipment.

If the corresponding capability means only whether an NPRACH can be transmitted on a non-anchor carrier, an NPRACH parameter configured as an SIB2-NB may be interpreted as an anchor-carrier.

In this case, if an SIB1-NB and/or the remaining SIBx-NB have not been transmitted on an anchor carrier or a downlink subframe for RAR transmission is not sufficient in order to transmit system information, an NPDCCH search space for an RAR configured as an SIB2-NB may need to be configured as a third carrier not an anchor-carrier.

In a conventional technology, Msg.1 (NPRACH) transmission and Msg.3 transmission use the same carrier-A, and Msg.2 (RAR) reception and Msg.4 reception use the same carrier-B.

In this case, the carrier-A and the carrier-B may not be a 1-to-1 pair.

In this case, the carrier-A and the carrier-B could not be configured as a combination of an anchor-carrier and a non-anchor carrier.

In contrast, in the TDD NB-IoT system, an Msg.1 transmission carrier configured as an SIB2-NB as described above may be interpreted as an anchor-carrier, and a carrier in which Msg.2 is expected may be configured as a non-anchor carrier.

In this case, if a non-anchor carrier in which Msg.2 is expected is necessary, such non-anchor carrier information may need to be additionally included in Msg.2 information.

If non-anchor carrier information is not present, a user equipment may interpret that Msg.2 is expected in a carrier (i.e., an anchor-carrier in the example) corresponding to an Msg.1 carrier.

Furthermore, the Msg.1 transmission of a random access-related parameter configured in an SIB2-NB may be indicated as a specific non-anchor carrier.

In such a case, a TDD system may be applied only when the Msg.1 transmission of a user equipment is always possible in a non-anchor carrier.

Furthermore, the random access-related parameter configured in the SIB2-NB may include all of an anchor-carrier and a carrier on which an SIB1-NB has been transmitted and/or a carrier on which the SIB2-NB has been transmitted, and may be applied (a random access-related parameter for one carrier may be extended as a carrier unit or an independent random access-related parameter for each required carrier may be additionally configured/included).

In such a case, if both the SIB1-NB and the SIB2-NB are transmitted on an anchor carrier, this may be similar to the existing method in which an SIB2-NB configures random access only on an anchor carrier.

That is, system information may interpret that Msg.1 has been naturally configured in an anchor-carrier with respect to the anchor-carrier.

In such a case, Msg.2 may be indicated as a specific non-anchor carrier.

The reason for this is that most of downlink subframes may have been used in order to transmit the system information.

If one or more pieces of system information are not transmitted on an anchor-carrier, an SIB2-NB may be considered to have configured a random access-related parameter with respect to one or more carriers including an anchor-carrier.

In this case, a user equipment not supporting NPRACH transmission for a non-anchor carrier may limitedly interpret or first select the NPRACH transmission carrier of the SIB2-NB as an anchor-carrier only.

In contrast, even in such a case (not transmitting an NPRACH on a non-anchor carrier), Msg.2 may be configured to be received on a non-anchor carrier.

A user equipment capable of transmitting an NPRACH on a non-anchor carrier may interpret random access-related information configured in an SIB2-NB with respect to both an anchor-carrier and a non-anchor carrier.

Furthermore, a method of actually selecting an Msg.1 transmission carrier may operate like a method of selecting a specific probability (a method of stochastically selecting a carrier on which Msg.1 will be transmitted among an anchor-carrier and one or more non-anchor carriers in the existing SIB22-NB) as a method similar to the method of non-anchor NPRACH transmission of Rel.14.

If an anchor-carrier on which an NPSS, NSSS, NPBCH is transmitted is the guardband operation mode and an SIB1-NB is transmitted in a non-anchor of an inband same or different PCI mode, an MIB-NB may need to provide additional information on a non-anchor carrier on which an SIB1-NB is transmitted.

For example, if a non-anchor carrier on which an SIB1-NB is transmitted is the inband same PCI mode, eutra-CRS-SequenceInfo may be necessary.

Alternatively, in the case of the inband different PCI mode, eutra-NumCRS-Ports (or additionally rasterOffset) information may be additionally necessary.

Alternatively, such a parameter may be limited to a specific value (e.g., eutra-NumCRS-Ports may always be limited to the same value as an anchor-carrier and or 2 or 4).

An additional method of indicating the operation mode of a non-anchor carrier on which an SIB1-NB is transmitted may be necessary.

To this end, spare 3 bits of a Guardband-NB may be used.

For example, some state(s) of 8 states represented in 3 bits may indicate an operation mode when an SIB1-NB needs to be transmitted on a non-anchor carrier.

Furthermore, other some state(s) may represent the number of CRS antenna ports when a non-anchor carrier on which an SIB1-NB is transmitted is the in-band different PCI mode.

If a carrier on which an SIB1-NB is transmitted is represented as 2 bits in an MIB-NB, the A-state of 4 states (A, B, C, D) may mean that the SIB1-NB is transmitted on an anchor-carrier. The B-state of the 4 states may mean that the SIB1-NB is transmitted on a non-anchor carrier having an offset of X (e.g., 1 PRB) with respect to an anchor-carrier. The C-state of the 4 states may mean that the SIB1-NB is transmitted on a non-anchor carrier having an offset of Y (e.g., −X) with respect to an anchor-carrier. The D-state of the 4 states may mean that the operation mode of a non-anchor carrier on which the SIB1-NB is transmitted is different from the operation mode of an anchor-carrier.

In this case, D does not include a case where "an anchor-carrier is the inband same PCI mode and a non-anchor is the inband different PCI mode" or an opposite case.

In this case, the "anchor-carrier may indicate an inband same PCI mode and the non-anchor may indicate a guard-band mode" or the "anchor-carrier may indicate an inband different PCI mode and the non-anchor may indicate a guardband mode" or the "anchor-carrier may indicate a guardband mode and the non-anchor may indicate an inband same PCI guardband mode" or the "anchor-carrier may indicate a guardband mode and the non-anchor may indicate an inband same PCI guardband mode."

In this case, if an anchor-carrier is a guardband mode, there is a problem in whether a non-anchor carrier on which an SIB1-NB is transmitted is an inband same PCI mode or an inband different PCI mode cannot be represented.

One state or bit of the spare 3 bits of a Guardband-NB may be used as a method of solving this problem.

Furthermore, the remaining 7 states or 2 bits may be used to represent bandwidth information of a system.

Accordingly, if an NB-IoT user equipment can be aware of a system bandwidth, an accurate PRB location where an SIB1-NB is transmitted within an inband may be fixed to a specific location (e.g., a PRB closest to an anchor-carrier from the center of a system band).

If an anchor-carrier has an operation mode of an in-band same or different PCI operation mode and an SIB1-NB is transmitted in a guard-band, a user equipment receives the SIB1-NB by interpreting a carrier format indicator (CFI) as a guard-band mode.

That is, the user equipment may assume a CFI different from an operation mode indicated in an MIB-NB, and may receive the SIB1-NB.

For example, if an operation mode is an inband mode, a CFI that may be assumed by a user equipment prior to SIB1-NB detection is 3. If a carrier on which an SIB1-NB is transmitted is a guard-band (or if the carrier does not include an in-band), a CFI may be interpreted as "0" with respect to the carrier on which the SIB1-NB is transmitted.

An actual CFI of an anchor-carrier on which an MIB-NB is transmitted assumes a CFI notified in an SIB1-NB.

The transport block size (TBS) of an SIB1-NB may be differently interpreted depending on the operation mode of a carrier on which an SIB1-NB is transmitted.

That is, the SIB1-NB TBS is provided in an MIB-NB, but may be differently interpreted when an SIB1-NB is transmitted on a non-anchor carrier.

Furthermore, an SIB1-NB TBS indicated in an MIB-NB may be differently interpreted depending on the operation mode of a non-anchor carrier on which an SIB1-NB is transmitted.

In this case, "for each operation mode" includes the operation mode of an anchor-carrier and the operation mode of a non-anchor carrier on which an SIB1-NB is actually transmitted.

For example, when an anchor carrier is an in-band operation mode, but an SIB1-NB is transmitted on the same carrier, an SIB1-NB TBS is interpreted as a value indicated in an MIB-NB.

However, when an SIB1-NB is transmitted on a non-anchor carrier and the corresponding non-anchor carrier is an in-band operation mode, an SIB1-NB TBS may be interpreted as a value twice greater than a value indicated in an MIB-NB. When an SIB1-NB is transmitted on a non-anchor carrier and the corresponding non-anchor carrier is a guard band operation mode, an SIB1-NB TBS may be interpreted as a value four times greater than a value indicated in an MIB-NB.

When an SIB1-NB is transmitted on a non-anchor carrier, downlinkBitmap and nrs-CRS-PowerOffset transmitted in the SIB1-NB may be differently interpreted or differently applied or an additional parameter may need to be defined depending on a combination (pair) of an anchor-carrier and the non-anchor carrier on which the SIB1-NB is transmitted.

1. When a non-anchor carrier on which an SIB1-NB is transmitted is a guard band operation mode or a standalone operation mode, downlinkBitmap is applied to both an anchor-carrier and the corresponding non-anchor carrier.

2. When a non-anchor carrier on which an SIB1-NB is transmitted is an in-band operation mode, A. If an anchor-carrier is an in-band operation mode, ① downlinkBitmap is applied to both the anchor-carrier and the corresponding non-anchor carrier.

② nrs-CRS-PowerOffset is applied to the anchor carrier (or the corresponding non-anchor carrier).

③ "NRS power offset (between NRS and E-UTRA CRS)" information of the non-anchor carrier may be defined as a fixed value (may be different depending on an anchor carrier operation mode) or may be applied to the corresponding non-anchor carrier (or anchor-carrier) based on an additional other parameter.

In this case, the "NRS power offset" may be defined identically or similarly to nrs-CRS-PowerOffset or a relative power ratio may be defined between the NRSs of a corresponding non-anchor carrier (or anchor-carrier) of an anchor carrier (or corresponding non-anchor carrier).

B. If an anchor-carrier is a guard band operation mode,

① nrs-CRS-PowerOffset is applied to all of corresponding non-anchor carriers.

② downlinkBitmap is applied to the anchor carrier (or a corresponding non-anchor carrier).

In this case, a downlinkBitmap length may be permitted to be configured up to a maximum length in the inband operation mode.

In such a case, characteristically, in the guard band operation mode, downlinkBitmap information having the same period as the downlinkBitmap length may be applied to an anchor-carrier.

That is, downlinkBitmap may be applied to an anchor-carrier and a non-anchor carrier on which an SIB1-NB is transmitted as the same period and the same value.

"NB-IoT subframe (e.g., a subframe(s) indicated to be available in an NB-IoT in downlinkBitmap)" information of a non-anchor carrier may be defined as a fixed value (may be different depending on an anchor carrier operation mode) or may be applied to a corresponding non-anchor carrier (or anchor-carrier) by an additional other parameter.

In this case, the "NB-IoT subframe" may be defined identically with downlinkBitmap (or a format or the length of a bit map) or the length of a bitmap may be differently defined to indicate only a downlink subframe (or with respect to only a downlink and special subframe).

The reason for this is that since a purpose for declaring an UL invalid subframe as downlinkBitmap is enhanced interference mitigation and traffic adaptation (eIMTA) of an LTE system, if an UL subframe has a possibility that it may change into a DL subframe, an NB-IoT (or eMTC) system is prevented from using a corresponding subframe as an UL subframe, but such a characteristic is not different for each carrier in the same subframe.

When all the MIB-NB, SIB1-NB and SIB2-NB are not transmitted on an anchor carrier, nrs-Power transmitted in the SIB2-NB is differently interpreted or differently applied as follows depending on a combination (pair) of carriers used to transmit the MIB-NB and the SIB1-NB and the SIB2-NB or an additional parameter needs to be defined.

nrs-Power may mean the "downlink narrowband reference-signal EPRE" of an anchor-carrier regardless of the location of a carrier on which an SIB2-NB is transmitted (whether it is an anchor carrier, a carrier different from that of an SIB1-NB, etc.).

In this case, nrs-PowerOffsetNonAnchor information on a carrier on which an SIB2-NB is transmitted may also be included so that the NRSRP measurement value of the carrier on which the SIB2-NB is transmitted can be used to select CE levels (4 CE levels are present).

This is for minimizing an operation of moving, by a user equipment, NRSRP measurement used for CE level selection to an anchor-carrier again after the user equipment receives an SIB2-NB.

Of course, for the same purpose, nrs-Power means a "downlink narrowband reference-signal EPRE" at the location of a carrier on which the SIB2-NB is transmitted. Information on NRS power of an anchor-carrier may be transmitted through nrs-PowerOffsetNonAnchor.

If NRSRP measurement for CE level selection is based on a carrier on which an SIB2-NB is transmitted, nrs-Power included in the SIB2-NB may be "downlink narrowband reference-signal EPRE" information of the carrier on which the SIB2-NB is transmitted.

That is, the nrs-Power information may be "downlink narrowband reference-signal EPRE" information of an anchor-carrier or "downlink narrowband reference-signal EPRE" information of a non-anchor carrier depending on the carrier on which the SIB2-NB is transmitted.

The method has a difference in that unlike in FDD, a carrier used for CE level selection in the TDD NB-IoT system is a carrier on which an SIB2-NB is transmitted or uses both an anchor-carrier and a carrier on which an SIB2-NB is transmitted.

That is, a CE level may be selected based on an NRS transmitted on an anchor carrier depending on the location of a carrier on which an SIB2-NB is transmitted, or a CE level may be selected based on the NRS of a non-anchor carrier (on which an SIB2-NB is transmitted).

Operation Related to an RRM or CE Level Selection when System Information is Transmitted on Non-Anchor Carrier Fifth, an operation related to the RRM or CE level selection, etc. of a user equipment when system information is transmitted on a non-anchor carrier is described.

A user equipment needs to select a CE level before it performs a random access procedure.

This may be selected by comparing a measured value of RSRP with a value of rsrp-ThresholdsPrachInfoList in a random access-related parameter using an NRS (NSSS may be additionally used, but this may be different depending on whether a user equipment can be aware of a parameter related to the power offset relation of the NRS and the NSSS, etc. at a corresponding point of time).

In this case, in general, the RSRP measurement value using the NRS is possible only in an anchor-carrier.

However, when system information is not transmitted on an anchor-carrier, RSRP measurement may be performed in a carrier in which specific system information has been received.

That is, a user equipment may receive system information in a carrier not an anchor-carrier, and may not perform frequency re-tuning in an anchor-carrier for CE level selection or NPRACH power control.

In this case, system information may be an SIB1-NB or system information (e.g., may be an SIB2-NB or an SIB22-NB) that configures random access-related information.

Furthermore, if system information transmits Msg.1 on an anchor carrier although it is received on a non-anchor carrier, RSRP measurement for CE level selection and RRM may need to be performed on the anchor carrier.

DL/UL Non-Anchor Carrier Configuration

Sixth, the configuration of a DL/UL non-anchor carrier is described.

A frequency division duplex (FDD) system may configure DL and UL as respective non-anchor carriers.

However, in TDD, when a non-anchor carrier may be configured, DL and UL may be configured without a distinction.

That is, in TDD, both DL and UL may be configured in a corresponding carrier as one non-anchor carrier configuration because DL and UL are present as a TDM scheme in one carrier.

However, if a non-anchor carrier is configured in a PRB location (LTE inband center 6 RB) where a PSS/SSS is transmitted, only NB-IoT UL needs to be performed in the corresponding non-anchor carrier.

The reason for this is that an NB-IoT DL carrier configuration is not permitted in center 6 RBs in which a PSS and NSS, MIB are transmitted in FDD NB-IoT.

Accordingly, a user equipment receives a configuration for a non-anchor. If the location of the corresponding carrier overlaps center 6 RBs, the user equipment may be limited to expect only UL on the corresponding carrier.

The Number of NRS and CRS Ports for a Non-Anchor Carrier SIB1-NB

Seventh, when an SIB1-NB is transmitted on a non-anchor carrier, the numbers of NRS and CRS ports is described.

If an anchor carrier is a guard band operation mode and a non-anchor carrier on which an SIB1-NB is transmitted is an in-band operation mode, a user equipment requires NRS port number and CRS port number information for SIB1-NB decoding.

This may be differently defined or assumed depending on whether the in-band operation mode is same-PCI or different-PCI.

1) If a Non-Anchor Carrier on which an SIB1-NB is Transmitted is an In-Band Same PCI Mode The numbers of NRS and CRS ports of the corresponding non-anchor carrier are the same as the number of NRS ports of an anchor-carrier.

The reason for this is that the numbers of NRS and CRS ports have been assumed to be the same in the case of an in-band same PCI mode in the existing FDD NB-IoT. In TDD, the same method may be applied.

2) If a Non-Anchor Carrier on which an SIB1-NB is Transmitted is an In-Band Different PCI Mode The number of NRS ports of the corresponding non-anchor carrier is the same as the number of NRS ports of an anchor-carrier. The number of CRS ports of the corresponding non-anchor carrier may be assumed to be 4.

That is, a user equipment assumes the number of CRS ports of a corresponding non-anchor carrier to be 4 before SIB1-NB decoding is completed, and attempts SIB1-NB decoding to which rate matching or puncturing has been applied.

Of course, if the design of a user equipment similar to that of FDD is considered, rate matching may be said to be more appropriate.

Furthermore, when the number of CRS ports of a corresponding carrier is explicitly transmitted in an SIB1-NB, a user equipment may assume the number of CRS ports different from SIB1-NB decoding with respect to the rate matching of a corresponding carrier after SIB1-NB decoding.

The above-described contents corresponding to the first to the seventh may be independently applied or one or more combination of them may be applied or may be combined and applied in order to perform a method of transmitting an SIB1-NB, which is proposed in this specification.

User equipment and base station operations for transmitting (or receiving) an SIB1-NB, which are proposed in this specification, based on the above-described contents are described.

FIG. 16 is a flowchart showing an example of a terminal operation for performing the method proposed in the present disclosure.

That is, FIG. 16 shows a method for a terminal to receive system information in a time division duplex (TDD) system supporting narrowband (NB)-Internet of things (IoT).

First, the terminal receives first system information from a base station through an anchor carrier (S1610).

The first system information may include operation mode information on an operation mode of the system.

The terminal determines a location of a non-anchor carrier for receiving second system information based on the operation mode information (S1620).

The terminal receives the second system information from the base station through the non-anchor carrier (S1630).

Here, the operation mode information may be configured in a guard band or an in-band.

More specifically, the in-band may be in-band-differentPCI.

When the operation mode information is configured in the guard band, the non-anchor carrier may be a carrier on the same side as the anchor carrier or a carrier on an opposite side to the anchor carrier.

The first system information may further include information indicating that the number of cell-specific (CRS) ports of the non-anchor carrier is equal to the number of narrowband reference signal (NRS) ports of the anchor-carrier or 4.

The reason for transmitting the SIB1-NB proposed in the present disclosure on the non-anchor carrier will be described below as follows.

Unlike the LTE system, in the NB-IoT system characterized by coverage enhancement, all channels and signals basically occupy at least 1 subframe section.

Therefore, the NB-IoT system requires three subframes only for NPSS, NSSS, and NPBCH transmission.

However, since the NPSS, NSSS, and NPBCH transmission period is every 10 msec or 20 msec, the number of subframes used for the NPSS, NSSS, and NPBCH transmission within every 20 msec needs to be five.

In the case of the UL/DL configuration supported by the TDD NB-IoT system, in all the UL/DL configurations, a subframe (since SIB1-NB notifies the TDD configuration, a subframe that may be assumed to be downlink in all the UL/DL configurations may be used for SIB1-NB transmission) that may always be assumed to be DL exists only in subframe 0 of odd radio frames.

In addition, since the SIB1-NB may support various transport block sizes (TBS), when the TBS is large, repetitive transmission is often required.

At this time, interference between adjacent cells due to the repetitive transmission may be difficult to solve with TDM.

Therefore, to solve this problem, the SIB1-NB needs to be transmitted on the non-anchor carrier, instead of on the anchor-carrier.

The difference between the transmission method through the non-anchor carrier of the SIB1-NB proposed in the present disclosure and the CA (carrier aggregation) method of the existing LTE system is that the method proposed in the present disclosure does not transmit basic broadcast information only by a specific component carrier (CC).

In the CA of the LTE system, an arbitrary CC may be a primary-cell (P-cell) for each terminal, but in the NB-IoT system, only one anchor-carrier is defined even when there are a plurality of NB-IoT carriers.

Accordingly, the SIB1-NB transmission method proposed in the present disclosure differs from the CA of the LTE system in that the (basic) broadcast information is transmitted to another carrier.

Referring to FIGS. 16, 18, and 19, a part in which the method proposed in the present disclosure is implemented in the terminal will be described.

In the time division duplex (TDD) system supporting the NB-IoT, the terminal receiving the system information controls a transmitter for transmitting a radio signal, a receiver for receiving the radio signal, and a processor for controlling the transmitter and receiver.

More specifically, the processor of the terminal controls the receiver to receive the first system information from the base station through the anchor carrier.

The first system information may include the operation mode information on the operation mode of the system.

The processor of the terminal determines the location of the non-anchor carrier for receiving the second system information based on the operation mode information.

The processor of the terminal controls the receiver to receive the second system information from the base station through the non-anchor carrier.

Here, the operation mode information may be configured in the guard band or the in-band.

FIG. 17 is a flowchart showing an example of a base station operation for performing the method proposed in the present disclosure.

That is, FIG. 17 shows a method of transmitting system information in a wireless communication system supporting a time division duplex (TDD) narrowband (NB).

First, the base station transmits the first system information to the terminal through the anchor carrier (S1710).

Here, the first system information may include the operation mode information on the operation mode of the system.

The base station transmits the second system information to the terminal through the non-anchor carrier (S1720).

The location of the non-anchor carrier is determined based on the operation mode information, and the operation mode information may be configured in the guard band or the in-band.

Here, the in-band may be the in-band-differentPCI.

When the operation mode information is configured in the guard band, the non-anchor carrier may be the carrier on the same side as the anchor carrier or the carrier on an opposite side to the anchor carrier.

The first system information may further include the information indicating that the number of cell-specific (CRS) ports of the non-anchor carrier is equal to the number of narrowband reference signal (NRS) ports of the anchor-carrier or 4.

Referring to FIGS. 17 to 19, the part in which the method proposed in the present disclosure is implemented in the base station will be described.

In the time division duplex (TDD) system supporting the NB-IoT, the base station transmitting the system information controls a transmitter for transmitting a radio signal, a receiver for receiving the radio signal, and a processor for controlling the transmitter and receiver.

More specifically, the processor of the base station controls the transmitter to transmit the first system information to the terminal through the anchor carrier.

Here, the first system information may include the operation mode information on the operation mode of the system.

The processor of the base station controls the transmitter to transmit the second system information to the terminal through the non-anchor carrier.

The location of the non-anchor carrier is determined based on the operation mode information, and the operation mode information may be configured in the guard band or the in-band.

Here, the in-band may be the in-band-differentPCI.

When the operation mode information is configured in the guard band, the non-anchor carrier may be the carrier on the same side as the anchor carrier or the carrier on an opposite side to the anchor carrier.

The first system information may further include the information indicating that the number of cell-specific (CRS) ports of the non-anchor carrier is equal to the number of narrowband reference signal (NRS) ports of the anchor-carrier or four.

General Apparatus to which the Present Invention May be Applied

FIG. 18 illustrates a block diagram of a wireless communication apparatus to which methods proposed in this specification may be applied.

Referring to FIG. 18, the wireless communication system includes an eNB 1810 and multiple user equipments 1820 disposed within the eNB region.

The eNB and the user equipment may be represented as respective wireless devices.

The eNB includes a processor 1811, memory 1812 and a radio frequency (RF) module 1813. The processor 1611 implements the processes and/or methods proposed in FIGS. 1 to 17. The layers of a radio interface protocol may be implemented by the processor. The memory is connected to the processor and stores various types of information for driving the processor. The RF module is connected to the processor and transmits and/or receives a radio signal.

The user equipment includes a processor 1821, memory 1822 and an RF module 1823.

The processor implements the processes and/or methods proposed in FIGS. 1 to 17. The layers of a radio interface protocol may be implemented by the processor. The memory is connected to the processor and stores various types of information for driving the processor. The RF module is connected to the processor and transmits and/or receives a radio signal.

The memory 1812, 1822 may be positioned inside or outside the processor 1811, 1821 and may be connected to the processor by various well-known means.

Furthermore, the eNB and/or the user equipment may have a single antenna or multiple antennas.

An antenna 1814, 1824 functions to transmit and receive radio signals.

FIG. 19 is another example of a block diagram of a wireless communication apparatus to which methods proposed in this specification may be applied.

Referring to FIG. 19, the wireless communication system includes a base station 1910 and multiple user equipments 1920 disposed within the base station region. The base station may be represented as a transmission device, and the user equipment may be represented as a reception device, and vice versa. The base station and the user equipment include processors 1911 and 1921, memory 1914 and 1924, one or more Tx/Rx radio frequency (RF) modules 1915 and 1925, Tx processors 1912 and 1922, Rx processors 1913 and 1923, and antennas 1916 and 1926, respectively. The processor implements the above-described functions, processes and/or methods. More specifically, in DL (communication from the base station to the user equipment), a higher layer packet from a core network is provided to the processor 1911. The processor implements the function of the L2 layer. In DL, the processor provides the user equipment 1920 with multiplexing between a logical channel and a transport channel and radio resource allocation, and is responsible for signaling toward the user equipment. The transmission (TX) processor 1912 implements various signal processing functions for the L1 layer (i.e., physical layer). The signal processing function facilitates forward error correction (FEC) in the user equipment, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (iFFT) to generate a physical channel that carries a time domain OFDMA symbol stream. The OFDM stream is spatially precoded in order to generate multiple space streams. Each space stream may be provided to a different antenna 1916 through an individual Tx/Rx module (or transmitter and receiver 1915). Each Tx/Rx module may modulate an RF carrier into each space stream for transmission. In the user equipment, each Tx/Rx module (or transmitter and receiver 1925) receives a signal through each antenna 1926 of each Tx/Rx module. Each Tx/Rx module restores information modulated in an RF carrier and provides it to the RX processor 1923. The RX processor implements various signal processing functions of the layer 1. The RX processor may perform space processing on information in order to restore a given space stream toward the user equipment. If multiple space streams are directed toward the user equipment, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 1921.

UL (communication from the user equipment to the base station) is processed by the base station 1910 in a manner similar to that described in relation to the receiver function in the user equipment 1920. Each Tx/Rx module 1925 receives a signal through each antenna 1926. Each Tx/Rx module provides an RF carrier and information to the RX processor 1923. The processor 1921 may be related to the memory 1924 storing a program code and data. The memory may be referred to as a computer-readable medium.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention has been described based on an example in which it is applied to the 3GPP LTE/LTE-A system, but may be applied to various wireless communication systems in addition to the 3GPP LTE/LTE-A system.

What is claimed is:

1. A method for a terminal to receive system information in a time division duplex (TDD) system supporting narrowband (NB)-Internet of things (IoT), the method comprising:
receiving, from a base station, Master Information Block-Narrow Band (MIB-NB) through an anchor carrier, wherein the MIB-NB includes operation mode information,
wherein a location of a non-anchor carrier for receiving System Information Block1-Narrow Band (SIB1-NB) is based on the operation mode information; and
receiving, from the base station, the SIB1-NB through the non-anchor carrier,
wherein, based on the operation mode information representing an operation mode of the anchor carrier as a guard band mode, the operation mode information includes information representing a specific state among a plurality of pre-defined states related to the non-anchor carrier,
wherein, based on the information representing the specific state:
i) an operation mode of the non-anchor carrier is determined as the guard band mode or an in-band mode,
ii) the location of the non-anchor carrier is determined as a predefined location based on that the operation mode of the non-anchor carrier is determined as the guard band mode,
iii) the location of the non-anchor carrier is determined as a location based on a Physical Resource Block, PRB, within an LTE system bandwidth, based on that the operation mode of the non-anchor carrier is determined as the in-band mode, and
iv) whether the non-anchor carrier is related to in-band different PCI mode or in-band same PCI mode is determined based on that the operation mode of the non-anchor carrier is determined as the in-band mode,
wherein, based on that the operation mode related to the non-anchor carrier is determined as the in-band different PCI mode, the MIB-NB includes port information related to at least one of number of cell-specific reference signal (CRS) ports or number of narrowband reference signal (NRS) ports,
wherein the number of the CRS ports or the NRS ports is related to the reception of the SIB1-NB,
wherein the PRB within the LTE system bandwidth is a lowest PRB or a highest PRB, which is adjacent to the anchor carrier,
wherein the predefined location is based on i) a first side in which the anchor carrier is located among two sides related to edges of the LTE system bandwidth or ii) a second side opposite to the first side in which the anchor carrier is located among the two sides related to the edges of the LTE system bandwidth, wherein, based on the information representing the specific state related to the guard band mode including a first value or a second value different from the first value:
the predefined location is determined as the first side based on the first value,
the predefined location is determined as the second side based on the second value.

2. The method of claim 1, wherein the number of the CRS ports is i) equal to the number of the NRS ports or ii) 4.

3. A terminal configured for receiving system information in a time division duplex (TDD) system supporting narrowband-Internet of things (NB-IoT), the terminal comprising:
a transmitter configured to transmit a radio signal;
a receiver configured to receive the radio signal; and
a processor configured to control the transmitter and the receiver,
wherein the processor is further configured to:
receive, from a base station, Master Information Block-Narrow Band (MIB-NB) through an anchor carrier, wherein the MIB-NB includes operation mode information,
wherein a location of a non-anchor carrier for receiving System Information Block1-Narrow Band (SIB1-NB) is based on the operation mode information; and
receive, from the base station, the SIB1-NB through the non-anchor carrier, and
wherein, based on the operation mode information representing an operation mode of the anchor carrier as a guard band mode, the operation mode information includes information representing a specific state among a plurality of pre-defined states related to the non-anchor carrier,
wherein, based on the information representing the specific state:
i) an operation mode of the non-anchor carrier is determined as the guard band mode or an in-band mode,
ii) the location of the non-anchor carrier is determined as a predefined location based on that the operation mode of the non-anchor carrier is determined as the guard band mode, and
iii) the location of the non-anchor carrier is determined as a location based on a Physical Resource Block (PRB) within an LTE system bandwidth, based on that the operation mode of the non-anchor carrier is determined as the in-band mode, and
iv) whether the non-anchor carrier is related to in-band different PCI mode or in-band same PCI mode is determined based on that the operation mode of the non-anchor carrier is determined as the in-band mode,
wherein, based on that the operation mode related to the non-anchor carrier is determined as the in-band different PCI mode, the MIB-NB includes port information related to at least one of number of cell-specific reference signal (CRS) ports or number of narrowband reference signal (NRS) ports,
wherein the number of the CRS ports or the NRS ports is related to the reception of the SIB1-NB,
wherein the PRB within the LTE system bandwidth is a lowest PRB or a highest PRB, which is adjacent to the anchor carrier,
wherein the predefined location is based on i) a first side in which the anchor carrier is located among two sides related to edges of the LTE system bandwidth or ii) a second side opposite to the first side in which the anchor carrier is located among the two sides related to the edges of the LTE system bandwidth, wherein, based on the information representing the specific state related to the guard band mode including a first value or a second value different from the first value:
the predefined location is determined as the first side based on the first value,
the predefined location is determined as the second side based on the second value.

4. The terminal of claim 3, wherein the number of the CRS ports is i) equal to the number of the NRS ports or ii) 4.

5. A method for a base station to transmit system information in a time division duplex (TDD) system supporting narrowband Internet of things (NB-IoT), the method comprising:
transmitting, to a terminal, Master Information Block-Narrow Band (MIB-NB) through an anchor carrier, wherein the MIB-NB includes operation mode information; and
transmitting, to the terminal, System Information Block1-Narrow Band (SIB1-NB) through anon-anchor carrier,
wherein, a location of the non-anchor carrier is based on the operation mode information,
wherein, based on the operation mode information representing an operation mode of the anchor carrier as a guard band mode, the operation mode information includes information representing a specific state among a plurality of pre-defined states related to then on-anchor carrier,
wherein, based on the information representing the specific state:
i) an operation mode of the non-anchor carrier is determined as the guard band mode or an in-band mode,
ii) the location of the non-anchor carrier is determined as a predefined location based on that the operation mode of the non-anchor carrier is determined as the guard band mode,
iii) the location of the non-anchor carrier is determined as a location based on a Physical Resource Block (PRB) within an LTE system bandwidth, based on that the operation mode of the non-anchor carrier is determined as the in-band mode, and
iv) whether the non-anchor carrier is related to in-band different PCI mode or in-band same PCI mode is determined based on that the operation mode of the non-anchor carrier is determined as the in-band mode,
wherein, based on that the operation mode related to the non-anchor carrier is determined as the in-band different PCI mode, the MIB-NB includes port information related to at least one of number of cell-specific reference signal (CRS) ports or number of narrowband reference signal (NRS) ports,
wherein the number of the CRS ports or the NRS ports is related to the transmission of the SIB1-NB,
wherein the PRB within the LTE system bandwidth is a lowest PRB or a highest PRB, which is adjacent to the anchor carrier,
wherein the predefined location is based on i) a first side in which the anchor carrier is located among two sides related to edges of the LTE system bandwidth or ii) a second side opposite to the first side in which the anchor carrier is located among the two sides related to the edges of the LTE system bandwidth,
wherein, based on the information representing the specific state related to the guard band mode including a first value or a second value different from the first value:

the predefined location is determined as the first side based on the first value, the predefined location is determined as the second side based on the second value.

6. The method of claim 5, wherein the number of the CRS ports is i) equal to the number of the NRS ports or ii) 4.

* * * * *